United States Patent [19]

O'Such et al.

[11] Patent Number: 5,121,155
[45] Date of Patent: Jun. 9, 1992

[54] TECHNIQUE FOR DETERMINING WHETHER TO USE FILL FLASH ILLUMINATION TO CAPTURE AN IMAGE OF A CURRENT SCENE

[75] Inventors: William R. O'Such, Rochester; Roger W. Wilson, Pittsford; Richard B. Wheeler, Webster, all of N.Y.

[73] Assignee: Eastman Kodak Company, Rochester, N.Y.

[21] Appl. No.: 587,463

[22] Filed: Sep. 20, 1990

Related U.S. Application Data

[62] Division of Ser. No. 572,600, Aug. 23, 1990, Pat. No. 5,049,916.

[51] Int. Cl.⁵ .............................................. G03B 15/03
[52] U.S. Cl. ....................................... 354/414; 354/422; 354/432
[58] Field of Search ............... 354/414, 416, 417, 422, 354/429, 431, 432, 433

[56] References Cited

U.S. PATENT DOCUMENTS

| | | | |
|---|---|---|---|
| 3,843,255 | 10/1974 | Cole | 366/68 |
| 3,888,580 | 6/1975 | Amano et al. | 355/38 |
| 3,917,395 | 11/1975 | Ogawa | 354/23 |
| 4,092,067 | 5/1978 | Grossmann | 355/77 |
| 4,100,424 | 7/1978 | Akimoto et al. | 250/559 |
| 4,101,216 | 7/1978 | Grossman | 355/35 |
| 4,103,307 | 7/1978 | Shinoda et al. | 354/23 |
| 4,154,523 | 5/1979 | Rising et al. | 355/38 |
| 4,168,120 | 9/1979 | Freier et al. | 355/38 |
| 4,182,560 | 1/1980 | Oguchi et al. | 354/106 |
| 4,279,505 | 7/1981 | Ursprung et al. | 355/77 |
| 4,309,089 | 1/1982 | Harvey | 354/23 |
| 4,339,517 | 7/1982 | Akimoto | 430/30 |
| 4,345,825 | 8/1982 | Matteson et al. | 354/23 |
| 4,429,969 | 2/1984 | Saegusa | 354/414 |
| 4,598,986 | 7/1986 | Shiratori et al. | 354/21 |
| 4,664,495 | 5/1987 | Alfuku et al. | 354/432 X |
| 4,769,666 | 9/1988 | Kumakura | 354/413 |
| 4,772,910 | 9/1988 | Fields | 354/414 |
| 4,785,323 | 11/1988 | Bell | 354/443 |
| 4,801,964 | 1/1989 | Desormeaux | 354/414 |
| 4,812,872 | 3/1989 | Desormeaux | 354/414 |
| 4,878,081 | 10/1989 | Kishida et al. | 354/414 |
| 4,984,006 | 1/1991 | Ikemura et al. | 354/414 |

FOREIGN PATENT DOCUMENTS

| | | |
|---|---|---|
| 0189981 | 8/1986 | European Pat. Off. |
| 3637742 | 5/1988 | Fed. Rep. of Germany |
| 61-145971 | 7/1986 | Japan |
| 1-222209 | 5/1989 | Japan |

OTHER PUBLICATIONS

D. M. Zwick, "The Technical Basis of Photographic Speed Determination, or What is a Normal Exposure?", SMPTE Journal, Aug. 1979, vol. 88, No. 8, pp. 533–537.

(List continued on next page.)

*Primary Examiner*—W. B. Perkey
*Attorney, Agent, or Firm*—Peter Michaelson

[57] ABSTRACT

Apparatus, and an accompanying method, for use in a photographic camera for determining whether to utilize fill flash illumination in photographing a current scene. Specifically, fill flash illumination is used if both an initial value of the scene lighting contrast, based upon measured near primary and distant primary (or background) subject lighting levels, indicates that a distant primary or background subject is lighter than a near primary subject and use of fill flash illumination will reduce the scene lighting contrast from its initial value. Fill flash illumination will be inhibited if the distant primary or background subject will not be adequately illuminated to generate a proper exposure thereof or if the near primary subject will be excessively illuminated relative to the distant primary or background subject so as to cause a reversal in the scene lighting contrast to occur. However, if an energy saving flash unit is being used, the output power of the flash can be appropriately reduced to a level sufficient to eliminate a reversal. Alternatively, a programmable shutter, if it is available, can be set to a different opening for a flash exposure than for an ambient exposure in order to prevent the scene lighting contrast from reversing.

16 Claims, 14 Drawing Sheets

OTHER PUBLICATIONS

"American National Standard for General-Purpose Photographic Exposure Meters (Photoelectric Type) ANSI PH 3.49-1971", American National Standards Institute, 1971.

"American National Standard for Colour Negative Films for Still Photography—Determination of ISO Speed ANSI PH 2.27-1988", American National Standards Institute, 1988.

"American National Standard for Photography—Photographic Exposure Guide ANSI 2.7-1986", American National Standards Institute, 1986.

L. Stroebel et al, Photographic Materials and Processes (© 1986: Focal Press; Boston, Mass.), specifically pp. 42–56.

TECHNIQUE FOR DETERMINING WHETHER TO USE FILL FLASH ILLUMINATION TO CAPTURE AN IMAGE OF A CURRENT SCENE

CROSS-REFERENCE TO RELATED APPLICATIONS

This application is a divisional patent application of my co-pending paretn U.S. Pat. application "AUTOMATIC OPTIMIZATION OF PHOTOGRAPHIC EXPOSURE PARAMETERS THROUGH DETERMINATION AND UTILIZATION OF EXTRA SYSTEM SPEED", filed Aug. 23, 1990 and Ser. No. 572,600.

This patent application describes and claims subject matter that is also described in the following co-pending U.S. Pat. application, filed silultaneously herewith, all of which are divisional patent applications of my co-pending parent U.S. Pat. applications identified above: (a) "A DEPTH NUMBER BASED TECHNIQUE FOR SELECTING LENS APERTURE SIZE AND FLASH PARAMETERS FOR A FULL FLASH EXPOSURE", Ser. No. 587,461; (b) "A TECHNIQUE FOR SELECTING LENS APERTURE SIZE FOR A FULL FLASH EXPOSURE BASED ON REASSESSED SCENE DEPTH-OF-FIELD REQUIREMENTS", Ser. No. 587,464; (c) "A TECHNIQUE FOR PRIORITIZED SELECTION OF SHUTTER SPEED AND LENS APERTURE SETTINGS", Ser. No. 586,344.

TECHNICAL FIELD OF THE INVENTION

The invention relates to apparatus, and various accompanying methods, for use in a photographic camera for improving the overall quality of photographed images, i.e. increasing the number of acceptable and higher quality images, that are produced by the camera. The quality improvement is attained by automatically selecting the values of various photographic exposure parameters (exposure settings and, where appropriate, flash parameters) based upon scene requirements (including providing sufficient depth-of-field and avoiding image blur) and film quality characteristics, and, where appropriate, deviating from the corresponding exposure values dictated by adherence to the ISO/ANSI exposure standards.

BACKGROUND ART

Photographic cameras have been in widespread use for quite some time. Basically, such a camera operates by exposing a portion of a light sensitive media, i.e. a frame of film, for a pre-defined period of time to scene illumination. The light is focused on the frame through a lens that has an aperture of a given, often variable, size. A shutter, situated behind the lens and in front of the film, opens for a selected period of time in order to permit the light to transit therethrough, illuminate and expose the film. As a result of being properly exposed and subsequently developed, the film undergoes a photochemical process, on a two-dimensional basis throughout the frame, that locally varies the optical transmissivity of each portion of the frame in proportion to the amount of illumination that reaches that portion of the frame from a corresponding portion of the scene, thereby producing, depending upon whether reversal or negative film is used, either a two-dimensional positive or negative optical image of the scene. As such, tonal variations that appeared in the scene are captured in the frame of the film. Photographic prints are often made from negatives, while transparencies (commonly referred to as "slides") are made from positives.

Though this overall process, which relies on the use of silver halide as a photosensitive reagent in film, has basically remained unchanged over many years, this process is highly non-linear and subject to a great many variables which significantly complicate its use. In particular, exposure (E) is defined, under a standardized definition, as being a product of the illuminance (I) multiplied by the time (t) during which the film is exposed to this illumination. In this regard, see specifically ANSI (American National Standards Institute) standard PH 3.49-1971 "American National Standard for General Purpose Photographic Exposure Meters" (re-affirmed in its entirety with no modifications in 1987 as ANSI standard PH 3.49-1987) hereinafter referred to as ANSI standard 3.49-1987], and also ANSI standard PH 2.7-1986 "American National Standard for Photography—Photographic Exposure Guide" and specifically page 13 thereof. In a camera, the combination of two settings, namely lens aperture (size of the lens opening) and shutter speed (time during which the shutter remains open), primarily defines a particular exposure. Unfortunately, lens aperture and shutter speed define more than just an amount of exposure, these settings also dramatically affect picture (hereinafter including both prints and transparencies) quality and must be judiciously chosen in each photographic situation; otherwise, a picture (also referred to hereinafter as an image) having inferior quality will result.

To illustrate the variability among photographic parameters and the difficulties in choosing appropriate lens aperture and shutter speed settings, consider for the moment a particular scenario that often occurs and presents significant challenges to a photographer: photographing a scene in relatively low light conditions with sufficient depth-of-field to cover a desired subject. In dealing with a low light situation, a photographer, particularly an amateur, might, at first, open the lens aperture to its maximum value in order to pass as much light as possible therethrough to the film. A suitable shutter speed would then be chosen based on scene luminance, typically using an indication provided by an internal light meter located in the camera. Unfortunately, such an approach might fail. Specifically, while, the lens aperture size specifies the amount of light that instantaneously strikes the film, this size also defines the so-called depth-of-field in the resulting photographed image, i.e. a range of minimum to maximum camera-to-subject distances in which objects located therein will be perceived in the image as being sharp and in-focus. As the aperture size of a given lens increases, i.e. the lens is opened and its so-called "f" number decreases, which ordinarily occurs in low light conditions, the depth-of-field produced by that lens correspondingly decreases. Accordingly, with certain subject thicknesses, the depth-of-field that results from a maximum lens aperture exposure may be too restricted to fully cover the entire subject. Thus, portions of the subject located at camera-to-subject distances that are outside the range specified by the depth-of-field for the given lens aperture, i.e. too close to or too far from the camera, will appear out-of-focus in the resulting photographed image. Therefore, in order to provide an appropriate depth-of-field to cover the entire subject, a smaller lens aperture than the maximum available size must be used along with a slower shutter speed to generate a sufficient exposure. Unfortunately, a photographer is often unable to steadily hold a hand-held camera for times typically in excess of, for example, 1/50th of a second for a 50 mm lens. Hence, as the shutter remains open for increasingly longer periods of time, the camera becomes increasingly sensitive to camera shake or subject motion which, when it occurs, blurs and ruins the entire picture. Therefore, to reduce the incidence of noticeable image blur, particularly resulting from camera shake, shutter speeds equal to or slower than of 1/50th second for use with a 50 mm lens should be avoided for use in a hand-held camera. Consequently, other techniques, such as mounting the camera on a tripod or using an auxiliary light source, e.g. a so-called flash unit, or higher speed film, i.e. a more sensitive film, are often required in order to provide acceptable combinations of lens aperture openings and shutter speeds in low light conditions. Unfortunately, a flash unit or a tripod may not be currently available. Also, films that are increasingly sensitive tend to produce pictures that exhibit increasing graininess, thereby adversely impacting the quality of the picture. With this scenario and in the absence of having a flash unit, a tripod or the ability to change film for use in photographing a particular low light scene, the photographer may not be able to select shutter speeds and lens aperture sizes that will produce a picture of optimum quality. Instead, the photographer is forced to accept compromise settings which will likely produce a picture of sub-optimum quality, such as being under-exposed, but, owing to the latitude in the performance of the film, will hopefully still exhibit sufficient quality to still be acceptable to a viewer. To a certain extent, the developing process can compensate (through so-called "forcing" ) for under-exposure conditions, though the ability to do so and still provide pictures of sufficient quality depends upon the subject matter in the scene and hence can be rather limited. In this regard, see D. M. Zwick, "The Technical Basis of Photographic Speed Determination or What is a Normal Exposure", *SMPTE Journal*. Vol. 88, No. 8, Aug. 1979, pages 533-537 (hereinafter referred to as the Zwick publication) and specifically pages 536-537 thereof.

In certain extreme situations with worsening exposure conditions than that illustratively described above, the lighting conditions may, for all practical purposes, totally frustrate the ability of even a skilled photographer to produce a picture of merely acceptable quality. In these situations, photography would be essentially impossible. For example, consider the same low-light scenario above but where the photographer desires to use a lens that has a relatively large focal length, e.g. a telephoto lens, to capture a scene. For a given film size, the depth-of-field varies in proportion to the square of the focal length of the lens and hence significantly decreases with increases in focal length. Therefore, the depth-of-field provided by such a lens, for certain lens apertures, may not meet the scene requirements. Large focal length lenses also tend to be bulky, massive and relatively heavy and thus, once mounted to a hand-held camera, are hard to hold steady for even moderate shutter speeds, such as 1/30 or 1/60th of a second. Accordingly, to avoid significant camera shake, the slowest shutter speed at which these lenses can be used, without a tripod, is often quite limited. Moreover, since physical limitations on lens size often prevent a large focal length lens from being constructed with large lens aperture sizes, this forces the use of increasingly long shutter speeds to achieve a proper exposure under low-light conditions and exacerbates the need to use other techniques, such as a tripod, auxiliary light source or a faster speed film, to provide usable lens aperture and shutter speed settings that will provide a proper exposure. In the absence of using a tripod or an auxiliary light source, which—owing to the amplitude fall-off as the inverse square of distance to the subject—becomes ineffective at large subject-to-camera distances, or the ability to change to and/or even the availability of sufficiently fast films that exhibit low graininess during the printing process, low-light photography with large focal length lenses is oftentimes practically impossible.

Therefore, as one can now appreciate, even a skilled photographer often experiences difficulties in choosing the proper photographic settings under certain lighting conditions, e.g. lens aperture and shutter settings, selection of lens focal length, use and amount of flash illumination. While certain lighting conditions are so extreme that they simply can not be handled by even a professional photographer, the vast majority of scene lighting conditions fortunately do not fall in this category. Nevertheless, some of these latter conditions often present sufficient difficulties to effectively frustrate the ability of an amateur photographer to take a picture of acceptable quality. In fact, for many inexperienced amateurs, choosing lens aperture size and shutter speed settings amounts to little more than mere guesswork, through which the probability is high that the amateur will select wrong settings and quickly become frustrated. Frustration, if it occurs sufficiently often, leads to dissatisfaction, which in the context of an amateur photographer often means that that photographer will simply stop taking pictures and turn to other leisure activities which he or she believes to be less trying and more satisfying than photography. Since amateur photographers constitute a major portion of the photographic market, including both equipment and film, their continued satisfaction is essential to the photographic industry.

Having recognized this fact, the art has for many years pursued a goal of developing a camera that, over its lifetime, will produce more pictures that exhibit at least an acceptable and preferably higher level of quality than those resulting from cameras heretofore in use while, at the same time, relieving the photographer of the tedium and difficulty associated with choosing the photographic settings appropriate to a current lighting condition.

Hence, over the years, considerable activity has occurred in the art to provide cameras that automatically select a lens aperture size and/or shutter speed appropriate for a current scene being photographed. While these attempts have resulted in cameras of increasing sophistication and improved performance, each of these attempts suffers one or more drawbacks which limits its attractiveness.

For example, U.S. Pat. No. 3,917,395 (issued to F. T. Ogawa on Nov. 4, 1975) describes one approach at providing an automatic camera. Here, a camera relies on using an electronic circuit and associated electromechanical drive mechanisms for invoking and controlling each one of a sequence of photographic operations required by the camera to take a picture. Unfortunately, this apparatus appears to require a photographer to manually select an appropriate lens aperture size. With this selection, the circuitry attempts to control shutter speed, determine if a flash is necessary and, if so, and fire the flash unit. Accordingly, while the photographer is advantageously relieved of determining an appropriate shutter speed and whether flash is necessary, improper depth-of-field could readily result in a significant number of pictures, particularly those taken under various low-light conditions, that exhibit unacceptable quality.

Another illustrative approach at providing an automatic camera is described in U.S. Pat. No. 4,103,307 (issued to N. Shinoda et al on Jul. 25, 1978 and hereinafter referred to as the '307 Shinoda et al patent). Here, a microcomputer is used within a camera to provide several different modes of automated photography; namely, shutter priority mode (where the photographer manually selects the shutter speed and the camera selects the lens aperture size), aperture priority mode (where the photographer manually selects the lens aperture size and the camera selects the shutter speed), program mode (where the camera selects both the shutter speed and lens aperture size) and manual mode (where the photographer manually selects both the shutter speed and lens aperture size). During camera operation in a non-manual mode, the microcomputer computes the appropriate selection(s) based upon film speed and scene lumination. Unfortunately, since the microcomputer uses scene luminance, but not scene content, in determining exposure settings during program mode and shutter priority modes of operation, the microcomputer can generate a lens aperture size setting that, in many instances, is not likely to provide sufficient depth-of-field for a current scene. Similarly, an amateur photographer who operates the camera in the aperture priority mode may often manually select a lens aperture size that provides insufficient depth-of-field. In the shutter priority mode, the photographer can manually set minimum and maximum lens aperture limits. In this instance, the microcomputer will provide suitable indications in the viewfinder of the camera to alert the photographer when the computed lens aperture size is beyond the set limits, thereby requiring the photographer to manually change the lens aperture size accordingly. However, this need to manually set and/or subsequently manually adjust the exposure settings of the camera places an added burden on the photographer, one which is best avoided in cameras destined for amateur photographers.

An additional illustrative approach is described in U.S. Pat. No. 4,309,089 (issued to D. M. Harvey on Jan. 5, 1982, assigned to the present assignee and hereinafter referred to as the '089 patent). Here, the camera contains a microcomputer which uses scene lumination and exposure latitude information of the film to compute a range of acceptable exposure values (EV values). The current exposure value corresponding to the specific lens aperture size and shutter speed at which the camera is presently set is compared to the range. If the comparison reveals that the specific exposure value lies within or outside of the range, then the microcomputer provides an appropriate indication to the photographer to either "validate" the settings for the prevailing scene lumination or inform the photographer to choose other settings to photograph the scene. Unfortunately, the photographer is required to manually choose both the lens aperture size and shutter speed settings and to manually change them, if necessary. This places a significant and undesirable burden on a photographer, which might be best avoided if the camera is destined for the amateur market.

While these approaches in the art clearly teach that image quality can be improved by increasing camera sophistication through use of an internal microcomputer for scene measurement, and exposure determination and control, all of these approaches share one significant disadvantage: they all appear to require the photographer to manually intervene in some fashion in order to achieve optimum image quality. This intervention takes the form of either manually providing an initial exposure setting, e.g. a lens aperture size that satisfies depth-of-field requirements, or subsequently making manual corrections, as indicated by the microcomputer, to these settings in order to provide a proper exposure. As such, these prior art approaches appear to universally fail to provide truly automatic control over a camera—control that is necessary to substantially, if not completely, eliminate guesswork by amateur photographers and further heighten overall image quality.

Having recognized this failing in the art, U.S. Pat. No. 4,785,323 (issued to C. S. Bell on Nov. 15, 1988, also assigned to the present assignee and hereinafter referred to as the '323 Bell patent) describes automatic exposure control apparatus for use in a camera that through measurement of scene parameters, such as scene lumination and subject-to-camera distance, attempts to satisfy depth-of-field requirements and reduce image blur. In particular, this apparatus first determines various combinations of appropriate lens aperture size and shutter speed settings based upon measured scene lumination. Thereafter, using measured subject-to-camera distance, the apparatus selects one of these combinations that provides the required depth-of-field. As the subject moves farther from the camera, larger lens aperture sizes and increased shutter speeds are selected in an effort to maintain the needed depth-of-field while reducing the likelihood of image blur resulting from either camera shake and/or subject motion. By minimizing image blur, this apparatus can advantageously provide a perceptible increase in overall image sharpness though at the expense, in certain instances, of compromising image exposure.

Nevertheless, further improvements in overall image quality can still be made even if image blur is minimized for a given scene. In this regard, it has been well known for some time in the art, especially by professional photographers, that most films, particularly negative print film and to a much lesser extent reversal films, possess some latitude with respect to exposure. In fact, the curve of log exposure (log E) vs. density for each layer of a color negative film generally remains at a minimum value (i.e. no latent image is formed) until a given minimal amount of exposure is reached at which point the curve begins to increase. The curve then linearly increases in density throughout a range of increasing log exposure values until point is reached at which a shoulder exists in the curve. The curve then exhibits a fairly broad plateau at which image density remains constant or slightly increases throughout several values of increasing log exposure. In addition, with certain film types, the graininess exhibited by the layer tends to decrease with increasing exposure, and increasingly sharp images may occur at increasing exposure levels. The ISO (ASA) film speed is defined from the exposure necessary to produce a specific value of image density on each layer of the film. Typically, the lowest log exposure value on this curve that will produce an "excellent" quality image in terms of faithful tone (color) reproduction defines a so-called normal exposure point. The normal exposure point is not a region but rather by a single point on the log exposure vs. density curve for the film. With these definitions in mind, lens aperture and shutter speed settings, that will produce an exposure at the ISO normal exposure point, can then be readily determined by substituting the values for the ISO (ASA) film speed and scene luminance into an ISO standard metering equation and calculating a result. See, specifically, ANSI standard PH 2.27-1988 "American National Standard for Determination of ISO (ASA) Speed of Color Negative Films for Still Photography" and ISO standard 588-1979, with the former ANSI standard adopting the latter ISO standard for determining the film speed; and the ANSI standard 3.49-1987, particularly page 21 thereof for the ISO standard metering equation; as well as the Zwick publication. For ease of reference, the pertinent standards will be referred to hereinafter as the "ISO/ANSI exposure standards" with an exposure defined by these standards being referred to hereinafter as synonymously either an ISO "standard" or "normal" exposure and the normal exposure point being referred to as the ISO normal exposure point. From these definitions and use of the standard metering equation, the ISO normal exposure point occurs at higher density and exposure values on the log exposure vs. density curve than those for the ISO (ASA) speed point. Inasmuch as linear response can still be had at each of several stops of over-exposure from the ISO normal exposure point and yield improved image quality, professional photographers often, depending upon lighting conditions, intentionally over-expose negative film, beyond that specified by its ISO normal exposure point. Unfortunately, those automated cameras that utilize film speed in determining exposure settings, such as that described above in the '323 Bell, the '307 Shinoda et al and the ,089 Harvey patents, do not automatically take into account that, for certain films, image quality can actually be improved through intentional over-exposure. Nevertheless, the art has recognized, as disclosed in illustratively U.S. Pat. No. 4,598,986 (issued to K. Shiratori et al on Jul. 8, 1986 and hereinafter referred to as the '986 Shiratori et al patent) the utility of including a manual adjustment into an automated camera that permits a photographer to manually shift the exposure settings in order to intentionally over- or under-exposure a photographed image. The amount of the shift can either be manually set by the photographer or read by the camera from encoded information stored in metallic patterns (the so-called "DX" code) situated on an outside surface of a film canister. Unfortunately, this arrangement relies on the photographer, not the camera, to make the determination of when the film is to be over-exposed. Since many amateurs are simply not familiar with film exposure characteristics and to avoid what they believe to be a risk, here arising from simple ignorance, of ruining a picture, these amateurs, including those using the camera described in the '986 Shiratori et al patent, are not likely to intentionally over-expose a picture even in those situations where, in fact, image quality could be improved by doing so.

Consequently, a continuing two-part need still exists in the art; namely, to provide automatic exposure control apparatus for use in a camera that not only further reduces the tedium, difficulty and guesswork associated with using currently available automated cameras to take pictures under a wide variety of different lighting conditions but also provides pictures which have an increased overall level of quality as compared to that provided by these automated cameras. Furthermore, to provide pictures at an increased quality level, a specific need exists in the art for such exposure control apparatus that automatically selects appropriate exposure settings based not only upon scene luminance but also upon scene depth-of-field requirements, avoidance of image blur and, very importantly, exposure latitude and the exposure vs. quality function of the film in use.

DISCLOSURE OF THE INVENTION

These and other deficiencies that are inherent in cameras which utilize automatic exposure control systems known in the art are substantially remedied in accordance with the teachings of our present invention.

In accordance with the broad teachings of our invention, initial values for various exposure parameters (including exposure settings—such as shutter speed and lens aperture size; and, where appropriate, flash parameters) are determined for each photographic situation, i.e. including a scene that is to be photographed, the film being used, and the camera (including a lens and, where employed, auxiliary scene lighting such as that produced by a flash unit), that will provide a baseline exposure of that scene. This baseline exposure is typically an ISO normal exposure. Once the initial values for these parameters are determined, corresponding values of these parameters are then determined that—essentially regardless of the ISO/ANSI exposure standards—substantially meet the actual requirements of the scene. For example, in an ambient lighting situation, the scene requirements would include a shutter speed that is sufficiently fast to effectively reduce image blur attributable to camera shake as well as a lens aperture setting that provides sufficient depth-of-field to fully encompass, with sufficient sharpness, both the primary subject and background portion of the scene. Thereafter, based upon differences that occur between the initial and corresponding values of these parameters, for example lens aperture and shutter speed settings, the initial value of one or more of these parameters is then changed to a new value if doing so would provide an image that would possess a level of quality at least equal and preferably superior to that in an image of the same scene but obtained through use of the baseline exposure. The new value(s) of the parameter(s) together with any unchanged values, if appropriate, of other such parameters are then supplied to the lens and shutter mechanisms of the camera to subsequently expose the film and capture an image of the scene. Extra system speed, as defined in detail below, is used as a cumulative measure of the change that is available in the resulting exposure between use of the initial and corresponding values of the exposure parameters. Extra system speed, when it occurs, can be consumed in any one or more of a variety of different ways that each incrementally changes various exposure parameters (including exposure settings and, where appropriate, flash parameters) and improves image quality.

Specifically, after having recognized the shortcomings of basing lens aperture and shutter speed settings using film performance dictated only by its ISO normal exposure point, as often occurs in the art, we have developed, as part of our invention, the concept of "extra system speed" to define those photographic situations where image quality can be improved beyond that produced by exposure settings defined by the ISO normal exposure point and ISO (ASA) film speed, i.e. the so-called ISO normal exposure settings.

During use of our inventive process, each photographic situation is separately assessed to determine whether "extra system speed" exists for that situation and, if so, how that "extra system speed" can be best used to effectively improve the resulting quality of a photographed image of that scene.

We define "extra system speed" as simply the speed (measured in terms of log exposure) that is available in the photographic system (including the camera, lens, film and, where used, a flash unit) beyond the "system speed". The "system speed" is the amount of film speed which is necessary to satisfy the requirements of the scene ("standard scene requirements") that is to be currently photographed. In particular, the system speed is that amount of exposure, as measured in terms of log exposure, that is required by use of typically the ISO-/ANSI exposure standards to provide a ISO normal exposure of the current scene. Where the available speed in the photographic system just meets that required by the scene, corresponding initial ("baseline") exposure parameters (exposure settings including, for example, lens aperture and shutter speed; and, where appropriate, flash parameters), would be selected through use of our inventive process to photograph the scene such that the shutter speed would likely be sufficiently fast to substantially eliminate any adverse affects of camera shake on the resulting photographed image while the lens aperture size would likely provide sufficient depth-of-field in the photographed image to fully cover the thickness of the subject(s) in the scene. These exposure settings would result in a picture that has an exposure and quality level at least equal to those defined at the ISO normal exposure point.

Now, where "extra system speed" exists in a photographic situation, i.e. system speed is available beyond that which is required by the scene, our inventive process will then utilize that extra system speed on an pre-defined prioritized basis to modify the initial exposure parameters to further improve image quality beyond that obtainable through adherence to the ISO/ANSI exposure standards. For example, once our inventive process has chosen initial exposure settings that provide the baseline exposure and satisfy the depth-of-field and image blur requirements for a current scene being photographed under ambient lighting and has determined that extra system speed exists for this scene and the corresponding amount thereof, our inventive process would then incrementally consume this extra system speed to vary the exposure parameters, particularly lens aperture size and shutter speed and where appropriate flash parameters, to improve image quality beyond that obtainable using the initial settings. Specifically, for this example, our inventive process would: first choose a smaller lens aperture size than its initial setting in order to provide increased depth-of-field; then, to the extent extra system speed remains, increase the shutter speed to a faster setting than its initial value so as to further minimize the effects of camera shake; thereafter, if extra system speed still exists, reduce the amount of available extra system speed by an amount (typically 2 stops at most) which was implicitly consumed through intentional over-exposure of the film thereby exploiting its exposure vs. quality characteristic; and finally, to the extent that any extra system speed still remains, further increase the shutter speed and decrease the lens aperture setting to equally divide the extra system speed therebetween. At each different prioritized level, the value of the exposure settings or film exposure would be appropriately changed, as measured in exposure value (EV) stops, to consume a corresponding amount of available extra system speed.

With this in mind, our inventive process specifically relies on: (a) determining the initial value of the exposure parameters that are required to provide a baseline exposure of a scene to be photographed; (b) ascertaining corresponding exposure parameters that actually meet the scene requirements, such as e.g. camera shake and required depth-of-field; (c) assessing, in response to differences between the initial and corresponding exposure parameters whether any extra system speed exists and, if so, the amount of extra system speed that is available for use in photographing the scene; and (d) finally, where possible, consuming that extra system speed in a pre-defined prioritized incremental manner to vary the baseline exposure parameters in order to provide an exposure of the scene that has a level of quality which is at least equal to and, in many instances, significantly improved over that which would be obtained using the initial, i.e. ISO normal exposure, settings.

Advantageously, our inventive process handles ambient, fill and full flash lighting conditions. Thus, in stark contrast to that which occurs in automated cameras known in the art, our inventive system advantageously violates the ISO/ANSI exposure standards where necessary to set exposure parameters (including though not limited to lens aperture and shutter speed) at values that will actually improve image quality over that resulting from use of the ISO/ANSI exposure standards, i.e. use of an ISO normal exposure (i.e. intensity multiplied by exposure time) and resulting ISO normal exposure settings.

Our inventive process is ideally (though not exclusively) suited for use with a film that possesses a relatively broad latitude with respect to exposure, and particularly a film which has a strong exposure dependent quality characteristic and exhibits increased quality with over-exposure. Through the synergy obtainable between our inventive process and the response of the film, our process selects appropriate exposure settings (and, where appropriate, flash parameters)—essentially regardless of the ISO/ANSI exposure standards—that, to the extent possible, meet the scene requirements and substantially deliver the best quality image that the film is capable of providing. Due to the inherent limitations of these standards, such an image will usually exhibit a noticeable improvement in quality over that resulting from use of the ISO normal exposure settings.

Apart from the overall concept of determining whether extra system speed exists in a current photographic situation and utilizing that extra system speed, through e.g. a pre-defined prioritized scheme, to improve image quality, our invention encompasses several new distinct features.

In particular, one feature of our invention, that is applicable to the use of full flash, is the use of a DEPTH_NUMBER parameter, as described in detail below, to provide correct lens aperture settings, given subject distances, at which the depth-of-field matches the depth-of-illumination and as such where system speed is most efficiently utilized. The value of DEPTH_NUMBER is based upon optical characteristics (specifically focal length, blur circle criteria and far-end depth-of-illumination exposure limit) and not film speed. We utilize the value of DEPTH_NUMBER in conjunction with the value of GUIDE_NUMBER to advantageously determine, based upon available flash power, if extra system speed exists.

An additional feature of our invention is analyzing the scene requirements for a full flash exposure and, where appropriate, throttling back the flash power based upon the extra system speed that is currently available. This prevents the primary subjects in the scene from becoming excessively bright and hence over-exposed and also permits a storage capacitor in the flash unit to be rapidly re-charged in preparation for the next flash exposure. In conjunction with this feature, a further feature of our invention is to utilize bounce or spread full flash illumination where extra system speed exists but where the flash unit is not energy saving and thus incapable of throttling back its output. Here, spread or bounce flash illumination is used to provide more even scene illumination than non-spread direct flash illumination. The determination, made automatically, of whether to use either bounce or spread flash illumination, including a particular spread angle, is based upon the amount of available extra system speed and whether a suitable surface exists from which flash illumination can be bounced. If sufficient extra system speed and a suitable surface exists, then bounce flash illumination is selected over spread flash illumination due to the ability of bounce illumination to more evenly illuminate the scene than will spread flash. Where spread flash illumination is used, a related feature of our invention is to spread the direct flash illumination out beyond the frame captured by the lens in order to provide scene illumination that, through reflections off nearby surfaces and objects onto the scene, attempts to mimic the lighting characteristics provided by bounce flash illumination.

Another feature of our invention that is used in full direct or bounce flash situations is to: (a) re-assess the depth-of-field requirements for a full flash exposure, after a baseline lens aperture setting has been selected, in order to account for the increased background light level provided by the flash unit, and (b) then, where appropriate, correct the baseline lens aperture setting to provide, where necessary, an increased depth-of-field whenever the background illumination is expected to approach that of the primary subject. Specifically, when full flash is used, the background light level in the illuminated scene will naturally increase as a result. As such, portions of the background that were initially too dark and could remain out-of-focus will now become illuminated. When the background light level approaches that of the primary subject as might occur in an ambient fill situation, then the background will need to appear in focus to provide a pleasing image. This, in turn, increases the depth-of-field that must be provided by the lens to meet the scene requirements. Accordingly, whenever an ambient fill full flash situation arises in which the background light level of a scene is expected to approach the primary light level thereof, our inventive process changes, i.e. corrects, the baseline lens aperture setting to a value which will provide an increased depth-of-field to cover both the primary and background subjects in the current scene that is to be photographed with full flash. Currently available cameras simply do not appear to correct lens aperture settings, where needed, in full flash exposures to account for increased background illumination and a concomitant extended scene depth-of-field requirement.

Another feature of our invention is to automatically decide whether to use fill flash not just based only upon lighting contrast levels (primary to background lighting level) but also based upon whether an actual improvement in lighting contrast is likely to result. If image quality is not likely to improve regardless of the ambient scene lighting levels, then fill flash is simply not used. In contrast, automated cameras known in the art that provide automatic fill flash only consider the difference in lighting contrast between the primary subject and background, regardless of whether the resulting fill flash illumination will actually reduce the lighting contrast in a scene as intended. In these known cameras, if the ambient lighting contrast is sufficiently high, fill flash is simply fired even though the resulting flash illumination may degrade or, at the very least, not noticeably improve the resulting image of the scene. Image degradation can occur by reversing the lighting contrast levels in the scene if the primary subject is situated too close to the camera and hence receives an excessive amount of light. Little, if any, noticeable improvement in image quality can occur if the background light level and hence scene contrast is simply too high to be compensated by fill flash. Prior art cameras simply fail to: (a) consider whether either of these limit conditions will occur if fill flash is used, and (b) in turn, prevent the use of fill flash.

A related feature of our invention is the determination and use of an appropriate lens aperture setting for a fill flash exposure that provides sufficient depth-of-field to meet the scene requirements and, particularly, to properly expose the background portion of the scene. Currently available cameras simply do not take primary and background subject distances into account to determine appropriate lens aperture settings for use with fill flash illumination.

Another feature of our invention is to determine the distances, such as here primary and background subject distances, which are important in a given scene that is to be illuminated with full flash illumination and then choosing a baseline lens aperture setting that attempts to provide matched depth-of-field and depth-of-illumination for these distances. To the extent that the depth-of-field requirements can not be met for a given full flash exposure, then a baseline lens aperture is selected that increases the background exposure, even if the background will not be in focus, in order to advantageously prevent the primary subject from becoming "washed out", i.e. over-exposed, by the full flash illumination.

Another feature of our invention is selecting a shutter speed that minimizes the effects of camera shake and also doing so prior to selecting an appropriate lens aperture setting. In particular, in choosing the appropriate exposure parameters for an ambient exposure, a shutter speed is first selected based upon the reciprocal of the FOCAL_LENGTH of the lens in use multiplied by the value of a FOCAL_LENGTH_FACTOR. This shutter speed is used as a ambient baseline value that subsequently may be increased if extra system speed exists in a current photographic situation. Shake compensation appears to be ignored by the ISO/ANSI exposure standards.

A related feature of our invention is that once a shutter speed is selected to minimize camera shake, then our inventive process selects an appropriate lens aperture setting (f-number) that will provide a baseline exposure as well as one which meets the depth-of-field requirements of the scene and, based upon differences between these two aperture settings, assesses whether any extra system speed exists in a current photographic situation. This feature is repeatedly used throughout the entire inventive process. A lens aperture setting which satisfies the scene depth-of-field requirement is determined from the subject location and subject thickness, specifically using the distances of the primary and background subjects from the camera. Illustratively, if the primary subject were to be located either in front of a wall one foot (approximately 0.8 m) away from the camera (i.e. a relatively shallow subject thickness) or at infinity, a photographer would likely choose widely different lens aperture settings given the widely disparate depth-of-field requirements of these two scenes. Excessive depth-of-field with short primary subject distances or thin subject thicknesses would simply be wasted, while deep depth-of-field would be necessary with large subject distances. Once the extra system speed has been determined, the lens aperture and/or shutter speed settings are changed, if appropriate, from their baseline values to incrementally consume the extra system speed and, to the extent possible, improve resulting image quality, such as by providing additional depth-of-field over that required by the scene and/or a faster shutter speed to further reduce the likelihood of camera shake. Currently available cameras do not appear either to select shutter speed to compensate for camera shake, or to select such a shutter speed first and then determine the appropriate lens aperture setting and specifically, one based upon satisfying scene depth-of-field requirements.

A further feature of our invention is using available extra system speed to intentionally over-expose film by a preset amount as defined by and to exploit the exposure vs. quality characteristic of the film so as to achieve an improvement in image quality. This improvement becomes particularly pronounced in those films which exhibit a marked quality improvement with over-exposure. Currently available cameras which automatically choose exposure settings to achieve an ISO normal exposure simply do not provide these improvements even though most negative print films exhibit some degree of improved image quality with over-exposure.

BRIEF DESCRIPTION OF THE DRAWINGS

The teachings of the present invention may be readily understood by considering the following detailed description in conjunction with the accompanying drawings, in which.

To facilitate understanding, identical reference numerals have been used, where possible and appropriate, to denote identical elements that are common to various figures.

MODES OF CARRYING OUT THE INVENTION

After reading the following description, those skilled in the art will readily appreciate that our inventive system, and particularly the inventive process incorporated therein, can be utilized in any one of a wide variety of different imaging devices and, specifically, in illustratively any one of a wide variety of photographic cameras that collectively employ widely varying film formats so as to provide automatic exposure control and improved overall image quality. Furthermore, certain severable portions of our inventive process, as noted below, can be used in a camera, apart from the remainder of this process, in order to provide corresponding incremental improvements in overall image quality. Nevertheless, to simplify the following discussion, we shall describe our invention in the context of use with a 35 mm photographic camera.

Throughout the following discussion, we will repeatedly refer to "increasing" (or decreasing) shutter speed and "increasing" (or decreasing) lens aperture settings. To assure reader understanding, we now define increasing (decreasing) a shutter speed to mean changing the speed of the shutter in order to decrease (increase) the amount of time during which a shutter is open. In this regard, shutter speed increases whenever the numerical value of a denominator of a fractional value of the shutter speed increases, such as, for example, from 1/125th second to 1/250th second. We define increasing (decreasing) a lens aperture to mean changing the aperture to decrease (increase) the actual size of an opening provided by that aperture. In this regard, lens aperture increases whenever the numerical value of the lens aperture, as measured in f-stops, increases, such as, for example, from f/11 to f/22, and the corresponding physical size (opening diameter) of the aperture decreases.

A. Definition and Quality Limitations of an ISO Normal Exposure

Now, to fully appreciate the fundamental principles of our inventive process, the discussion will first address how an ISO normal exposure point is generally determined for film and then, through a number of illustrative examples, our inventive concept of "extra system speed". Thereafter, we will discuss how "extra system speed" can arise in a photographic situation and can best be used to improve corresponding image quality. Having done that, we will then address the specific hardware used to implement our inventive process followed by a detailed discussion of the entire inventive process itself.

Figure 1:
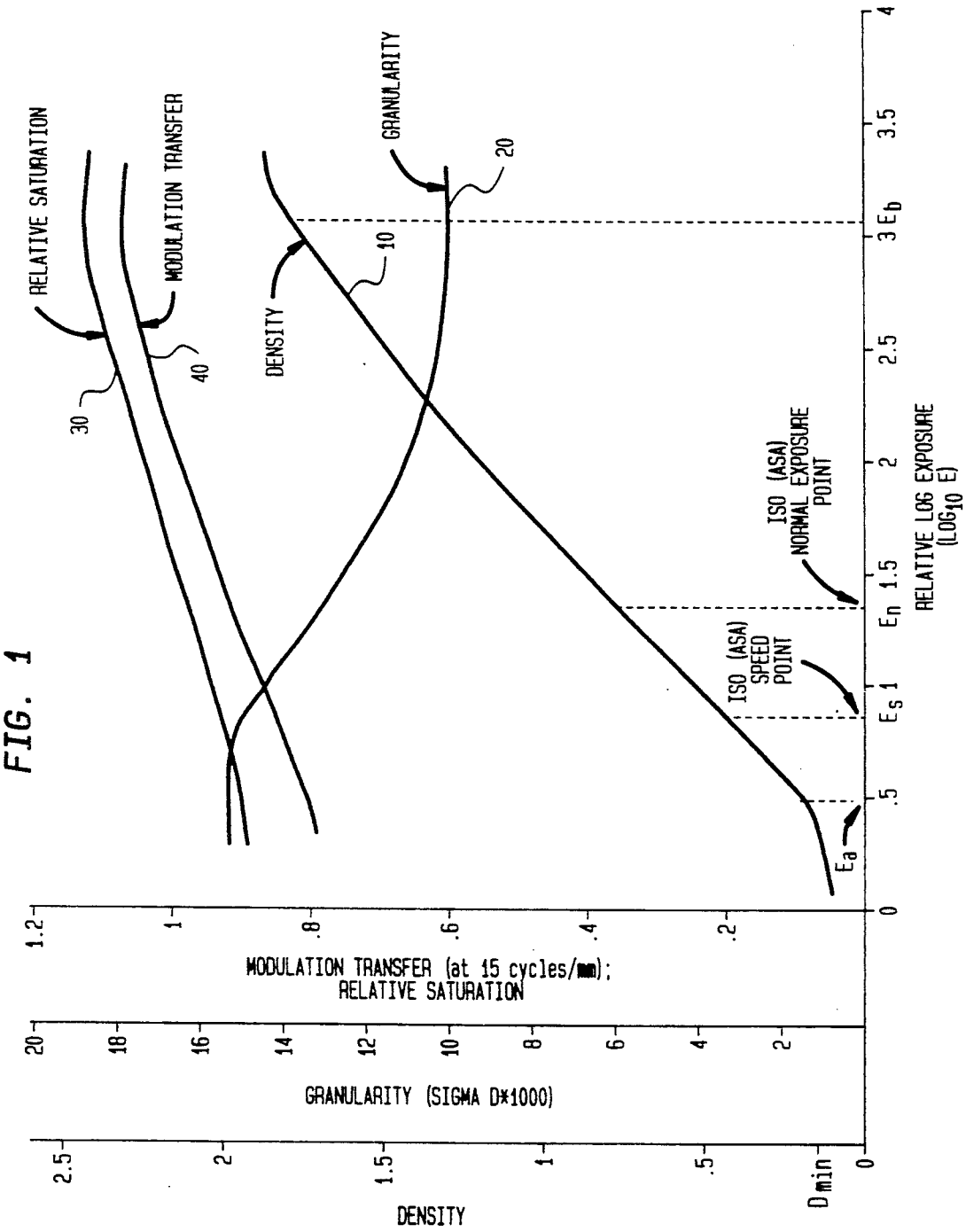
FIG. 1 depicts density vs. log exposure, granularity vs. log exposure, relative saturation vs. log exposure, and modulation transfer at 15 cycles/mm vs. log exposure characteristics for a single layer of a typical photographic color negative print film that could be used with our inventive process.

FIG. 1 depicts density vs. log exposure, granularity vs. log exposure, relative saturation vs. log exposure, and modulation transfer at 15 cycles/mm vs. log exposure curves 10, 20, 30 and 40, respectively, for a single layer of a typical photographic color negative print film that could be used with our inventive process. As shown by curve 10, density remains relatively constant at a minimum value, $D_{min}$, until the layer is exposed to a minimum amount of exposure, $E_a$. Exposure (E) is defined, under a standardized definition, as a product of the scene illuminance (I) by the time (t) during which the film is exposed to this illumination. Until a minimum exposure, $E_a$, is reached, the film layer is simply incapable of recording subject details or tonal differences. Hence, no latent image is formed at these exposure levels. At increasing levels of log exposure, density increases essentially linearly with increasing values of Log exposure. The linear range is bounded by exposure values $E_a$ and $E_b$. Given this curve, a normal exposure point defines the sensitivity of the film layer, measured in terms of exposure stops, that typically allows an entire representative scene, in terms of its tonal content, to fit onto the linear portion of the curve and is typically the lowest value of exposure that, as determined through sensitometry analysis of developed prints, produces the so-called "first excellent" quality print. As shown, this point is defined by exposure value $E_n$ that lies on the linear portion of the density vs. exposure curve 10. With such an exposure point, the mid-tone grays in a scene would produce an exposure associated with the ISO normal exposure point; while, lighter and darker tonal portions of the scene than the mid-tones would result in exposures that are located above or below the density produced at this point on the curve. The linear portion may extend illustratively two full stops below the ISO normal exposure point and up to eight stops above it. The ISO normal exposure point for this film as a whole can be derived as a function of the values of these exposure points for all the individual photosensitive layers in the film. The ISO (ASA) film speed is defined from the exposure, $E_s$, necessary to produce a specific value of image density on each layer of the film. The lens aperture and shutter speed settings, that will produce an exposure at the normal exposure point for a film layer, can be readily determined by substituting the values for the ISO (ASA) film speed and scene luminance into an ISO standard metering equation (specifically equation (1) discussed hereinbelow) and calculating a result. See, specifically, ANSI (American National Standards Institute) standard "American National Standard for Colour Negative Films for Still Photography—Determination of ISO Speed ANSI PH 2.27-1987" and ISO standard 588-1979, with the former ANSI standard adopting the latter ISO standard for determining film speed; and ANSI (American National Standards Institute) standard PH 3.49-1971 "American National Standard for General Purpose Photographic Exposure Meters" (re-affirmed in its entirety with no modifications in 1987 as ANSI standard PH 3.49-1987) [hereinafter referred to as ANSI standard 3.49-1987], particularly page 21 thereof for the ISO standard metering equation. Also, for a detailed description of density vs. exposure characteristics and film speed, the reader is referred to L. Stroebel et al, *Photographic Materials and Processes* (©1986: Focal Press; Boston, Mass.) and specifically pages 42-56 thereof, and D. M. Zwick, "The Technical Basis of Photographic Speed Determination or What is a Normal Exposure", *SMPTE Journal.* Vol. 88, No. 8, Aug. 1979, pages 533-537. For ease of reference, the pertinent standards will be referred to hereinafter as the "ISO/ANSI exposure standards" with an exposure defined by these standards being referred to hereinafter as synonymously either an ISO "standard" or "normal" exposure and the normal exposure point being referred to as the ISO normal exposure point. As can be seen from FIG. 1, the ISO normal exposure point occurs at higher density and exposure values on the log exposure vs. density curve than those for the ISO (ASA) speed point.

Furthermore, as a negative print film experiences increasingly large exposure values, a corresponding print produced from that film exhibits, as shown by curve 20, decreasing granularity over that which occurs at lower exposure values. Furthermore, as shown by curves 30 and 40, color rendition and modulation transfer may increase with increasing exposure.

B. The Existence of Extra System Speed and its Use in Improving Image Quality beyond the ISO Normal Exposure Once the ISO normal exposure point is determined for a given film from sensitometry analysis, the performance of that film is then characterized by a single number. Although value of the ISO normal exposure point does exhibit a certain exposure latitude, automated cameras known in the art merely rely on the single value given by the ISO normal exposure point to fully characterize the performance of a film and to determine appropriate lens aperture and shutter speed settings. As is evident by FIG. 1, this characterization results in a trade-off among tonal reproduction, sharpness, granularity and color rendition that does not always produce a print having optimum image quality. In fact, the highest quality print obtainable from the film may not necessarily be produced by exposing the film in accordance with the ISO/ANSI exposure standards. For example, as shown in FIG. 1, improved image detail (sharpness) and color rendition and decreased graininess can be had at excellent quality levels by intentionally over-exposing this particular film above that defined by the ISO normal exposure point.

Having recognized the shortcomings of basing lens aperture and shutter speed settings using film performance dictated only by its ISO normal exposure point—as often occurs in the art, we have developed the concept of "extra system speed" (which is also synonymously referred to herein as simply "extra speed") to define those photographic situations where image quality can be improved beyond that produced by exposure settings defined by the ISO (ASA) speed. In accordance with our inventive process, each photographic situation, i.e. including the scene that is to be photographed, the film being used, and the camera (including a lens and, where employed, auxiliary scene lighting such as that produced by a flash unit), is assessed to determine whether "extra system speed" exists for this situation and, if so, how that "extra system speed" can be best used to effectively improve the resulting image quality.

We define "extra system speed" as simply the speed (measured in terms of log exposure) that is available in the photographic system (including the camera, lens, film and, where used, auxiliary lighting—e.g. a flash unit) beyond the "system speed". The "system speed" is the amount of film speed which is necessary to satisfy the requirements of the scene ("standard scene requirements") that is to be currently photographed. In particular, the system speed is that amount of exposure, as measured in terms of log exposure, that would typically be required by use of the so-called ISO/ANSI exposure standards to provide an ISO normal exposure thereof of the current scene.

We have found that where the available speed in the photographic system just meets that required by the scene, corresponding initial ("baseline") exposure settings (e.g. lens aperture and shutter speed) and, where appropriate, flash parameters would have been selected through use of our inventive process to photograph the scene such that the shutter speed would likely be sufficiently fast to substantially eliminate any adverse affects of camera shake on the resulting photographed image while the size of the lens aperture would likely provide sufficient depth-of-field in the photographed image to fully cover the thickness of the subject(s) in the scene. These exposure settings would result in a picture that has an exposure and quality level at least equal to which occur at the ISO normal exposure point. Where "extra system speed" exists, i.e. an incremental amount of system speed beyond that which is required by the scene, that extra system speed can be used to modify the exposure settings to further improve image quality, such as for example and as discussed in full detail below, by: intentionally over-exposing the film—where appropriate, choosing a faster shutter speed or smaller lens aperture size than that required by the ISO/ANSI exposure standards or, in a flash situation, throttling down the flash output power and/or employing bounce and spread full flash illumination.

At this point, the concept of extra system speed can be clearly understood by considering three different simple illustrative examples of photographic situations where extra system speed exists and another such example where it does not exist.

First, consider a case where a film having an ISO (ASA) speed of 100 is to be used to capture a scene having a light level of approximately 250 foot-lamberts. This level approximately matches that which typically occurs on a cloudy day. Given these amounts and through use of a well-known "sunny 16 rule of thumb" (governed by equation (1) herein and specifically as discussed on page 55 hereinbelow) the exposure settings for an ISO normal exposure can be readily calculated. Specifically, the exposure associated with scene illumination that occurs on a typical sunny day, i.e. 1000 foot-lamberts, would be that which occurs with an f/16 lens aperture and a shutter speed equal to the reciprocal of the ISO (ASA) speed, i.e. 1/100th second. However, the ambient scene lighting is not 1000 foot-lamberts, but instead 250 foot-lamberts. This means that the scene lighting is actually one fourth as bright as that on a sunny day upon which the "sunny 16 rule of thumb" is based. Inasmuch as one stop of exposure, which provides a doubling or halving of light intensity equals a change of 0.3 as measured in $\log_{10}$ exposure, then a quartering of the light level corresponds to a decrease of 0.6 in $\log_{10}$ exposure or two stops less. This entails, for example, quadrupling the exposure time or quadrupling the exposure intensity. Inasmuch as exposure intensity is proportional to the area of the lens opening which itself is a squared function of the radius of the opening, then a difference of a single f-stop in the size of the lens aperture will accordingly double or halve the light intensity. As such, photographing a scene on a cloudy day at 250 foot-lamberts requires, at a shutter speed of 1/100th second, a lens aperture of f/8 (i.e. two stops below f/16). Therefore, the necessary exposure settings would be 1/100th second for shutter speed and an f/8 lens aperture. Given these settings, assume the subject being photographed is formed of two people, the first situated approximately 6 feet (approximately 1.8 m) from the camera lens and the second situated at approximately 12 feet (approximately 3.7 m) from the camera lens. Now, using the f-number and the focal length of the lens, the depth-of-field can be determined. For purposes of the example, assume that for the lens in use at an f/8 aperture, the depth-of-field extends over a range of from 5 to 15 feet (approximately 1.5 to 4.5 m) from the camera. Since the depth-of-field extends from a distance slightly in front of the first person to a distance behind the second person, the entire subject lies within the depth-of-field provided by the lens and the photographed image of both people will be in focus. Also, assume that subject motion or camera shake will not cause any noticeable image blur at this shutter speed. Therefore, the exposure settings of 1/100th second for shutter speed and an f/8 aperture would be sufficient to meet the scene requirements and hence provide sufficient system speed necessary to photograph the subject on a cloudy day. Now, at this point, assume that instead of using ISO (ASA) speed 100 film, ISO (ASA) speed 400 film is to be used. This latter film only requires ¼ of the available light needed by the ISO (ASA) 100 film to provide the same exposure density on a negative. This allows use of faster shutter speeds or decreased lens apertures. Specifically, if the exposure settings defined by the ISO/ANSI exposure standards were to be simple-mindedly followed as occurs in automated cameras known in the art, then, if the shutter speed were kept constant at 1/100th second, quadrupling the available film speed would necessitate that the lens aperture be decreased by two stops, i.e. from f/8 to f/16. At an f/16 lens aperture, the depth-of-field would increase from 5 to 15 feet to illustratively 3 to 30 feet (approximately 0.9 to 9 m). Though the depth-of-field has dramatically increased to well beyond that required by the scene to obtain an ISO standard exposure, the additional depth-of-field is simply not necessary for this scene. Inasmuch as the scene requirements would all be met at a shutter speed of 1/100th second and an f/8 lens aperture, advancing the lens aperture by two stops to f/16 to obtain additional depth-of-field will not yield a noticeable improvement in image quality in this photographic situation. The extra system speed, being the difference in log exposure between that which is currently available and that which the scene actually requires, as dictated typically by the ISO/ANSI exposure standards, amounts to two stops in this situation. Since image quality is affected by a variety of parameters, only one of which is depth-of-field, the two stops of extra system speed can be used in another way, one that is likely in this case to actually improve image quality. For example, if, on the one hand, the ISO (ASA) 400 speed film exhibits a noticeable quality improvement with over-exposure, e.g. decreasing graininess with increased sharpness and color rendition, then the 1/100th second shutter speed and the f/8 aperture settings could be used to retain the required depth-of-field but the film would be intentionally over-exposed by two stops to improve image quality over that which would result from an ISO normal exposure. If, on the other hand, the film does not exhibit an quality improvement with over-exposure, then the two stops of extra system speed could be used, as described below, in a different manner to improve image quality, such as by illustratively using a faster shutter time in order to further reduce image blur attributable to camera shake.

In essence, rather than merely providing those exposure settings, as occurs in the art, that yields an ISO normal exposure (i.e. intensity multiplied by exposure time), our inventive process specifically relies on (a) determining the initial exposure parameters (including exposure settings and, where appropriate, flash parameters; all of which are hereinafter collectively referred to as being "exposure parameters") necessary to provide a baseline, typically an ISO normal exposure, of a scene to be photographed; (b) ascertaining corresponding exposure parameters that actually meet the scene requirements, such as, e.g., camera shake and required depth-of-field; (c) assessing, in response to differences between the initial and corresponding exposure parameters, whether any extra system speed exists and, if so, the amount of extra system speed that is available for use in photographing the scene; and (d) finally, where possible, consuming that extra system speed in a pre-defined manner—specifically using a prioritized incremental scheme—to vary the baseline exposure parameters in order to provide an exposure of the scene that has a level of quality which is at least equal to and, in many instances, significantly improved over that which would be obtained using the initial, i.e. ISO normal exposure, settings. Our inventive process handles ambient, fill and full flash lighting conditions. The specific manner through which the extra system speed is utilized to improve image quality is described in detail below in conjunction with the operational diagrams depicted in FIGS. 3-14. Thus, in stark contrast to that which occurs in automated cameras known in the art, our inventive system violates the ISO/ANSI exposure standards, where necessary, to set exposure parameters (including though not limited to lens aperture and shutter speed and, where appropriate, flash parameters) at values that actually improve image quality over that resulting from use of the ISO/ANSI exposure standards and resulting ISO normal exposure values.

Now, consider two additional examples that illustrate situations where extra system speed exists. Assume for both of these examples that 135 format ISO (ASA) speed 100 print film is being exposed to form negatives. Also assume, that 3½" by 5" (approximately 8.9 cm by 12.8 cm) prints will be produced from these negatives with a blur circle criteria on a negative of 0.002" (approximately 0.0051 cm).

For the first of these two examples, assume that a 50 mm lens is being used to capture an image of a brightly sunlit scene that has a shallow depth-of-field. Specifically, the primary subject is located 8 feet (approximately 2.4 m) and a background subject is located 13 feet (approximately 4 m) from the lens. The primary and background light levels are both 1000 foot-lamberts. Here, extra system speed will arise from the shallow depth-of-field requirements of the scene over the depth-of-field provided by the ISO lens aperture setting associated with the "sunny 16 rule of thumb". In particular, the slowest usable shutter speed to avoid image blur attributable to camera shake for a given lens is often taken in the art, through use of a standard rule of thumb, to be equal to the reciprocal of the focal length of the lens. As such, a 100 mm lens would require a shutter speed equal to or faster than 1/100th second, a 200 mm lens would necessitate a shutter speed equal to or faster than 1/200th second and so on for other lenses. Accordingly, the slowest shutter speed that can be used here is 1/50th second. Since a photographer may just barely be able to hold a hand-held camera perfectly still for 1/50th second, this shutter speed is often multiplied by a safety factor, i.e. a camera shake factor, to safely increase the shutter speed to a value that is not likely to be susceptible to noticeable camera shake. Using an illustrative camera shake factor of 0.83, the shutter speed can be calculated as 0.83 times the reciprocal of the focal length of the lens or $0.83(1/50) = 1/60$ second. Given the desired scene thickness and well-known depth-of-field calculations, an f/8 lens aperture will provide sufficient depth-of-field to cover the primary and background subjects in the scene. Note that the "sunny 16 rule of thumb" would necessitate use of an f/16 lens aperture which, in turn, would provide excessive depth-of-field for this scene. The extra depth-of-field would be unnecessary and would not likely improve image quality over that obtainable through use of an f/8 aperture. From the ISO/ANSI exposure standards, specifically that embodied in equation (1) discussed hereinbelow, the shutter speed of 1/60 second and an f/8 aperture would result in an ISO normal exposure for a scene that provides 150 foot-lamberts of illumination. However, 1000 foot-lamberts actually exist in the current scene. Accordingly, the extra system speed can be calculated as the log of the ratio in scene illumination between that which is available and that which is required to produce an ISO normal exposure, i.e. here $\log(1000/150) = 0.82/0.3 = 2\frac{3}{4}$ stops of extra system speed. This extra system speed can be used in any one or more of a number ways, as discussed in detail below, to improve image quality such as, for example, to further increase the shutter speed in an effort to further reduce the likelihood that image blur resulting from camera shake will occur in photographing the current scene.

For the second of these two examples, assume a 35 mm lens is being used with a focal plane shutter and ISO (ASA) speed 400 film to capture an image taken with full flash illumination. Here, the subject is located 4 feet (approximately 1.2 m) from the camera lens. Ambient scene lumination is typically 1 foot-lambert. A flash unit having a guide number of 64 is used. The lens being used has a depth number (as defined below in detail) of 32. In this example, extra system speed arises from having extra flash power, i.e. producing excess depth-of-illumination, than that needed to meet the depth-of-field requirements of the scene. Specifically, with full flash photography, as explained in detail below, a lens aperture setting should ordinarily be selected that provides a depth-of-field that matches the depth-of-illumination provided by the flash unit. In this regard, selecting a lens aperture that provides a depth-of-field that is too narrow will not capture the entire subject thickness with equal sharpness throughput the subject. Alternatively, selecting a lens aperture that provides a depth-of-field that is greater than the depth-of-illumination provided by the flash unit will waste system speed. In this instance, portions of the background of the image would be in sharp focus due to the depth-of-field provided by the lens; however, due to insufficient flash illumination, these portions will simply be black. As such, the excessive depth-of-field provided by the lens would be wasted. Given the depth number of 32, a lens aperture setting that provides depth-of-field equal to depth-of-illumination for a subject located at 4 feet is simply given, as explained in detail below, as the value of the depth number divided by the subject distance, i.e. $32/4 = f/8$. However, the guide number is 64 which would necessitate a lens aperture setting for an ISO normal exposure given by the value of the guide number divided by the subject distance, i.e. $64/4 = f/16$. Accordingly the amount of extra system speed that is available here is the log of ratio of the exposures which equals the log of the ratio of the square of the lens aperture settings, i.e. $\log(16/8)2 = 2$ extra stops of system speed. Given this guide number, automated cameras known in the art would needlessly increase the lens aperture setting to f/16 which would generally yield little, if any, improvement in image quality for the current scene being photographed with full flash illumination. However, through our inventive method, image quality can be noticeably improved by utilizing the available extra system speed in any one or more of a number of other ways—rather than just providing additional depth-of-field, as discussed in detail below, such as spreading or bouncing the flash illumination to provide more even scene illumination and minimize well known "red-eye" effect, intentionally over-exposing the film—as appropriate, or even throttling down the flash power as appropriate.

Having discussed three typical photographic situations where extra system speed exists—which collectively and generally represent the majority of favorable conditions under which photographs are typically taken, let us now address the illustrative photographic situation where no extra system speed exists. Assume that ISO (ASA) 25 speed film (such as EKTAR 25 film manufactured by Eastman Kodak Company which also owns the registered trademark "EKTAR") is being used to photograph a scene at 250 foot-lamberts with a 100 mm lens. Using an ANSI exposure standard, given by, for example, the "sunny 16 rule"—specifically described in ANSI standard "American National Standard for Photography—Photographic Exposure Guide ANSI 2.7-1986", the exposure settings for this film and light level would be a shutter speed of 1/25th second and a lens aperture setting of f/8. Unfortunately, these settings would be totally unusable owing to the high likelihood that the entire resulting image would be blurred by camera shake. Specifically, a professional, let alone an amateur, photographer would not be able to steadily hold a hand-held camera with a 100 mm lens for as long as 1/25th second. Accordingly, while the shutter was open, the photographer would, at some point, be likely to shake the camera and impart noticeable and objectionable image blur to and throughout the entire photograph. As such, the shutter speed must be increased to a value at which camera shake does not cause noticeable image blur. Accordingly, a shutter speed of at least illustratively 1/100th second would likely be chosen. In this regard, as noted above, the slowest usable shutter speed to avoid image blur attributable to camera shake for a given lens is often taken in the art, through use of a standard rule of thumb, to be equal to the reciprocal of the focal length of the lens. Accordingly, selecting a shutter speed of 1/100th of a second, where 1/25th second is required to yield a proper exposure, would necessitate that the lens aperture be increased by two stops from f/8 to f/4 to obtain a constant level of exposure on the film. Now, with these settings—1/100th second for shutter speed and an f/4 lens aperture, the exposure requirements of the scene have been met. As to the depth-of-field, assume that a background portion of the scene, e.g. Niagara Falls, exists at a large distance from the camera, i.e. at so-called "infinity", and a foreground portion, e.g. a person of interest, exists at only 6 feet (approximately 1.8 m) from the camera. An f/4 lens aperture will simply not provide sufficient depth-of-field to cover the entire scene. In fact, the proper depth-of-field may only be satisfied through use of an f/22 or smaller lens aperture—which would necessitate use of a very long shutter time. This means that five more stops of system speed (from f/4 to f/22) are required to meet the scene requirements in this situation. Consequently, insufficient system speed would exist; in fact, in this case, the extra system speed would be a negative five stops. Unfortunately, with ISO (ASA) 25 speed film, use of a wide lens aperture on a lens with a relatively large focal length runs the very serious risk of causing camera shake induced image blur which, in turn, would ruin the entire image. In view of this, the shutter speed must remain at 1/100 second thereby effectively limiting the lens aperture sizes to that which provide a relatively shallow depth-of-field. Consequently, given the negative extra system speed in this situation and the attendant inability to improve all attributes of the picture, our inventive process optimizes the most important single attribute in the picture: sharpness of the foreground subject. This is accomplished by selecting a shutter speed that prevents image blur. In this manner, our process assures that the foreground of the scene will be in-focus even though the background will be out-of-focus and thus blurred. Moreover, if the film being used produces a reasonably good quality image when under-exposed, our inventive process might, depending upon the actual exposure characteristics of the film, tradeoff some exposure, by selecting a slightly smaller lens aperture size, such as by a half stop, in order to obtain a slightly increased depth-of-field which incrementally improves the overall image quality. Even though as here the scene requirements are more demanding than the photographic system (here including, for example, the film, camera lens, lens focal length, lens aperture and shutter speed) can meet, our inventive process nevertheless selects those photographic parameters which assure that the more important image attributes, such as the foreground subject being in-focus, are met even if the quality of secondary image attributes degrades in order to still provide a more pleasing picture than that obtainable using the ISO normal exposure values. Fortunately, this example is an extreme condition, with the vast majority of pictures being taken under far more favorable conditions, such as any of the three typical conditions discussed above.

Our inventive process is ideally (though not exclusively) suited for use with a film that possesses a relatively broad latitude with respect to exposure, and particularly a film which has a strong exposure dependent quality characteristic and exhibits increased quality with over-exposure. Through the synergy obtainable between our inventive process and the response of the film, our inventive process selects appropriate exposure settings(and, where appropriate flash parameters)—regardless of the ISO/ANSI exposure standards—that, to the extent possible, meet the scene requirements and substantially deliver the best quality image that the film is capable of providing, which overall, due to the inherent limitations of these standards, will yield a noticeable improvement in quality over that resulting from using the ISO normal exposure values. As shown in FIGS. 3-14 and discussed in detail below, our process relies on manipulating data which is readily available to the photographic system regarding the film, the current scene and the camera, lens and flash unit through a network of "experiential" (knowledge) based rules that are implemented in relatively simple, inter-related and pre-defined processing operations using a microcomputer system in order to automatically select the proper exposure settings and, where appropriate, flash parameters. In view of the relative ease and cost-effectiveness with which these operations can be implemented for real-time operation within a camera, use of these operations is clearly preferred over performing a time consuming multi-dimensional optimization of relatively complex equations that predict, inter alia, saturation, modulation transfer, granularity and density characteristics that will occur in a photographed image.

C. Hardware Description

Figure 2:
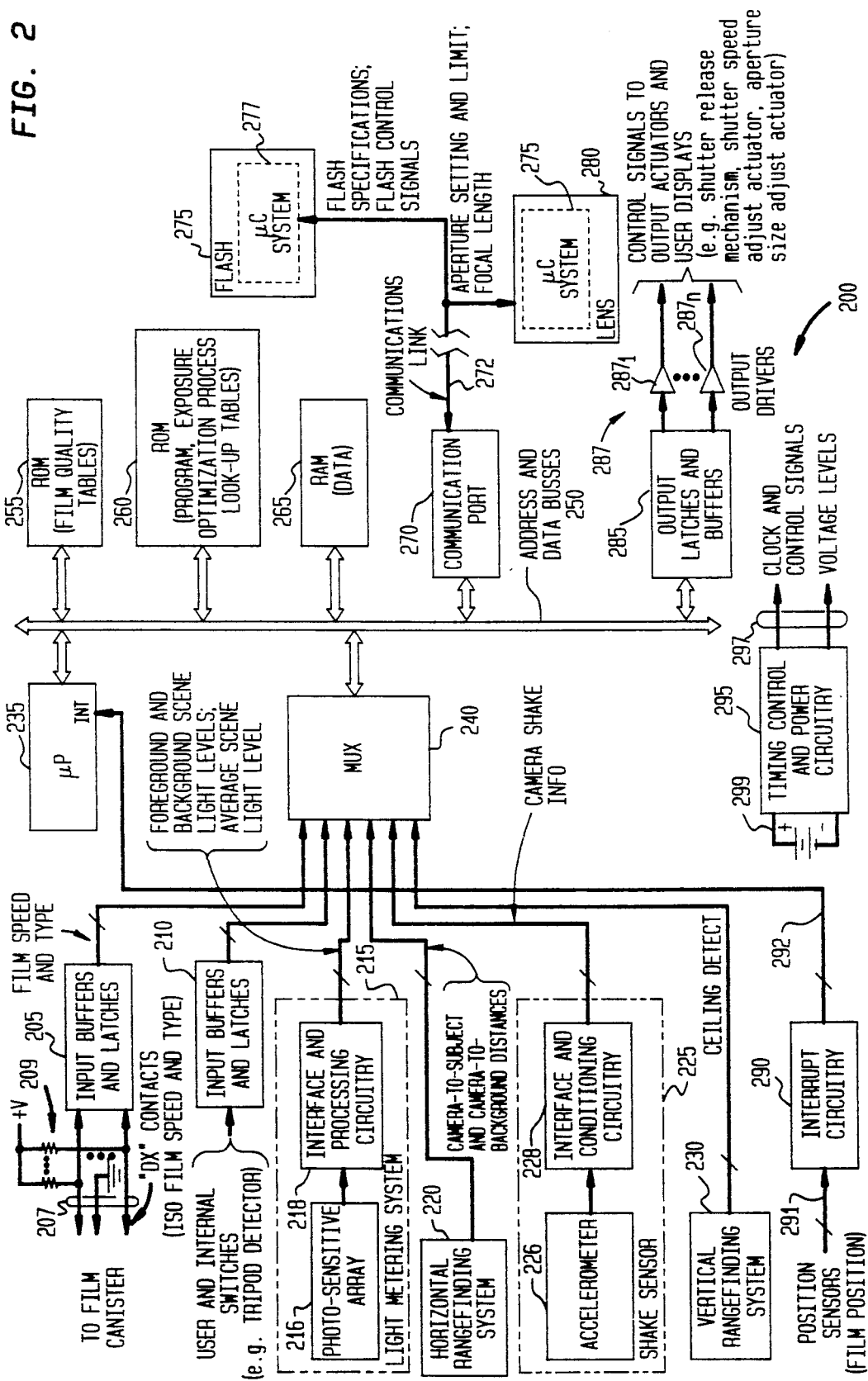
FIG. 2 depicts a high level hardware block diagram of a preferred embodiment of the circuitry that implements our exposure control inventive process in a photographic camera.

Now, with this above discussion in mind, FIG. 2 shows a high level hardware block diagram of a preferred embodiment of the circuitry that implements our inventive process in a photographic camera. Any film format and nearly any, if not all, cameras, that employ a fixed focal length lens, a zoom lens and/or any one of a number of inter-changeable lenses, and an internal or an external-detachable flash unit (or even no flash unit for simplified cameras designed for use in ambient light situations), can be used with our inventive process. Nevertheless, for purposes of illustration and to simplify the following discussion, the process and its implementing hardware will now be specifically discussed in the context of use with a 35 mm camera having inter-changeable lenses and an external-detachable flash unit. The required functionality inherent in the camera, lenses and flash unit will also be discussed. Appropriate mention will be also made of each severable portion of the process and the beneficial affect achievable through use of that portion in an appropriate camera.

Specifically, as shown in FIG. 2, circuitry 200 is formed of a microcomputer system (also referred to herein as the "camera microcomputer" system) that basically contains microprocessor 235, multiplexor 240, read only memories (ROMs) 255 and 260, random access memory (RAM) 260, communication port 270, and output latches and buffers 285; all inter-connected through address and data busses 250. This system also contains interrupt circuitry 290 and timing, control and power circuitry 295. In addition, specialized input circuitry is connected to the microcomputer system and is formed of input buffers and latches 205 and 210, light metering system 215, horizontal rangefinding system 220, shake sensor 225 and vertical rangefinding system 230. Output latches and buffers 285 provide various digital control signals through drivers 287 (collectively formed of individual output drivers $287_1, \ldots, 287_n$) to control various output actuators and user displays (not specifically shown but well-known) situated within the camera. Consistent with design considerations well-known in the art, the specific implementation of circuitry 200 can vary widely from that shown in FIG. 2 without adversely impacting the performance of our inventive process.

ROM 255 stores a number of pre-defined tables that provide film quality vs. exposure parameters for a variety of films of different speeds and types that can be used with the camera. During execution of our process by the microcomputer system, one of these tables is selected and then accessed, using the amount of available extra system speed (either positive or negative) and as described in detail below, to determine, in a current photographic situation, whether resulting image quality can be improved through intentional under- or over-exposure and the variation in exposure required therefor.

ROM 260 stores a computer program which governs the operation of the entire camera microcomputer system as well as implementing our inventive process, depicted in FIGS. 3-14 and discussed in detail below. In addition, the program may also contain suitable routines to control the operation of various automated camera functions apart from automatic exposure control, such as illustratively automatic load and film re-winding operations, that are not relevant to the invention and hence will not be discussed herein. RAM 265 provides a temporary store for data that occurs during execution of the program residing in ROM 260.

Communication port 270 enables the camera microcomputer system, specifically including microprocessor 235, to communicate, over communication link 272, with companion microcomputer systems 277 and 282 respectively located within flash unit 275 and lens 280. As noted above, both the lens and the flash unit are detachable from the camera. A photographer can mount any one of a variety of compatible lenses, of differing focal lengths—either fixed focal length or zoom lenses, to the camera. Likewise, any one of a variety of different compatible flash units, having differing so-called guide numbers, can also be mounted to the camera. Inasmuch as the photographic characteristics vary from lens to lens and from flash unit to flash unit, the microcomputer system situated in each lens or flash unit stores pre-defined constants which respectively specifies the photographic properties of that lens or flash unit: specifically, for each lens, stored lens specifications include, for example, focal length and maximum and minimum lens aperture values; and for each flash unit, stored flash specifications include illustratively guide number, flash shutter speed and minimum flash synchronization (sync) speed. Link 272, which can be either bit-serial or preferably parallel, is well-known in the art and is typically formed of appropriate wiring that is internal to the camera body and which terminates at appropriate pins or a well-known connector that matingly engages with similar pins or connectors on the particular lens and flash units as they are mounted to the camera body. During execution of our inventive process, the camera microcomputer system interrogates the companion microcomputer systems over link 272 to obtain the values of each of the parameters, as defined below, that collectively forms the lens and flash specifications. In addition, communication port 270 also supplies various control signals to the microcomputer system within flash unit 275 in order to set a flash spread angle, set the duration of the flash and to fire the flash unit. The flash unit contains appropriate actuators and associated circuits (well-known and not shown) to perform these operations. The flash unit can also contain vertical rangefinding system 230, discussed in detail below, for use in direct and indirect flash exposures for detecting the presence of a reflective surface and accordingly changing the light output of the flash unit to vary the exposure. Such a flash unit is disclosed in co-pending United States Patent Application entitled "Flash Systems Incorporating Indirect Reflecting Surface Detector" filed Dec. 26, 1989, assigned Ser. No. 07/457,081 and which is owned by the present assignee and is incorporated by reference herein.

Output latches and buffers 285 are set by microprocessor 235 to supply appropriate digital output signals, through output drivers 287, to various actuators (for example solenoids, linear motors and/or stepper motors) or displays to invoke a desired photographic operation, such as illustratively setting the shutter speed, adjusting the lens aperture and/or releasing the shutter, and to provide suitable status and exposure information for display to the photographer using a display (also well-known and not shown) visible through the viewfinder and/or flush mounted on a external surface of the camera body.

Interrupt circuitry 290 is used in conjunction with a well-known position sensor to determine the current aperture setting of the lens. This sensor (not specifically shown) generates a pulse each time an aperture ring on the lens is rotated through an incremental amount, such as half an f-stop, to vary the size of the lens aperture. Similar pulses are also provided through a second position sensor (also not shown) as the optical elements within the lens are axially moved to effect focusing. Each such pulse is routed, via separate leads within leads 291, to interrupt circuitry 290 which generates a suitable interrupt pulse, via lines 292, to microprocessor 235. These sensors can be located either within the lens with the pulses being routed over electrical connections associated therewith or within the camera body with suitable mechanical linkages running between the lens and the sensors. In response to each interrupt pulse, microprocessor 235 temporarily suspends normal program processing and then executes an appropriate interrupt service routine to update a current count of the corresponding position pulses to track the current aperture and focus settings for the lens. Inasmuch as the sensors themselves, their operation and their mechanical configuration are well-known in the art, they will not be discussed any further herein. Other inputs (not specifically shown), such as those related to the occurrence of well-known pre-defined fault and/or limit conditions associated with operation of the camera, can also be applied, via circuitry 290, to generate appropriate interrupts to the microprocessor and elicit proper responses therefrom.

Timing, control and power circuitry 295 generates and supplies, over leads 297, appropriate clocking and control signals and voltage levels that are needed to control and power the operation of the camera microcomputer system and its associated circuits. Power is supplied to circuitry 295 through battery 299.

The remaining discussion regarding FIG. 2 will address the various scene and film sensors that provide input values to the camera microcomputer system for use by our inventive process. These sensors are well-known in the art and can be implemented in any one of a number of diverse ways. The specific implementation of each of these sensors does not form part of our invention. Accordingly, to simplify the following discussion, each of these sensors will be primarily discussed from the standpoint of its main functional attributes.

Specifically, contacts 203, connected to input buffers and latches 205 through leads 207, abut against pre-defined metallic patterns, the well-known "DX" code, situated on the outside of a film canister loaded into the camera and, from the inter-connection of the patterns, read the "DX" code associated with the film contained within the canister. This code is stored within buffers and latches 205 and are applied through associated leads to an input of multiplexor 240 for subsequent use by microprocessor 235. The "DX" code provides the ISO (ASA) film speed and film type (e.g. reversal or negative type) for the film. Resistors 209 serve as "pull-up" resistors to provide appropriate high logic levels for open circuit contacts. Input latches and buffers 210 store the current state of various user switches, such as knob settings, and switches internal to the camera, such as limit switches and a tripod detector, and apply the state information, via corresponding leads, to an input of multiplexor 240 for subsequent use by microprocessor 235.

Light metering system 215, containing photo-sensitive array 216 connected to interface and processing circuitry 218, provides digital data representing the lumination, either seen through a separate viewfinder or through the lens, of the foreground and background portions of a current scene as well as the average scene lumination. Array 216 is typically a pixel based array sensor, such as a charge coupled device (CCD) sensor. Circuitry 218 processes the intensity values from pre-defined pixel regions in the scene to determine the lumination of a foreground portion of the scene in order to yield "foreground light level" and the remaining portions of the scene, which are assumed to be background in order to yield "background light level" and applies the resultant values over corresponding leads to an input to multiplexor 240. The foreground and background portions of the scene are the same as those identified as such by horizontal rangefinding system 220. Circuitry 218 averages the intensities for a pre-defined number of pixels distributed throughout the array to yield a value for the average scene light level.

Horizontal rangefinding system 220, which can rely on use of, for example, a well known through-the-lens (TTL) phase detection system which determines the subject-to-camera distances for various portions of the scene and applies digital data representing these distances over corresponding leads to an input of multiplexor 240. The foreground is assumed as that portion of the scene where the measured subject-to-camera distance is the least; while the remaining areas in the scene are taken as containing the background.

Shake sensor 225 provides digital data representing the amount of instantaneous camera shake that is occurring. This sensor is illustratively formed of accelerometer 226 connected to interface and conditioning circuitry 228. Circuitry 228 provides well-known buffering, filtering and scaling functions. The output of shake sensor 225 is applied, as camera shake information, over corresponding leads as an input to multiplexor 240 for subsequent use by microprocessor 235. Other appropriate sensors, such as a CCD based image sensor, which is able to detect movement in a scene, and its accompanying circuitry could be readily substituted for accelerometer 216 and circuitry 218.

Our inventive process also takes into consideration whether a surface (a "bounce surface") exists from which a flash of light can be bounced. If the camera is being held horizontally, this surface is typically a ceiling. Alternatively, if the camera is being held vertically, this surface is typically a wall. As such, circuitry 200 contains vertical rangefinding system 230, which can illustratively be a simple well known infra-red triangulation auto-focusing system, that provides an appropriate logic level (ceiling detect signal) indicative of the existence of an appropriate bounce surface. The rangefinder is situated in the camera such that its measurement transducer projects a beam(s) directed upward from the top of the camera. Depending upon cost and camera sophistication, the vertical rangefinding system could provide either binary (YESNO) type information, i.e. does a suitable bounce surface exist or not, or an actual distance measured from the top of the flash unit to the surface. Such distance information can be used for extremely precise exposure determination.

Multiplexor 240, operating under the control of microprocessor 235 and the control program stored within ROM 260, selects digital data from that generated by circuits 205, 210, 215, 225 or 230 and routes that data to busses 250 for subsequent processing by the microprocessor.

D. Process Description

Having described a preferred embodiment of the circuitry used to implement our inventive process, the discussion will now turn to addressing the process itself as shown in FIGS. 3-14. As notes above, our process relies on using knowledge based rules gained from statistical experiential data collected from historical analyses of a substantial number of photographs taken under varying conditions. These rules are embedded within our process into discrete processes and steps in terms of input parameters, forcing functions and output parameters, in order to quantify and manipulate individual aspects of the overall exposure control process. These processes and steps, in turn, are inter-related within our inventive process to yield a unified, substantially all encompassing, knowledge based, automatic exposure control process that endeavors, where possible, to replicate the performance of an expert photographer in situations where images of improved quality can be obtained beyond that resulting through use of ISO normal exposure settings.

The specific detailed manner in which our inventive process is implemented in software for execution within the camera microprocessor system is a matter of design choice by one skilled in the art given the cost-benefit tradeoffs, such as processor cost and sophistication, that are inherent in the design of an automated camera. In as much as any one of a wide variety of software designs will effectively implement our process and all such designs and accompanying low level code are readily apparent to anyone skilled in the art given the information presented in FIGS. 3-14, then, for simplification, the depiction of our inventive process in these figures and its accompanying discussion will remain at a relatively high level.

To facilitate understanding, our inventive process is depicted in FIGS. 3-14 in a series of high level operational diagrams that provide a top-down view of the process from general processes to specific steps that form each such process. Each process or step, represented by a circle containing a succinct description of that process or step, pulls data from a specific category of input photographic parameters; with the name of the specific category being shown enclosed within a box. Each such category contains one or more individual parameters. Where a category containing more than one parameter is associated with a process or step, the specific individual parameter in that category and which is applied to or produced by that step is also shown. Two classes of parameters are used: so-called "primitives" which are basic data values designated (both in the drawings and the ensuing discussion) by upper case (capital) letters and "non-primitives", designated (also in both in the drawings and the ensuing discussion) by lower case letters, which are each formed of a group of primitives. Each process shown enclosed within a "bold" circle is itself a primitive step in that no reference is needed to any lower level operational diagrams in order to fully comprehend the operation of that specific process.

Figure 3:
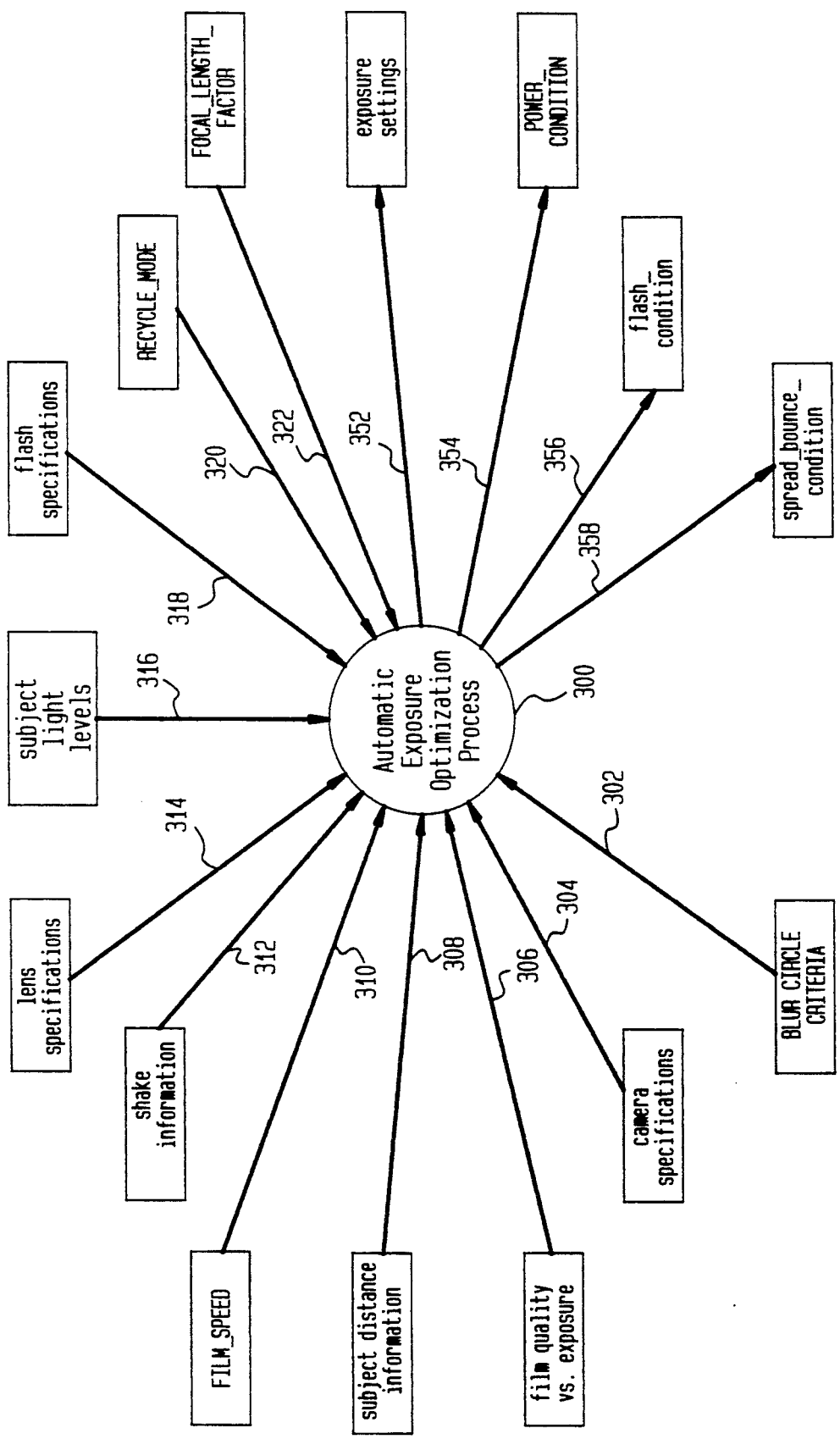
FIG. 3 depicts the categories of input and output parameters associated with our inventive exposure control process 300.

With this in mind, FIG. 3 depicts an overall operational digram of the input and output parameters associated with our inventive exposure control process 300. Specifically, as represented by lines 302, 304, 306, 308, 310, 312, 314, 316, 318, 320 and 322, the categories of input parameters applied to the process are respectively: BLUR_CIRCLE_CRITERIA, camera specifications, film quality vs. exposure information, subject distance information, FILM_SPEED, shake information, lens specifications, subject light levels, flash specifications, RECYCLE_MODE and FOCAL_LENGTH_FACTOR. Using these inputs, process 300 produces, as represented by lines 352, 354, 356 and 358, four categories of output parameters: exposure settings, POWER_CONDITION, flash_condition, and spread_bounce_condition.

Each of these categories will now be defined, as follows.

INPUT CATEGORIES

1. BLUR_CIRCLE_CRITERIA

The BLUR_CIRCLE_CRITERIA, also known as the so-called "circle of confusion", is defined as the diameter of a permissible blur circle, measured in mils (thousandths of an inch), that exists on a negative. If the diameter of the blur circle is sufficiently small, such as 2 mills (0.002 inch or approximately 0.005 cm), the resulting image smear that exists within this circle will not be perceived by a viewer in a reasonable size enlarged print (typically 4X size) that is produced from the negative.

2. camera specifications

The camera specifications include the following parameters: K_FACTOR, shutter type and camera limits, all of which are defined as follows.

a. K_FACTOR

The K_FACTOR is a well-known empirical constant that is used in the ISO/ANSI speed calculations. Specifically, the value of this constant is given by the following ISO standard metering equation, as specified in the above-cited ANSI 3.49-1987 standard:

$$K = \frac{L \cdot S \cdot T}{A^2} \quad (1)$$

where:

K = the K_FACTOR;
L = the scene luminance, measured in foot-lamberts;

S = the ISO (ASA) film speed of the film currently in use;

T = the time during which the shutter is open; and

A = the lens aperture, as measured in f-number.

To conform this equation to the "sunny 16" rule, the value of the K_FACTOR is taken as approximately 3.91. The value of the K_FACTOR may be altered, as appropriate, to account for lens transmittance, lens flare or other camera specific light losses.

b. shutter type

The shutter type designates whether the shutter that is available for use in the camera is either PROGRAMMABLE or CONVENTIONAL. A programmable shutter is one in which the times to open and close the shutter, and the time during which the shutter is open as well as the size of its opening can be independently varied, either electronically or mechanically. Accordingly a sophisticated programmable shutter can be successively set to each one of a number of multiple independently variable lens aperture sizes during a single exposure. A simple programmable shutter, such as a slow opening shutter, may also be used. For a slow opening shutter, different apertures for flash and ambient portions of a single exposure are obtained by delaying a flash triggering signal until a specified shutter opening diameter has been reached so as to provide a flash aperture, with the shutter continuing to open until a desired ambient aperture is obtained. In a conventional shutter, the time during which the shutter remains open can vary, but only one aperture size is available during a single exposure.

In addition, though not specifically utilized in our process shown in subsequent operational diagrams, the shutter type can also specify the specific configuration of the shutter that is available for current use, i.e. whether the shutter is a focal plane shutter or a leaf shutter, or whether both a focal plane shutter and a leaf shutter are available in the camera for current use during a common exposure. A small measure of exposure control, particularly in flash situations, beyond that obtainable by our inventive process shown in the operational diagrams can be achieved by readily modifying the appropriate steps in our process to account for the shutter speed synchronization limitations and the differing exposure affect(s) of the available shutter configuration(s).

c. camera limits

The camera limits contain the shutter speed limits which are defined to be the MAXIMUM_SHUTTER_SPEED (i.e. the slowest shutter speed at which the shutter can operate) and the MINIMUM_SHUTTER_SPEED (i.e. the fastest shutter speed at which the shutter can operate) for the specific shutter contained within the camera.

3. film quality vs. exposure information

This category contains a set of empirically defined tables of exposure characteristics for the different film types that can be used in the camera; one table exists for each different film type. These tables are stored within ROM 255 shown in FIG. 2. Each table provides a profile, in terms of stops of extra system speed, that: (a) delineates the amount of extra system speed, in stops, from the total amount of extra system speed which is available (applied as an input value to the table), that is to be used to intentionally change the exposure of the film from the ISO normal settings in order to produce an improvement in image quality and (b) provides as an output value the amount of extra system speed that still remains for use by other techniques, as described below, to further improve image quality beyond over-exposure. In those situations where the input value for the extra system speed that is applied to the table is a negative value and the film provides an acceptable quality image with intentional under-exposure, then the resulting output extra system speed value produced by the table is typically less negative than the input value thereby facilitating the use of other techniques to improve image quality, such as use of a wider lens aperture for providing an expanded depth-of-field to cover additional subject thickness. An illustrative table is shown in Table 1 below:

TABLE I

ILLUSTRATIVE FILM QUALITY vs. EXPOSURE TABLE

| Extra System Speed In | Extra System Speed Out |
|---|---|
| −4 | −3.5 |
| −2 | −1.5 |
| −.5 | 0 |
| .5 | 0 |
| 1.0 | 0 |
| 2.0 | 0 |
| 3.0 | 1.0 |

The numerical difference between an input and its associated output value for any entry in the table specifies the amount of extra system speed that is to be consumed by intentionally changing the exposure of the film, by under- or over-exposure, from the ISO normal values. Since reversal film has a rather narrow exposure latitude, then nearly any deviation from ISO normal exposures for this film would tend to degrade resulting image quality. As such, intentional over- or under-exposure would not be used with such a film. Furthermore, the film quality vs. exposure table for reversal film would generally show no differences between the values of the extra system speed in and out. Accordingly, extra system speed would be used in different ways than intentionally over- or under-exposing the film in order to improve resulting image quality.

4. subject distance information

This category, depicted in FIG. 3, consists of two parameters: PRIMARY_SUBJECT_DISTANCE and BACKGROUND_SUBJECT_DISTANCE which respectively specify the distances from the camera to the foreground and background portions of the image being photographed. These distances are supplied, as discussed above, from horizontal rangefinding system 220 shown in FIG. 2.

5. FILM_SPEED

This category, shown in FIG. 3, consists of only one parameter, namely the ISO (ASA) speed of the film currently in use. The value of this parameter is read, as discussed above, from the "DX" contacts situated on the external surface of a film canister.

6. shake information

This category contains two parameters: the STANDARD_SHAKE_FRACTION and the BLUR_FROM_SHAKE which relate to image blur.

a. STANDARD_SHAKE_FRACTION

The STANDARD_SHAKE_FRACTION is defined as the allowable fraction of the BLUR_CIRCLE_CRITERIA that can result from camera shake. The value of this parameter will generally vary among different camera types and sizes and is set during camera manufacture based upon the camera shake that is expected to be generated by typical users of the camera.

A very light camera, such as a disposable camera, which is very susceptible to camera shake would require a relatively small value for the STANDARD_SHAKE_FRACTION. Alternatively, a relatively solid and heavy camera, such as a professional 35 mm camera, would is far less prone to camera shake would have a significantly larger value for the STANDARD_SHAKE_FRACTION. Furthermore, the value of this parameter could be set by a photographer through a potentiometer or other user accessible control. In this way, the parameter could be adjusted to conform to the ability of that specific individual to steadily hold the camera.

b. BLUR_FROM_SHAKE

The BLUR_FROM_SHAKE is the measured amount of camera shake that is actually occurring while an exposure is being made. As discussed above, this shake amount is measured and supplied to the camera microcomputer system by shake sensor 225 shown in FIG. 2.

To reduce implementation cost, shake sensor 225 and processing of all shake information or a portion thereof (such as real-time measurements of BLUR_FROM_SHAKE and its associated processing), as described in detail below, could be eliminated from our inventive process at the cost of a lessened degree of improved image quality attainable through the remainder of this process.

7. lens specifications

The lens specifications, noted in FIG. 3 and supplied to the camera microcomputer system by microcomputer system 282 depicted in FIG. 2 and located within the specific lens that is mounted to the camera, include the following parameters: aperture limits and FOCAL_LENGTH, both of which are defined as follows.

a. aperture limits

The aperture limits, noted in FIG. 3, contain the lens aperture size limits, defined as the MINIMUM_APERTURE and MAXIMUM_APERTURE for the specific lens mounted to the camera and respectively equal the smallest (the maximum f-number, i.e. the value of parameter MAXIMUM_F_NUMBER) and largest aperture openings (the minimum f-number, i.e. the value of parameter MINIMUM_F_NUMBER) that this lens can provide.

b. FOCAL_LENGTH

The FOCAL_LENGTH is merely the numeric value in millimeters of the focal length of this lens. If the lens is a zoom lens, then this value is that to which the lens is currently set.

8. subject light levels

This category consists of two parameters: the PRIMARY_SUBJECT_LIGHT_LEVEL and the BACKGROUND_LIGHT_LEVEL which, measured through light metering system 215 as shown in FIG. 2 and discussed above, provides the intensity of lumination of the foreground and background portions of the scene that is currently being photographed.

9. flash specifications

The flash specifications, noted in FIG. 3, include the following parameters: AMBIENT_FILL_APERTURE, FLASH_SHUTTER_SPEED, FLASH_FALL_OFF_LIMIT, TRIP_POINT, MINIMUM_FLASH_SYNC_SPEED, FILL_FLASH_COMPENSATION_FACTOR, energy_saving_flash, spread bounce information, depth number information and GUIDE_NUMBER; all of which are defined as follows.

a. AMBIENT_FILL_APERTURE

The value of this parameter, a limit point, defines the maximum size of the lens aperture that can be used to fill in the ambient lighting, i.e. the lens aperture size that is available to build up the background light level, as the shutter remains open after a full flash has been fired. This value is not necessarily the lens aperture size that is needed to fully bring up the ambient lighting in a full flash situation, but rather is the maximum lens aperture size that is currently available for use with full flash. In certain photographic situations, such as in moonlit or very low-light scene, the ambient lighting may be so low that the AMBIENT_FILL_APERTURE value is simply insufficient, absent a very long time exposure, to properly and completely bring up the ambient lighting.

b. FLASH_SHUTTER_SPEED

The value of the FLASH_SHUTTER_SPEED parameter is a default shutter speed that is chosen for use in photographing a current scene using a flash exposure.

c. FLASH_FALL_OFF_LIMIT

The FLASH_FALL_OFF_LIMIT parameter specifies a range of distances from the camera at which the flash illumination eliminates detail from the image. Specifically, if the subject is too close to the camera, the flash illumination will wash out the subject and overexpose the film, thereby eliminating any sharpness of the subject from the image. Alternatively, if the subject is too far from the camera, then the intensity of the flash, which falls off as the inverse square of the distance to the subject, will simply be insufficient to illuminate and differentiate the subject from the background. At these distances, the subject will blend into the background and image detail will be lost. Inasmuch as flash illumination can not properly illuminate objects located outside the range of subject-to-camera distances specified by the FLASH_FALL_OFF_LIMIT, the numeric range of this parameter provides a limit on the depth-of-field needed for use in flash photography which correlates depth-of-field to depth-of-illumination.

d. TRIP_POINT

The value of the TRIP_POINT parameter is a constant which specifies the maximum overall scene lumination at which a full flash exposure is made. The overall scene lumination, which is generally an average value across the entire scene, can be obtained from light metering system 215 shown in FIG. 2 or from a separate light sensor built into the camera.

e. MINIMUM_FLASH_SYNC_SPEED

The value of the MINIMUM_FLASH_SYNC_SPEED parameter is a constant dictated by camera design that specifies the shortest shutter speed at which a flash unit can be synchronized to the shutter.

f. FILL_FLASH_COMPENSATION_FACTOR

The value of the FILL_FLASH_COMPENSATION_FACTOR parameter is an empirical constant that provides a limit on the amount of fill flash that will be used in a photographic situation. Fill flash illumination is designed to balance the illumination in scenes having high lighting contrasts, such as daylight photography where the primary subject is situated in a shadow. However, if excess fill flash illumination were projected onto the primary subject, then the scene lighting would effectively reverse with the primary subject being bright and the background in the scene becoming excessively dark due to flash fall-off and hence insufficient background scene illumination.

g. energy_saving_flash

This category merely consists of one parameter that specifies whether the flash unit has the ability to fire its flash tube with only a portion of total energy that can be stored in a storage capacitor located within the unit.

h. spread bounce information

This category provides parameters related to the availability and use of bounce and spread flash illumination and contains the following categories of parameters and individual parameters: ceiling_exist, BOUNCE_CUTOFF and the spread table. Similar to the use of shake sensor 225 shown in FIG. 2, vertical rangefinding system 230 along with all the processing of bounce information, as described in detail below, could be eliminated from our inventive process at the cost of a lessened improvement in overall image quality produced by the remainder of our process. Alternatively, the portion of the inventive process, as described below, that utilizes spread bounce information could be severed from the remainder of the process and be incorporated into cameras to automatically utilize bounce illumination where, based upon scene characteristics alone, doing so will improve image quality.

1. ceiling_exist

The category merely contains one parameter that digitally specifies (YESNO) whether a surface exists from which flash illumination can be bounced. As discussed above, vertical rangefinding system 230 shown in FIG. 2, detects the presence of such a surface and provides a suitable indication thereof to the camera microprocessor system. Clearly, if an appropriate surface does not exist or insufficient flash power exists to produce effective bounce illumination, then flash power and extra system speed should not be used for bounce illumination; otherwise, flash power would simply be wasted and no visibly noticeable improvement in image quality would result. Consequently, the extra system speed and flash power should be used differently, such as through a direct flash with spread illumination, in order to improve image quality.

2. BOUNCE_CUTOFF

The value of this parameter is a numeric limit point which specifies, in log E terms, the minimum amount of the extra system speed (typically 0.9) that is required for use in bounce photography. If an amount of extra system speed exists in a photographic situation but is insufficient for bounce photography, then bounce photography will not be used due to the inability to noticeably improve the quality of the photographed image.

3. spread table

This is a table of values that relates available extra system speed to: appropriate SPREAD_ANGLE—angle over which flash illumination could be spread across the scene, amount of direct flash illumination in terms of the extra system speed (SPREAD_AMOUNT) that could be used for spread illumination and the remaining extra system speed that is available (such as for intentional over-exposure) after spread flash illumination is invoked.

Spread direct flash illumination is used where a ceiling does not exist or where the value of the BOUNCE_CUTOFF parameter can not be met by the available extra system speed but where sufficient extra system speed exists to support spreading direct flash illumination across the scene. Using spread flash illumination in this situation would produce a pleasing image which has a higher overall quality than if no flash illumination were used at all.

i. depth number information

This category consists of two parameters: DEPTH_NUMBER and DEPTH_NUMBER_FOCAL_LENGTH.

The portion of the inventive process, as described below, that processes depth number information could be severed from the remainder of the process and be incorporated into cameras to automatically improve image quality. In that regard, use of this portion of the process, as described in detail below, would set the lens aperture in flash photography to a value that for a given subject distance provides a depth-of-field that matches the available flash depth-of-illumination. To the extent that extra system speed exists once such a lens aperture setting is chosen, then that extra system speed could be utilized, for example, to bounce or spread the flash illumination, rather than using non-spread direct flash illumination, thereby more evenly illuminating the entire scene and improving image quality over that provided by using ISO normal exposure settings. Here, the lens aperture would not, in the first instance, merely be stopped down since doing so would be likely to needlessly increase the depth-of-field.

1. DEPTH_NUMBER

This parameter is one which we specifically developed for use of the present invention in conjunction with flash photography.

Where the value of the DEPTH_NUMBER parameter for the lens currently in use equals the value of the GUIDE_NUMBER for a flash unit currently in use, then the value of the DEPTH_NUMBER parameter equals the product of the lens aperture, measured in stops of f-number, and the primary subject distance, as measured from a flash unit mounted to the camera, at which the depth-of-field produced by the lens will match the depth-of-illumination provided by the flash unit. For a given value of DEPTH_NUMBER, a multitude of pairs of corresponding values for lens aperture settings and subject distances can be determined at which depth-of-field will match the depth-of-illumination. As will be shown below, the value of the DEPTH_NUMBER parameter is calculated based on depth-of-field and depth-of-illumination requirements, but not film speed. Accordingly, since DEPTH_NUMBER is only dependent upon optical characteristics, the same DEPTH_NUMBER may be used for any film speed as long as the same lens is used. If a flash unit having a GUIDE_NUMBER value equal to the value of the DEPTH_NUMBER is used, then, in a photographic system having continuous auto-focusing and continuous lens aperture control (continuous rather than quantized variations in the lens aperture size), an ISO normal exposure can be obtained throughout the entire flash range. Alternatively, extra system speed will likely be present in those situations where the GUIDE_NUMBER exceeds the DEPTH_NUMBER and hence can be used to improve image quality beyond that obtainable through use of the ISO/ANSI exposure standards The most efficient use of system speed occurs whenever the depth-of-field matches the depth-of-illumination. In this regard, if subject thickness extends beyond the available depth-of-illumination provided by the flash unit, then that portion of the subject which is situated outside the far limit of the depth-of-illumination will be insufficiently illuminated and hence will not need to be in-focus in the photographed image. This depth-of-illumination limitation, in turn, reduces the depth-of-field required of the lens. Alternatively, in those situations where depth-of-field is less than depth-of-illumination, the lens will provide an insufficient depth-of-field to fully cover the entire subject thickness that is capable of being properly illuminated by the flash unit. As such, that subject will not be sharply photographed from end-to-end.

For the situation where the values of DEPTH_NUMBER and GUIDE_NUMBER are equal, DEPTH_NUMBER can be derived as follows. First, the hyperfocal distance for a given lens aperture, i.e. the closest distance at which an image appears sharp when a lens is focused at infinity or equivalently the closest distance at which a lens can be focused and an object located at infinity will appear sharp, is given as follows by equation (2)—which is well known:

$$H = \frac{F^2}{(f) \cdot (bc)} \quad (2)$$

where:
H = the hyperfocal distance;
F = the focal length of the lens in use;
f = the lens aperture size measured in f-number; and
bc = the blur circle diameter on the negative.

From use of equation (2), the near and far depth-of-field limits can be calculated using well known equations (3) and (4), as follows:

$$D_+ = \frac{H \cdot d}{H - (d - F)} \quad (3)$$

$$D_- = \frac{H \cdot d}{H + (d - F)} \quad (4)$$

where:
$D_+$ = the far depth-of-field limit;
$D_-$ = the near depth-of-field limit; and
d = the distance at which the lens is focused.

The term (d-F) is only significant in those situations, such as close-photography, where d < 10F.

The exposure fall-off as a function of distance (d) from a flash unit is given by the following well known equation:

$$\Delta E = \log_{10}[(d_2/d_1)^2] \quad (5)$$

This equation states that as the ratio of the distances from the flash unit to a subject doubles (e.g. $d_2 = 8$ feet (approximately 2.4 m) and $d_1 = 4$ feet (approximately 1.22 m)), then the exposure difference becomes 0.6 or two stops. In addition, hereinafter all logarithms (logs) are to the base "10" unless specifically indicated otherwise. Given equation (5), the far and near depth-of-illumination exposure factors, $C_+$ and $C_-$, can be calculated using equations (6) and (7) as follows:

$$C_+ = \sqrt{10^{(+\Delta E)}} \quad (6)$$

$$C_- = \sqrt{10^{(-\Delta E)}} \quad (7)$$

Given these equations, the corresponding near and far depth-of-illumination limits, $D_N$ and $D_F$, are given by equations (8) and (9) as follows:

$$D_N = (d_s)(C_-) \quad (8)$$

$$D_F = (d_s)(C_+) \quad (9)$$

where: $d_s$ = the distance from the subject to the flash unit.

For example, for a $\pm 1$ stop variation in exposure around a subject located 8 feet (approximately 2.4 m) from a flash unit, the resulting depth-of-illumination extends from (8)(0.708) = 5.7 feet (approximately 1.7 m) to (8)(1.41) = 11.3 feet (approximately 3.4 m) from the unit. As such, all objects located within this range will receive an amount of illumination within one stop of that of the subject.

With these equations, a mathematical expression can be derived for DEPTH_NUMBER using either the near or far depth-of-field limit. If the near or far depth-of-field limit is selected, then the near or far depth-of-illumination exposure factor is selected, respectively. Inasmuch as it is desirable to utilize a depth-of-field which covers the entire range of depth-of-illumination and perceptual experiments, which we have conducted, have indicated that the absolute value of the exposure occurring at the far depth-of-illumination limit was greater than that which occurs at the near depth-of-illumination limit, the expression for DEPTH_NUMBER will now be derived using the far depth-of-field limit as specified by equation (3). First, equation (3) can be simplified to equation (10) as follows by assuming that "close-up" images are not being taken:

$$D_+ = \frac{H \cdot d}{H - d} \quad (10)$$

Multiplying the top and bottom of this fraction by (1/H)/(1/H), then substituting for H the expression F2/(f)(bc), followed by multiplying the resulting fraction by 1/[(f)(bc)/(f)(bc)] results in:

$$D_+ = \frac{d}{1 - \frac{[d \cdot f \cdot bc]}{F^2}} \quad (11)$$

Since (d)(f) equals the GUIDE_NUMBER (abbreviated GN and discussed in detail below), equation (11) can be written as:

$$D_+ = \frac{d}{1 - \frac{GN \cdot bc}{F^2}} \quad (12)$$

Since far depth-of-illumination equals $(C_+)(d)$ and equating far depth-of-field to far depth-of-illumination results in equation (13) as follows:

$$(C_+)(d) = \frac{d}{1 - \frac{GN \cdot bc}{F^2}} \quad (13)$$

Through simple manipulation of equation (13), the following formula for GUIDE_NUMBER as given by equation (14) results:

$$GN = \frac{(C_+ - 1)}{C_+} \cdot \frac{F^2}{bc} \quad (14)$$

Since the minimum value of GUIDE_NUMBER should equal the value of DEPTH_NUMBER to ensure that far depth-of-illumination limit matches the far depth-of-field limit, then, after dividing equation (14) by 12 to convert inches to feet, equation (15) for DEPTH_NUMBER results as follows:

$$\text{DEPTH\_NUMBER}_{(ft)} = \frac{\frac{(C_- - 1)}{C_-} \cdot \frac{F^2}{bc}}{12} \quad (15)$$

where:
F = the lens focal length (in inches).

As an example, for a 35 mm lens, a far end depth-of-illumination exposure limit of 0.45 log E (=1.68 for a ±1.5 stop difference) and a blur circle on the negative of 0.002 inches (approximately 0.0051 cm), the value of the DEPTH_NUMBER parameter given by equation (15) equals "32". Accordingly, a camera using this lens along with a flash unit having a GUIDE_NUMBER equalling "32" will provide matched depth-of-field and depth-of-illumination as long the product of the value of F_NUMBER and the subject distance equals "32". As one can appreciate, the value of DEPTH_NUMBER only needs to be calculated once for a particular lens focal length. Thereafter, the value of DEPTH_NUMBER can be used to select lens aperture sizes based upon subject distances which provides matched depth-of-field and depth-of-illumination. However, the value of DEPTH_NUMBER would need to be re-calculated if the depth-of-illumination exposure limits were to change or a different blur circle on the negative were to be used. As indicated by equation (16), the value of DEPTH_NUMBER can be easily calculated for lenses of different focal lengths, with the same blur circle diameter and far depth-of-illumination limit, as follows:

$$\text{DEPTH\_NUMBER}_2 = \text{DEPTH\_NUMBER}_1 \cdot \frac{(F_2)^2}{(F_1)^2} \quad (16)$$

where:
DEPTH_NUMBER$_1$ = a DEPTH_NUMBER value for lens having focal length value F$_1$; and
DEPTH_NUMBER$_2$ = a DEPTH_NUMBER value for lens having focal length value F$_2$.

2. DEPTH_NUMBER_FOCAL_LENGTH

This value of the DEPTH_NUMBER_FOCAL_LENGTH parameter is the FOCAL_LENGTH at which the current value of the DEPTH_NUMBER was determined.

j. GUIDE_NUMBER

This parameter, which is well known in the art, specifies, as given by equation (17) below, the product of subject distance (d$_s$) and lens aperture (FLASH_F_NUMBER) for full flash illumination which for a specified ISO (ASA) film speed, such as illustratively ISO (ASA) 100 speed film, will result in an ISO normal exposure:

$$GN_{(ISO\ 100)} = d_s \cdot FLASH\_F\_NUMBER \quad (17)$$

The GUIDE_NUMBER value, for a specific film speed such as ISO (ASA) 100 speed, will vary from flash unit to flash unit depending upon the amount of light energy produced by the specific flash unit, and thus provides a measure of the output power provided by the flash unit.

The values of either the DEPTH_NUMBER or GUIDE_NUMBER can be used to select a lens aperture (FLASH_F_NUMBER) given a subject distance. Unlike DEPTH_NUMBER which is used to select a lens aperture setting based upon optical characteristics—exposure limits, lens focal length and blur circle diameter, GUIDE_NUMBER is used to select this setting based upon the output power provided by the flash unit. In those flash situations where the value of GUIDE_NUMBER for the specific flash unit in use exceeds the DEPTH_NUMBER for the lens currently in use, extra system speed will likely exist, as illustrated above.

10. RECYCLE MODE

This category, shown in FIG. 3, contains one parameter which assumes either one of two digital values (normal/FAST) depending upon the rate at which the flash unit currently in use is able to recycle itself for the next exposure. The value of this parameter can be obtained either through a user-settable switch located on the camera, or preferably, as a constant supplied by the microcomputer system within the flash unit.

11. FOCAL_LENGTH_FACTOR

This category contains one parameter, k, that when multiplied by the reciprocal of the FOCAL_LENGTH, specifies, as given by equation (18) below, the slowest shutter speed that can be used for a given lens to eliminate any noticeable affects of camera shake on a resulting image:

*SLOWEST SHUTTER*
$$SPEED = k/(FOCAL\_LENGTH) \quad (18)$$

where:
k = a pre-defined constant, typically larger than 1.0
The value of the constant is empirically determined during camera design.

OUTPUT CATEGORIES 12. exposure settings

This category contains the following parameters: SHUTTER_SPEED, F_NUMBER and the FLASH_F_NUMBER, that are needed to drive the camera to produce a proper exposure of the current scene.

a. SHUTTER_SPEED

The value of the SHUTTER_SPEED parameter specifies the speed, in seconds, of the shutter needed for the current exposure.

b. F_NUMBER

The value of the F_NUMBER parameter specifies the size of the lens aperture, in stops, that is needed for a current exposure in ambient lighting conditions.

c. FLASH_F_NUMBER

The value of the FLASH_F_NUMBER parameter specifies the size of the lens aperture, in stops, that is needed for a current flash exposure.

13. POWER_CONDITION

This category contains one numeric parameter that specifies the amount of flash output power that is to be produced after which the flash unit is to quench itself. For example, if an energy savings flash unit were available and a given scene only required one-half of the total available output illuminance provided by the flash unit, then the value of the POWER_CONDITION parameter would be 0.5. The value of this parameter would be provided by the camera microcomputer system to the flash microcomputer system prior to firing the flash unit. In a relatively simple flash unit, the value of this parameter would specify when a so-called "ready" light situated on the flash unit would energize thereby indicating that the flash unit is ready to be re-fired and is temporarily extinguishing any further charging of a storage capacitor located therein.

14. flash_condition

This category contains one digital parameter that merely specifies (YES/NO) whether or not flash illumination is to be used at all in photographing a current scene. The flash unit is always available for use; however, its use is governed by the need for supplemental lighting as determined by our inventive process 300.

15. spread_bounce_condition

This category contains three parameters: SPREAD_AMOUNT, SPREAD_ANGLE and BOUNCE_AMOUNT. These parameters specify the specific manner in which flash illumination is to be used.

a. SPREAD_AMOUNT

As noted above, the value of parameter SPREAD_AMOUNT specifies the amount of extra system speed that can be utilized for spread flash illumination in photographing a current scene.

b. SPREAD_ANGLE

As noted above, the value of parameter SPREAD_ANGLE defines the angle over which direct full flash illumination is to be spread across a scene currently being photographed.

c. BOUNCE_AMOUNT

The value of the BOUNCE_AMOUNT parameter defines the amount of extra system speed that can be utilized for bounce flash illumination in photographing a current scene.

The values for the parameters for the POWER_CONDITION, flash_condition and spread bounce information categories collectively define the configuration in which the flash unit is to operate.

This now concludes the overall description of the input parameters applied to our inventive process and the output parameters generated thereby. The discussion will now address the specifics of our inventive process as shown in FIGS. 4–14. Additional parameters and categories thereof will be defined, as the need arises, during the course of the ensuing discussion.

Figure 4:
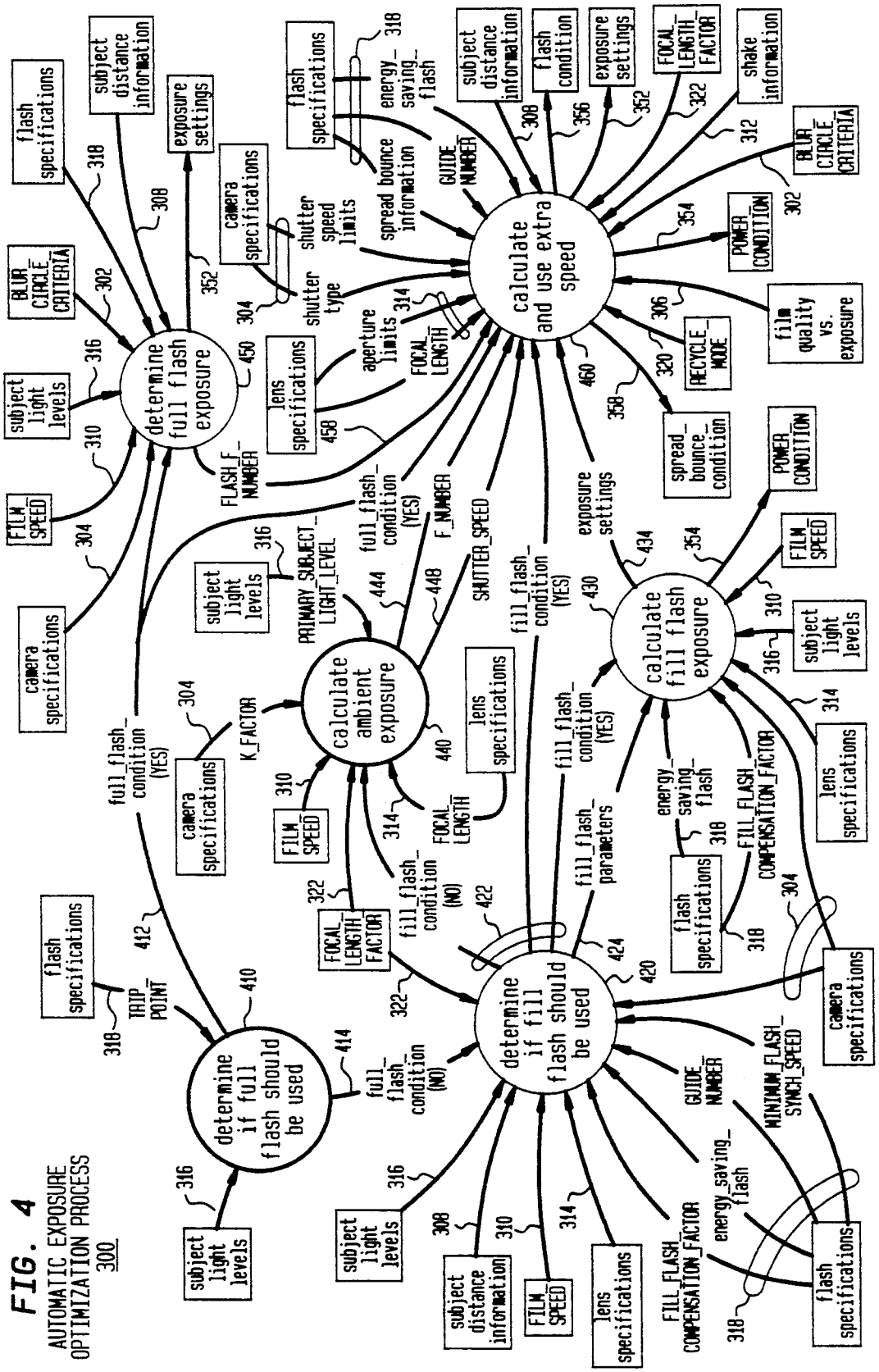
FIG. 4 depicts a high level operational diagram of our inventive process 300 given the categories of input and output parameters shown in FIG. 3.

A high level operational diagram of our inventive process 300 is shown in FIG. 4. As shown, our process contains six basic processes 410, 420, 430, 440, 450 and 460, of which two processes, specifically processes 410 and 440 represented by darkened circles are primitives.

Essentially, to produce a photographed image, process 300 relies on first determining in processes 410 and 420 the type of scene lighting, i.e. ambient or full or fill flash, that is to be used to capture this image. Based upon the selected type of scene lighting, process 300 then determines in processes 430, 440 or 450, the base-line values (typically the ISO normal exposure settings) of the exposure settings and flash parameters appropriate to that lighting type. These parameters include both the exposure settings and, if flash illumination is to be used, various output flash parameters to properly set and control the flash unit. Once these parameters are determined, process 460: (a) determines, based in part upon scene requirements, whether and how much extra system speed exists in the current photographic situation, (b) then specifies the manner through which the extra system speed can best be used to improve the quality of the resulting photographed image beyond that obtainable through the base-line exposure settings, and (c) modifies the previously determined base-line exposure settings and output flash parameters to utilize as much as possible of the extra system speed in order to improve the quality of the photographed image beyond that obtainable by the ISO normal exposure settings.

Specifically, process 410 utilizes the subject light levels and flash specifications, as represented by lines 316 and 318, to determine if a full flash exposure is to be made. In particular, process 410 compares the lumination of the primary subject against the value of the TRIP_POINT parameter. If the primary subject is too dark, i.e. has an intensity less than the TRIP_POINT parameter, then full flash is to be used; otherwise, it is not used. This process is formed of the following routine expressed in high level functional programming terms:

```
INPUT: TRIP_POINT
INPUT: subject light levels
OUTPUT: full_flash_condition
IF PRIMARY_SUBJECT_LIGHT_LEVEL < TRIP_POINT
    THEN: full_flash_condition = YES
    ELSE: full_flash_condition = NO
ENDIF
```

The value of the output parameter, full_flash_condition, merely specifies whether a full flash is to be used in the current exposure.

In the event a full flash is not to be used (i.e. full_flash_condition="NO"), then as represented by line 414, process 420 is performed to determine if a fill flash should be used instead This process, described in detail below in conjunction with FIGS. 5 and 6, determines whether a fill flash is to be used, sets the value of the parameter fill_flash_condition to either "YES" or "NO" based upon whether a fill flash is to be used or not, and, if fill flash is to be used, calculates fill flash parameters. To do so, process 420 utilizes the subject light levels, subject distance information, FILM_SPEED, lens specifications and FOCAL_LENGTH_FACTOR as represented by lines 316, 308, 310, 314 and 322 along with flash specifications and camera specifications as represented by lines 318 and 304. In particular, from the camera specifications, process 420 utilizes the FILL_FLASH_COMPENSATION_FACTOR parameter, the energy_saving_flash parameter, the GUIDE_NUMBER parameter and the MINIMUM_FLASH_SYNC_SPEED.

Though not specifically delineated in FIG. 4, the fill flash parameters include: the FILL_FLASH_MAXIMUM_APERTURE, the FILL_FLASH_APERTURE and the LIGHTING_RATIO_FACTOR, which are all defined as follows:

16. fill flash parameters a. FILL_FLASH_MAXIMUM_APERTURE

The value of the FILL_FLASH_MAXIMUM_APERTURE parameter is the maximum numerical lens aperture value that is allowable for use in fill flash photography given the fastest available shutter speed that can be currently used in the camera.

b. FILL_FLASH_APERTURE

The value of the FILL_FLASH_APERTURE_parameter is the initial value of the lens aperture value that is needed to utilize fill flash to capture the current scene.

c. LIGHTING_RATIO_FACTOR

The value of the LIGHTING_RATIO_FACTOR parameter is taken to be the square root of the ratio of the background to primary subject luminances in the current scene being photographed.

If fill flash is to be used (i.e. fill_flash_condition="YES" as represented by lines 422), then the values of the fill flash parameters are applied as input to process 430 as represented by line 424. This process, as described in detail below in conjunction with FIG. 7, determines the baseline (initial) values of the exposure settings using the camera specifications, flash specifications—specifically energy_saving_flash and FILL_FLASH_COMPENSATION_FACTOR, lens specifications, subject light levels and FILM_SPEED as represented by lines 304, 318, 314, 316 and 310. The resulting fill flash based exposure settings along with the POWER_CONDITION and positive ("YES") fill_flash_condition are applied, as represented by lines 434, 354 and 422, as input to extra system speed process 460 to determine if extra system speed exists in the present photographic situation and, if so, how this extra system speed should best be used to improve resulting image quality.

Now, alternatively, in the event that ambient scene lighting is to be used, in which case both the full_flash_condition and fill_flash_condition are both "NO", then as represented by lines 422 that emanates from process 420, process 440 is performed to determine the baseline values of the exposure settings for ambient lighting. Process 440 determines the ambient exposure settings, i.e. F_NUMBER and SHUTTER_SPEED, using the FILM_SPEED, the camera specifications—specifically the K_FACTOR, the subject light levels—specifically the PRIMARY_SUBJECT_LIGHT_LEVEL, the lens specifications—specifically the FOCAL_LENGTH, and the FOCAL_LENGTH_FACTOR, as represented by lines 310, 304, 316, 314 and 322. Here, the fastest shutter speed is chosen based on the focal length of the lens and an appropriate factor to minimize the affects of camera shake. Then, given the shutter speed, a lens aperture size, as measured in F_NUMBER, is chosen to provide a baseline exposure. This process is formed of the following routine expressed in high level functional programming terms:

```
INPUT: subject light levels
INPUT: fill_flash_condition
INPUT: FILM_SPEED
INPUT: camera specifications
INPUT: FOCAL_LENGTH_FACTOR
INPUT: lens specifications
OUTPUT: F_NUMBER
OUTPUT: SHUTTER_SPEED
IF fill_flash_condition = NO
THEN: SHUTTER_SPEED = FOCAL_LENGTH_FACTOR ·
(1/FOCAL_LENGTH)
F_NUMBER = [(SHUTTER_SPEED · FILM_SPEED ·
PRIMARY_SUBJECT_LIGHT_LEVEL)/(K_FACTOR)].5
ENDIF
```

Once these ambient exposure settings are determined, process 460 is performed, using these exposure settings, i.e. here F_and SHUTTER_SPEED, as represented by corresponding lines 444 and 448, to determine if extra system speed exists in the present photographic situation and, if so, how this extra system speed should best be used to improve resulting image quality.

Alternatively, if a full flash is to be used (i.e. full_flash_condition="YES"), then, as represented by line 412, process 450 is performed to determine the baseline values of the exposure settings for full flash lighting. Process 450, as described below in detail in conjunction with FIGS. 8-10, determines the full flash exposure settings, i.e. FLASH_F_NUMBER and SHUTTER_SPEED, using the camera specifications, FILM_SPEED, subject light levels, BLUR_CIRCLE_CRITERIA, flash specifications and subject distance information, as represented by corresponding lines 304, 310, 316, 302, 318 and 308. The resulting FLASH_F_NUMBER and the positive full_flash_condition are applied, as represented by lines 458 and 454, as input to extra system speed process 460 to determine if extra system speed exists in the current photographic situation and, if so, how this extra system speed should best be used to improve resulting image quality. The SHUTTER_SPEED of the camera is set to that determined by process 460.

Process 460, as described in detail below in conjunction with FIGS. 11-14, first determines if extra system speed exists and, if so, the amount of the extra system speed that is available for the current photographic situations. This process utilizes the following parameters as inputs: flash specifications—specifically spread bounce information, GUIDE_NUMBER and energy_saving_flash, as collectively represented by lines 318; camera specifications—specifically shutter type and shutter speed limits, as collectively represented by lines 304; lens specifications—specifically FOCAL_LENGTH and aperture limits, as collectively represented by lines 314; RECYCLE_MODE, film quality vs. exposure, BLUR_CIRCLE_CRITERIA, shake information, FOCAL_LENGTH_FACTOR, and subject distance information as represented by corresponding lines 320, 306, 302, 312, 322 and 308. In addition, if a full flash exposure is to be made, process 460 also utilizes FLASH_F_NUMBER and full_flash_condition provided by process 450, as represented by lines 458 and 454. Alternatively, if ambient lighting is to be used, then process 460 utilizes the baseline values of the F_NUMBER and SHUTTER_SPEED parameters provided by process 440, as represented by corresponding lines 444 and 448. Lastly, in the event a fill flash exposure is to be made, then alternatively process 460 also utilizes the fill_flash_condition and baseline exposure settings provided by processes 420 and 430, as represented by corresponding lines 422 and 434. Once process 460 has determined the amount of the extra system speed that currently exists, this process modifies the exposure settings and flash parameters in a manner, as described in detail below, that best utilizes the available extra system speed to improve image quality. As such, process 460 generates appropriate values for the spread bounce condition, POWER_CONDITION, flash-condition and exposure settings parameter categories, as represented by lines 358, 354, 356 and 352. The value of these parameters are then used to drive the camera and flash unit accordingly. The parameters that are specifically needed to drive the flash unit are transmitted, over link 272 as shown in FIG. 2, by the camera microcomputer system to flash microcomputer system 277 to control the flash unit accordingly.

Figure 5:
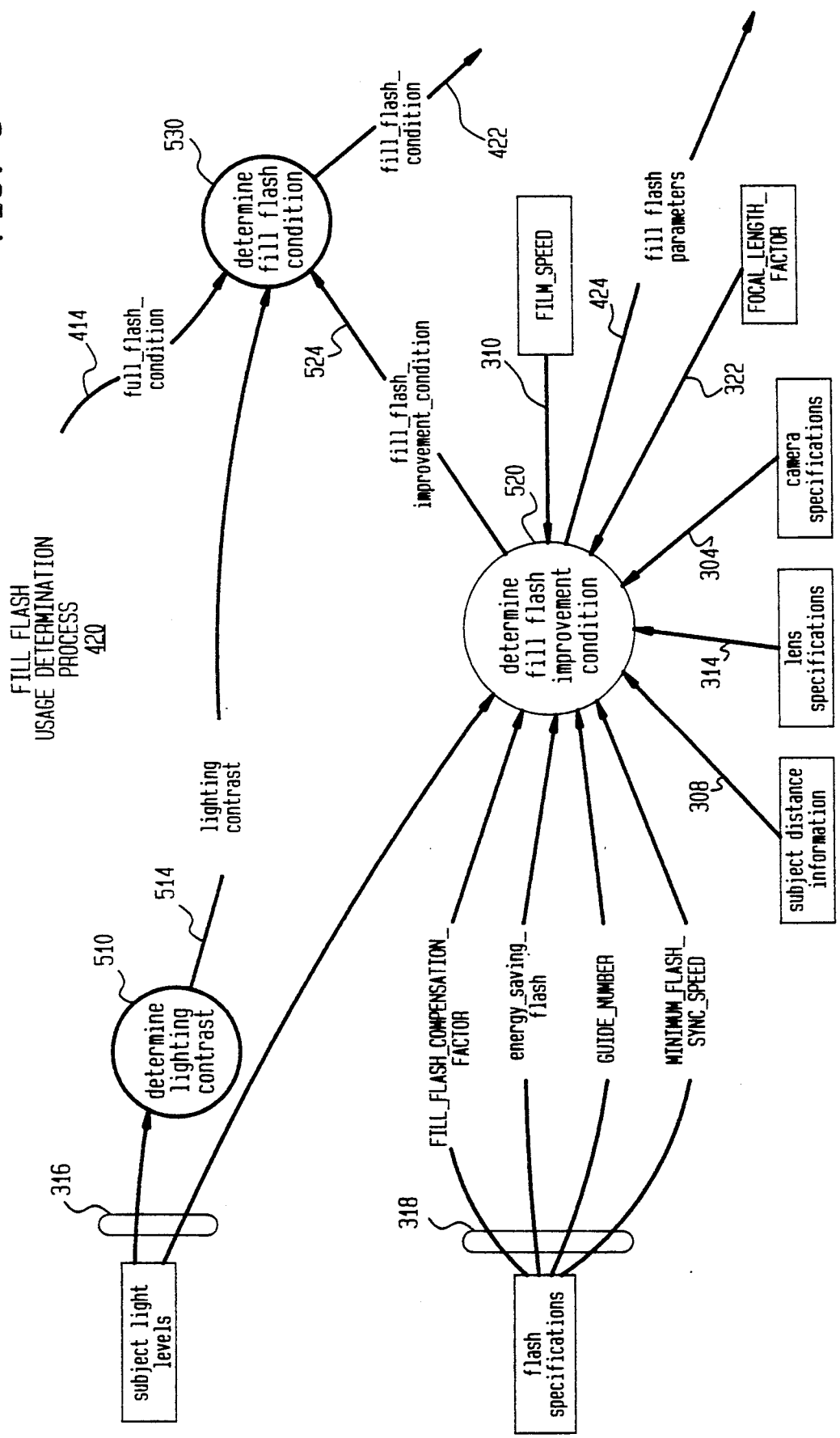
FIG. 5 depicts a high level operational diagram of fill flash usage determination process 420 shown in FIG. 4.

FIG. 5 depicts an operational diagram of fill flash usage determination process 420 shown in FIG. 4. As described above, this process determines, based upon scene and system parameters, if fill flash can be used to improve the quality of the image resulting from photographing the current scene. As shown, process 420 is composed of three steps—two of which are primitive steps: determination of lighting contrast step 510, determination of fill_flash_improvement_condition step 520 and determination of fill_flash_condition step 530. Upon entry into process 420, lighting contrast is determined through step 510 as being either high or normal based upon the difference between the PRIMARY_SUBJECT_LIGHT_LEVEL and the BACKGROUND_SUBJECT_LIGHT_LEVEL. Both of these levels are applied to step 510 as represented by lines 316. If the difference is sufficiently high, i.e. the primary subject is 0.3. log E brighter than the background subject, then high contrast occurs; otherwise normal contrast occurs. This step is formed of the following routine expressed in high level functional programming terms:

```
INPUT: subject light levels
OUTPUT: lighting contrast
IF [(ln(PRIMARY_SUBJECT_LIGHT_LEVEL) −
    ln(BACKGROUND_LIGHT_LEVEL))/ln(10)] < 0.3
  THEN: lighting contrast = HIGH
  ELSE: lighting contrast = NORMAL
ENDIF
```

Step 520 determines whether an sufficient improvement in image quality will result if fill flash is used. This step, as described in detail below in conjunction with FIG. 6, bases its determination using the following parameters as input: subject light levels as represented by line 316; flash specifications—specifically FILL_FLASH_COMPENSATION_FACTOR, energy_saving_flash, GUIDE_NUMBER, and MINIMUM_FLASH_SYNC_SPEED, as collectively represented by lines 318; subject distance information, lens specifications, camera specifications, FOCAL_LENGTH_FACTOR and FILM_SPEED as respectively represented by lines 308, 314, 304, 322 and 310. Step 520 produces two categories of parameters: fill flash parameters and fill_flash_improvement_condition, as represented by lines 424 and 524. As noted above, the fill flash parameter category contains the FILL_FLASH_MAXIMUM_APERTURE, FILL_FLASH_APERTURE and LIGHTING_RATIO_FACTOR parameters. The fill flash_improvement_condition category is defined as follows:

17. fill_flash_improvement condition

This category contains one digital parameter that merely specifies (YES/NO) whether or not a gain in lighting contrast is likely to occur through use of a fill flash exposure.

If an improvement in image quality, specifically through an improved lighting contrast, can be obtained by a fill flash exposure, then step 530 appropriately sets the fill_flash_condition output parameter as represented by line 422 to "YES". This step is formed of the following routine expressed in high level functional programming terms:

```
INPUT: lighting contrast
INPUT: fill_flash_improvement_condition
OUTPUT: fill_flash_condition
IF (lighting contrast = HIGH) and
   (fill_flash_improvement_condition = YES)
  THEN: fill_flash_condition = YES
  ELSE: fill_flash_condition = NO
ENDIF
```

Figure 6:
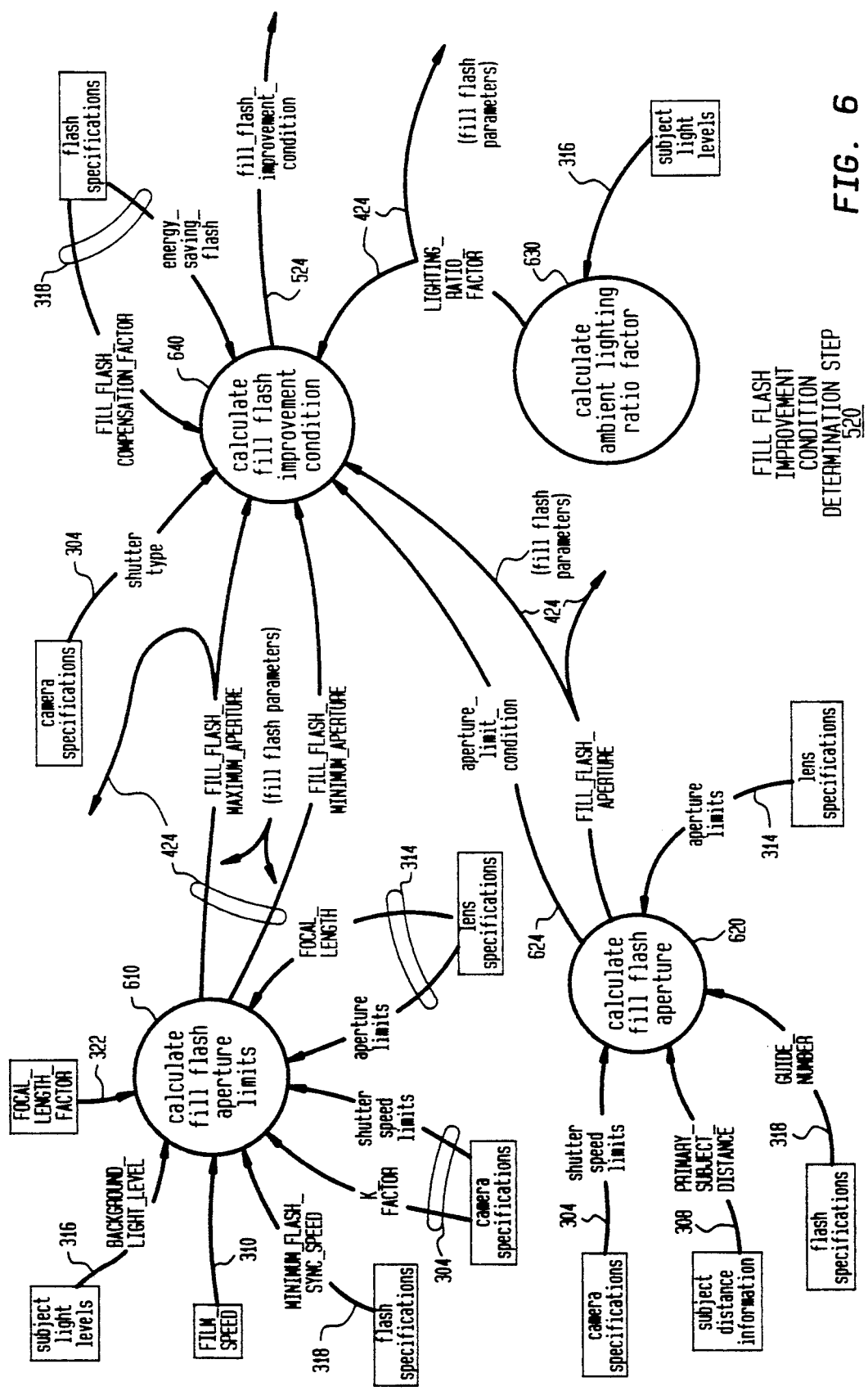
FIG. 6 depicts an operational diagram of fill flash improvement condition determination step 520 shown in FIG. 5.

An operational diagram of fill flash improvement condition determination step 520 is depicted in FIG. 6. As described above, this step determines, based upon scene and system parameters, if a sufficient improvement in image quality will result if fill flash is used. Step 520 is composed of four primitive steps: calculation of fill flash aperture limits step 610, calculation of fill flash aperture step 620, calculation of ambient lighting ratio factor step 630 and calculation of fill_flash_improvement_condition step 640. Upon entry into process 420, both steps 610 and 620 are performed. Step 610 calculates maximum and minimum scene dependent limit values of the lens aperture based on the maximum and minimum shutter speeds that can be used with flash illumination and current scene parameters. If an actual lens aperture size is determined that exceeds the limit values, then the camera is not able to use a particular shutter speed for that actual aperture limit that will properly expose the background. The resulting lens aperture values are compared against the physical limits of the lens currently in use and, if necessary, clipped by the appropriate physical limit. In particular, step 610 utilizes the following categories of input parameters: FOCAL_LENGTH_FACTOR, subject light levels—particularly the BACKGROUND_LIGHT_LEVEL parameter, FILM_SPEED, flash specifications—specifically the MINIMUM_FLASH_SYNC_SPEED parameter, as represented by corresponding lines 322, 316, 310 and 318; camera specifications—specifically the K_FACTOR and shutter speed limits, and the lens specifications—specifically the aperture limits and the FOCAL_LENGTH, as represented by respective lines 304 and 314. The output parameters produced by step 610, as represented by lines 424, are the FILL_FLASH_MAXIMUM_APERTURE and the FILL_FLASH_MINIMUM_APERTURE. Step 610 is formed of the following routine expressed in high level functional programming terms:

```
INPUT: subject light levels
INPUT: FILM_SPEED
INPUT: camera specifications
INPUT: lens specifications
INPUT: FOCAL_LENGTH_FACTOR
OUTPUT: FILL_FLASH_MAXIMUM_APERTURE
OUTPUT: FILL_FLASH_MINIMUM_APERTURE
MAXIMUM_USABLE_SHUTTER_SPEED =
    (1/FOCAL_LENGTH) · FOCAL_LENGTH_FACTOR
FILL_FLASH_MAXIMUM_APERTURE =
    √(MAXIMUM_USABLE_SHUTTER_SPEED · FILM_SPEED ·
    BACKGROUND_LIGHT_LEVEL/K_FACTOR)
FILL_FLASH_MINIMUM_APERTURE =
    √(MINIMUM_FLASH_SYNC_SPEED · FILM_SPEED ·
    BACKGROUND_LIGHT_LEVEL/K_FACTOR)
IF FILL_FLASH_MAXIMUM_APERTURE > MAXIMUM_APERTURE
  THEN: FILL_FLASH_MAXIMUM_APERTURE = MAXIMUM_APERTURE
ENDIF
IF FILL_FLASH_MINIMUM_APERTURE < MINIMUM_APERTURE
  THEN: FILL_FLASH_MINIMUM_APERTURE = MINIMUM_APERTURE
```

ENDIF

Step 620, when performed, calculates the lens aperture setting for fill flash. This lens aperture setting is determined as that which is required to yield a baseline (typically ISO normal) exposure, at the primary subject distance, under flash conditions. Specifically, this step utilizes the following categories of input parameters: camera specifications—specifically shutter speed limits, subject-distance information—specifically PRIMARY_SUBJECT_DISTANCE, flash specifications—specifically GUIDE_NUMBER, and lens specifications—specifically aperture limits, as represented by corresponding lines 304, 308, 318 and 314. As represented by lines 424 and 624, the outputs produced by step 620 are the FILL_FLASH_APERTURE and the aperture limit condition, with the latter being defined as follows:

18. aperture limit condition

This category contains one digital parameter that merely specifies (YESNO) whether or not an aperture limit was exceeded by the calculated value for the FILL_FLASH_APERTURE. Step 620 is formed of the following routine expressed in high level functional programming terms:

```
INPUT: subject distance information
INPUT: flash specifications
INPUT: camera specifications
INPUT: lens specifications
OUTPUT: FILL_FLASH_APERTURE
OUTPUT: aperture_limit_condition
aperture_limit_condition = NO
FILL_FLASH_APERTURE = GUIDE_NUMBER/
    PRIMARY_SUBJECT_DISTANCE
IF FILL_FLASH_APERTURE > MAXIMUM_APERTURE
    THEN: aperture_limit_condition = YES
    ENDIF
IF FILL_FLASH_APERTURE < MINIMUM_APERTURE
    THEN: aperture_limit_condition = YES
    ENDIF
```

Step 630 determines a value of the ratio between the intensities of the primary subject and background subject light levels that can be used to modify the lens aperture settings. This specifies the lighting difference in the scene and the amount of exposure improvement, in terms of f-stops, that can be made. Fill flash exposures are used where the scene background (or distant primary subject) is brighter than the scene foreground (or near primary subject). In these situations, the light which is produced by the flash unit and falls on the foreground is significantly greater than that which falls on the background (as a function of the difference between the reciprocal of the squares of the corresponding subject-to-camera distances) and hence reduces the lighting contrast in the scene. Fill flash is not used where the primary subject is brighter than the background; otherwise, the primary subject will become excessively bright and the background will be excessively darkened. Step 630 is formed of the following routine expressed in high level functional programming terms:

```
INPUT: subject light levels
OUTPUT: LIGHTING_RATIO_FACTOR
LIGHTING_RATIO_FACTOR =
    √(BACKGROUND_SUBJECT_LIGHT_LEVEL/
    PRIMARY_SUBJECT_LIGHT_LEVEL).
```

Next, step 640 determines whether the calculated lens aperture value for fill flash will produce an improvement in the lighting ratio in the photographed image of the current scene. If an improvement will occur, then as described above, fill flash is used. If no such improvement will result, then ambient lighting rather than fill flash is used in producing an exposure of the current scene. In particular, step 640 utilizes the following categories of input parameters: camera specifications—specifically shutter type, FILL_FLASH_MAXIMUM_APERTURE, FILL_FLASH_MINIMUM_APERTURE, aperture_limit_condition, FILL_FLASH_APERTURE, LIGHTING_RATIO_FACTOR, and flash specifications—specifically energy_saving_flash and FILL_FLASH_COMPENSATION_FACTOR, as represented by lines 304, 424, 624 and 318. As represented by line 524, the output produced by step 640 is the fill_flash_improvement_condition parameter. Step 640 is formed of the following routine expressed in high level functional programming terms:

```
INPUT: FILL_FLASH_MAXIMUM_APERTURE
INPUT: FILL_FLASH_MINIMUM_APERTURE
INPUT: FILL_FLASH_APERTURE
INPUT: LIGHTING_RATIO_FACTOR
INPUT: flash specifications
INPUT: camera specifications
INPUT: aperture_limit_condition
OUTPUT: fill_flash_improvement_condition
IF (FILL_FLASH_APERTURE · LIGHTING_RATIO_FACTOR) >
    FILL_FLASH_MINIMUM_APERTURE
    THEN:
        IF (FILL_FLASH_APERTURE/(LIGHTING_RATIO_FACTOR ·
            FILL_FLASH_COMPENSATION_FACTOR)) <
            FILL_FLASH_MAXIMUM_APERTURE
            THEN: fill_flash_improvement_condition = YES
            ELSE: IF energy_saving_flash = YES
            THEN: fill_flash_improvement_condition =
                YES
            ENDIF
        ELSE: IF shutter type = PROGRAMMABLE
            THEN: fill_flash_improvement_condition =
                YES
            ENDIF
```

```
   IF (aperture__limit__condition = YES) and
      (energy__saving__flash = NO)
      THEN: fill__flash__improvement__condition = NO
   ENDIF
   ELSE: fill__flash__improvement__condition = NO
   ENDIF
ELSE: fill__falsh__improvement__condition = NO
ENDIF
```

As specifically indicated above, step 640 determines, through the first IF test, whether sufficient light is produced by the flash unit to reduce the lighting contrast for and properly expose primary subjects that are located at relatively far distances from the camera. If insufficient light exists to sufficiently reduce the contrast associated with these subjects, then use of fill flash will not noticeably improve image quality and should not be used. As such, the fill__flash__improvement__condition parameter will be set to "NO". Viewed in another way, if, due to the lighting contrasts in the scene, a shutter speed has been selected for use with fill flash which is faster than the maximum speed at which the shutter can be synchronized to the flash unit, i.e. the scene contains excessive contrast that can not be noticeably improved by fill flash, then fill flash can not be used. Now, if the contrast of distant primary subjects can be noticeably reduced, then step 640, using the second IF test, determines whether fill flash will impart an excessive amount of light onto those primary subjects located at relatively close distances from the camera which, in turn, will effectively reverse the lighting contrast in the photograph of the scene, i.e. these near subjects will become bright and the background dark, and adversely affect image quality. Accordingly, if the available light lies within a range that will provide a noticeable improvement in image quality, then the fill__flash__improvement__condition__parameter is set to "YES" and fill flash will be used; otherwise, subject to two exceptions, fill flash will not be used. Specifically with respect to these exceptions, if excessive light exists, then fill flash can still be used, if an energy saving flash is available, by throttling down the energy used to fire the flash unit or, if a programmable shutter is available, by using a different shutter opening for the flash exposure than that used in ambient lighting. As such, once step 640 has been performed, a determination has been made that fill flash is or is not to be used. If fill flash is to be used, then the baseline exposure settings for fill flash need to be calculated.

Figure 7:
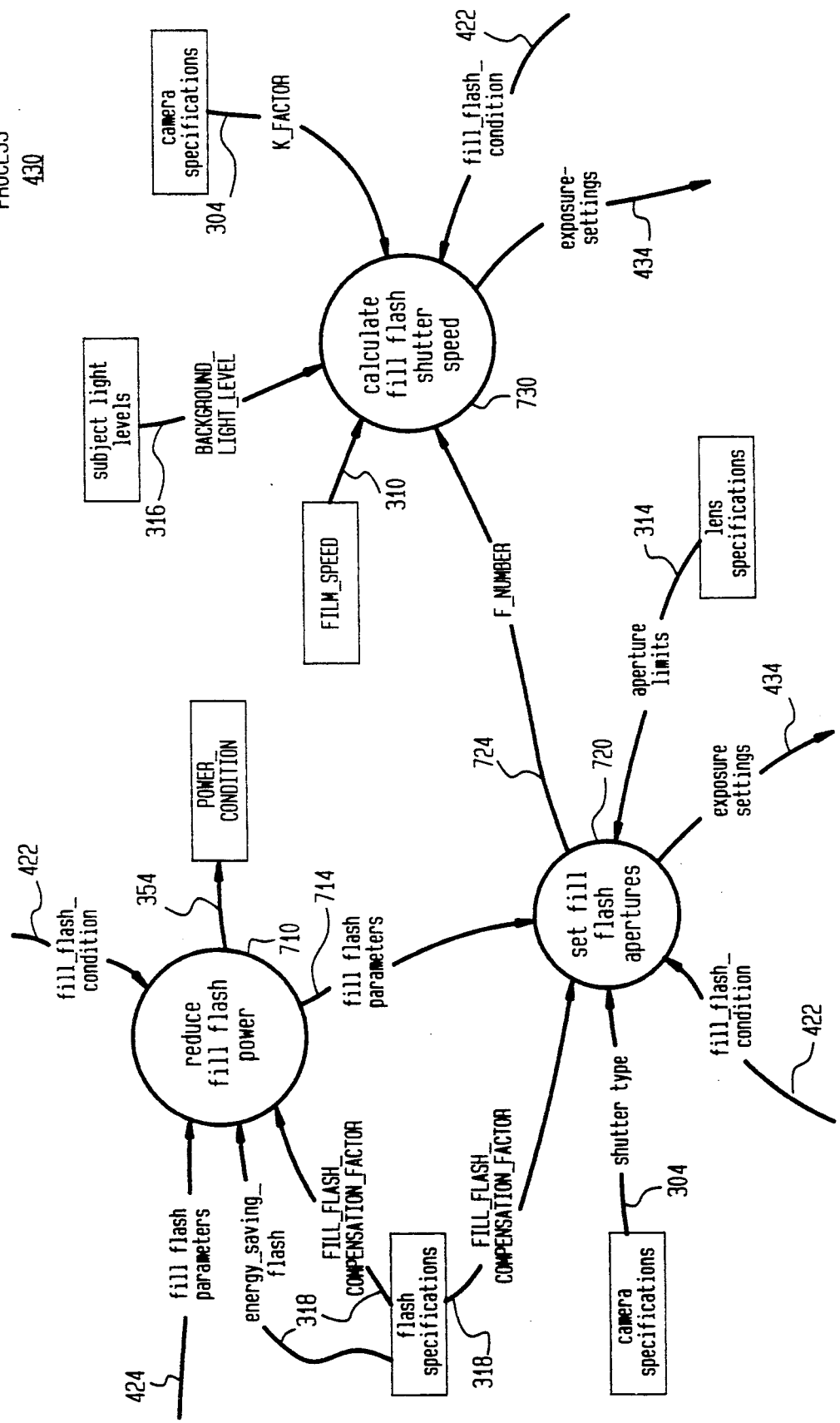
FIG. 7 depicts a high level operational diagram of fill flash exposure calculation process 430 also shown in FIG. 4.

FIG. 7 depicts an operational diagram of fill flash exposure calculation process 430. As discussed above, process 430 determines the baseline values of the exposure settings to photograph the current scene using fill flash. As shown, process 430 contains three primitive steps: reduction of fill flash power step 71 0, setting fill flash aperture step 720 and calculation of fill flash shutter speed step 730. Upon entry into process 430, step 710 is first performed. In the event an energy saving flash unit is being used and scene lighting contrast is such that a fill flash exposure at maximum flash power could produce a fill flash picture with a reversed contrast, step 710 determines the reduction in flash power that should be used to provide a proper fill flash exposure, i.e. a pleasing fill flash photographed image. This step utilizes the following inputs: fill flash condition, flash specifications—specifically energy__saving__flash and FILL__FLASH__COMPENSATION__FACTOR, and the fill flash parameters, as represented by lines 422, 318 and 424 to modify (update), as appropriate the fill flash parameters based upon the amount of reduced flash power that is to be used. The values for the updated fill flash parameters and the POWER__CONDITION are provided, as represented by lines 354 and 714, as output from step 710. Step 710 is formed of the following routine expressed in high level functional programming terms:

```
INPUT: flash specifications
INPUT: FILL__FLASH__COMPENSATION__FACTOR
INPUT: fill__flash__condition
UPDATE: fill flash parameters
OUTPUT: POWER__CONDITION
IF fill__flash__condition = YES
   THEN: IF (FILL__FLASH__APERTURE/(LIGHTING__RATIO__FACTOR ·
             FILL__FLASH__COMPENSATION__FACTOR)) >
             FILL__FLASH__MAXIMUM__APERTURE
      THEN:
         IF energy__saving__flash = YES
            THEN:
               POWER__CONDITION =
                  (LIGHTING__RATIO__FACTOR ·
                  FILL__FLASH__COMPENSATION__FACTOR ·
                  FILL__FLASH__MAXIMUM__APERTURE/
                  FILL__FLASH__APERTURE)$^2$
               FILL__FLASH__APERTURE =
                  FILL__FLASH__MAXIMUM__APERTURE
         ENDIF
      ENDIF
ENDIF
```

Once the fill flash parameters have been updated by step 710 to reflect a reduction in flash power, step 720 is performed. This step sets the appropriate lens aperture setting, clipped by the aperture limits of the lens in use, in view of the reduction in flash power that is to be used for a fill flash exposure or the availability of a programmable shutter. This step utilizes the following inputs: fill flash parameters, FILL__FLASH__COMPENSA- TION_FACTOR, camera specifications—specifically shutter type, fill_flash_condition, and lens specifications—specifically aperture limits, as represented by lines 714, 318, 304, 422 and 314. Step 720 produces, as output: the F_NUMBER of the lens aperture that is to be used for a baseline fill flash exposure and applies this value to step 730, via line 724, and via line 434, to extra system speed calculation and use process 460 shown in FIG. 4. If a programmable lens aperture exists, then two different lens apertures can be used: one for flash and another for ambient lighting and the associated f-numbers therefor to capture a a conventional shutter were in use or a programmable shutter is in use but the primary subject is situated too far from the camera, then these two lens aperture settings would be the same. Specifically, step 720, shown in FIG. 7, is formed of the following routine expressed in high level functional programming terms:

```
INPUT: camera specifications
INPUT: subject light levels
INPUT: FILM_SPEED
INPUT: fill_flash_condition
INPUT: F_NUMBER
OUTPUT: exposure settings
IF fill_flash_condition = YES
   THEN:
   SHUTTER_SPEED = (K_FACTOR · F_NUMBER²)/
      (BACKGROUND_LIGHT_LEVEL · FILM_SPEED)
ENDIF
```

Figure 8:
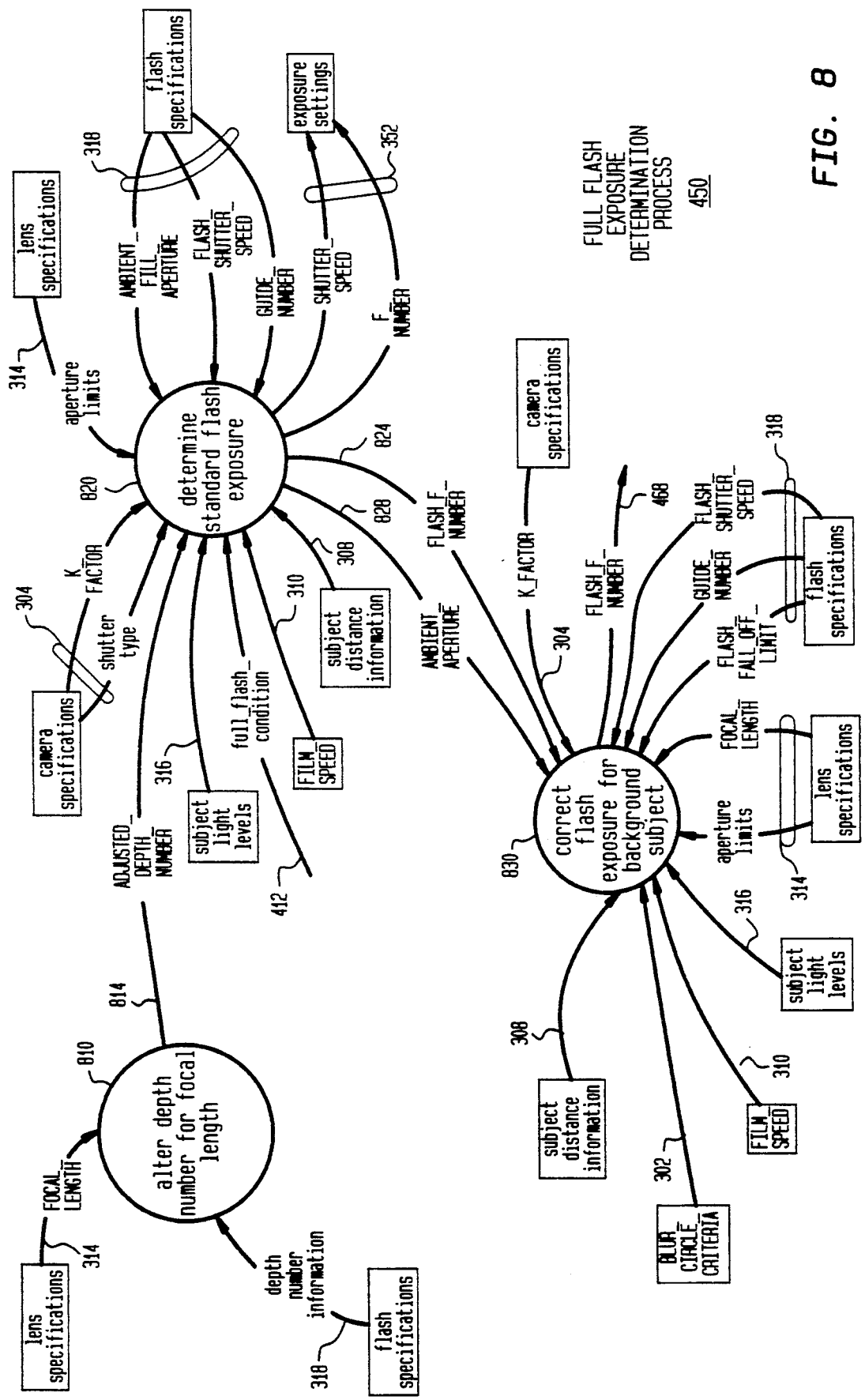
FIG. 8 depicts a high level operational diagram of full flash exposure determination process 450 shown in FIG. 4.

FIG. 8 depicts an operational diagram of full flash exposure determination process 450 shown in FIG. 4. Process 450, as discussed above, determines the baseline values of the exposure settings for full flash lighting. As shown, process 450 contains three steps—one of which is a primitive step: altering depth number focal length

```
INPUT: camera specifications
INPUT: fill flash parameters
INPUT: FILL_FLASH_COMPENSATION_FACTOR
INPUT: fill_flash_condition
INPUT: lens specifications
OUTPUT: F_NUMBER
OUTPUT: exposure settings
IF shutter type = PROGRAMMABLE
   THEN: IF (FILL_FLASH_APERTURE/(LIGHTING_RATIO_FACTOR ·
         FILL_FLASH_COMPENSATION_FACTOR)) >
         FILL_FLASH_MAXIMUM_APERTURE
      THEN: F_NUMBER = FILL_FLASH_MAXIMUM_APERTURE
         FLASH_F_NUMBER = FILL_FLASH_APERTURE
      ELSE: F_NUMBER = FILL_FLASH_APERTURE
         FLASH_F_NUMBER = FILL_FLASH_APERTURE
      ENDIF
   ELSE: IF shutter type = CONVENTIONAL
      THEN: F_NUMBER = FILL_FLASH_APERTURE
         FLASH_F_NUMBER = FILL_FLASH_APERTURE
      ENDIF
ENDIF
IF F_NUMBER > MAXIMUM_F_NUMBER
   THEN: F_NUMBER = MAXIMUM_F_NUMBER
ENDIF
IF F_NUMBER = MINIMUM_F_NUMBER
   THEN: F_NUMBER = MINIMUM_F_NUMBER
ENDIF
IF FLASH_F_NUMBER > MAXIMUM_F_NUMBER
   THEN: FLASH_F_NUMBER = MAXIMUM_F_NUMBER
ENDIF
IF FLASH_F_NUMBER < MINIMUM_F_NUMBER
   THEN: FLASH_F_NUMBER = MINIMUM F_NUMBER
ENDIF
```

Once the lens aperture has been appropriately set by step 720, step 730 is performed to calculate the shutter speed needed to properly expose the background in the current scene, thereby yielding the baseline fill flash exposure. This latter step utilizes the following inputs: camera specifications—specifically K_FACTOR, subject light levels—specifically BACKGROUND_LIGHT_LEVEL, FILM_SPEED, F_NUMBER, and fill_flash_condition, as represented by lines 304, 316, 310, 724 and 422. The output of step 730, as represented by line 434, is the latest exposure settings, specifically including the value for SHUTTER_SPEED. This step is formed of the following routine expressed in high level functional programming terms:

step 810, determining standard flash exposure step 820 and correcting flash exposure for background subject step 830. Upon entry into process 450, step 810 is first performed. This step merely adjusts the DEPTH_NUMBER for the actual focal length of the lens currently in use relative to the focal length at which the DEPTH_NUMBER was originally determined. Accordingly, step 810 utilizes two inputs: flash specifications—specifically depth number information, and lens specifications—specifically FOCAL_LENGTH, as represented by corresponding lines 314 and 318. The output from step 810 is the ADJUSTED_DEPTH_NUMBER, as represented by line 814. This step is formed of the following routine expressed in high level functional programming terms:

```
INPUT: lens specifications
INPUT: flash specifications
OUTPUT: ADJUSTED_DEPTH_NUMBER
ADJUSTED_DEPTH_NUMBER = DEPTH_NUMBER · (FOCAL_LENGTH/
```

-continued

DEPTH_NUMBER_FOCAL_LENGTH)².

Once the value of the ADJUSTED_DEPTH_NUMBER has been calculated by step 810, step 820 is performed to first determine the lens aperture setting needed for a normal baseline full flash exposure. Wherever possible, the baseline full flash exposure provides matched depth-of-field and depth-of-illumination and at least an ISO normal exposure. Step 820 also increases the background exposure, to the extent realistically possible for the current scene being photographed, by varying this lens aperture setting—even if the background will not be in focus. This reduces the lighting contrast in the scene which advantageously prevents the near primary subject in the scene from becoming "washed out", i.e. over-exposed, by the flash and also provides an increased exposure tolerance during printing and hence reduced printing failures. As represented by lines 304, 814, 316, 412, 310, 308, 318 and 314, step 820 utilizes the following inputs: camera specifications—specifically K_FACTOR and shutter type; ADJUSTED_DEPTH_NUMBER; subject light levels; full_flash_condition; FILM_SPEED; subject distance information; flash specifications—specifically AMBIENT_FILL_APERTURE, FLASH_SHUTTER_SPEED and GUIDE_NUMBER; and lens specifications—specifically aperture limits. This step produces as output the values of: AMBIENT_APERTURE, FLASH_F_NUMBER, and exposure settings—specifically F_NUMBER and SHUTTER_SPEED, as represented by lines 828, 824 and 352, with the AMBIENT_APERTURE parameter being defined as follows:

19. AMBIENT APERTURE

The value of this parameter specifies the setting of the lens aperture that is to be used to provide a remaining ambient exposure for a slow opening shutter.

Once an appropriate lens aperture setting has been calculated by step 820 to increase the background exposure, step 830 is performed to re-assess the depth-of-field requirements for the scene and appropriately change the lens aperture setting based upon the re-assessed, i.e. new, depth-of-field requirements. Specifically, as the background illumination increases in a flash exposure, the background becomes visually more apparent and hence increasingly more important to the overall image. This necessarily requires that the background be brought into sharp focus. As such, the scene requirements now dictate an increased depth-of-field to assure that the background comes into focus. In this regard, if a lens aperture setting was initially chosen to provide increased background illumination but at the expense of the background being out of focus, then, owing to the new depth-of-field requirements, that lens aperture setting must be changed to one that provides, to the extent realistically possible, increased depth-of-field. In performing these operations, step 830 utilizes, as represented by lines 824, 828, 318, 308, 302, 310, 316, 314, ®nd 304, the following inputs: FLASH_F_NUMBER; AMBIENT_APERTURE; flash specifications—specifically FLASH_SHUTTER_SPEED, FLASH_FALL_OFF_LIMIT AND GUIDE_NUMBER; subject distance information; BLUR_CIRCLE_CRITERIA; FILM_SPEED; subject light levels; lens specifications—specifically aperture limits and FOCAL_LENGTH; and camera specifications—specifically K_FACTOR. As represented by line 468, the output produced by step 830 is the FLASH_F_NUMBER parameter.

Figure 9:
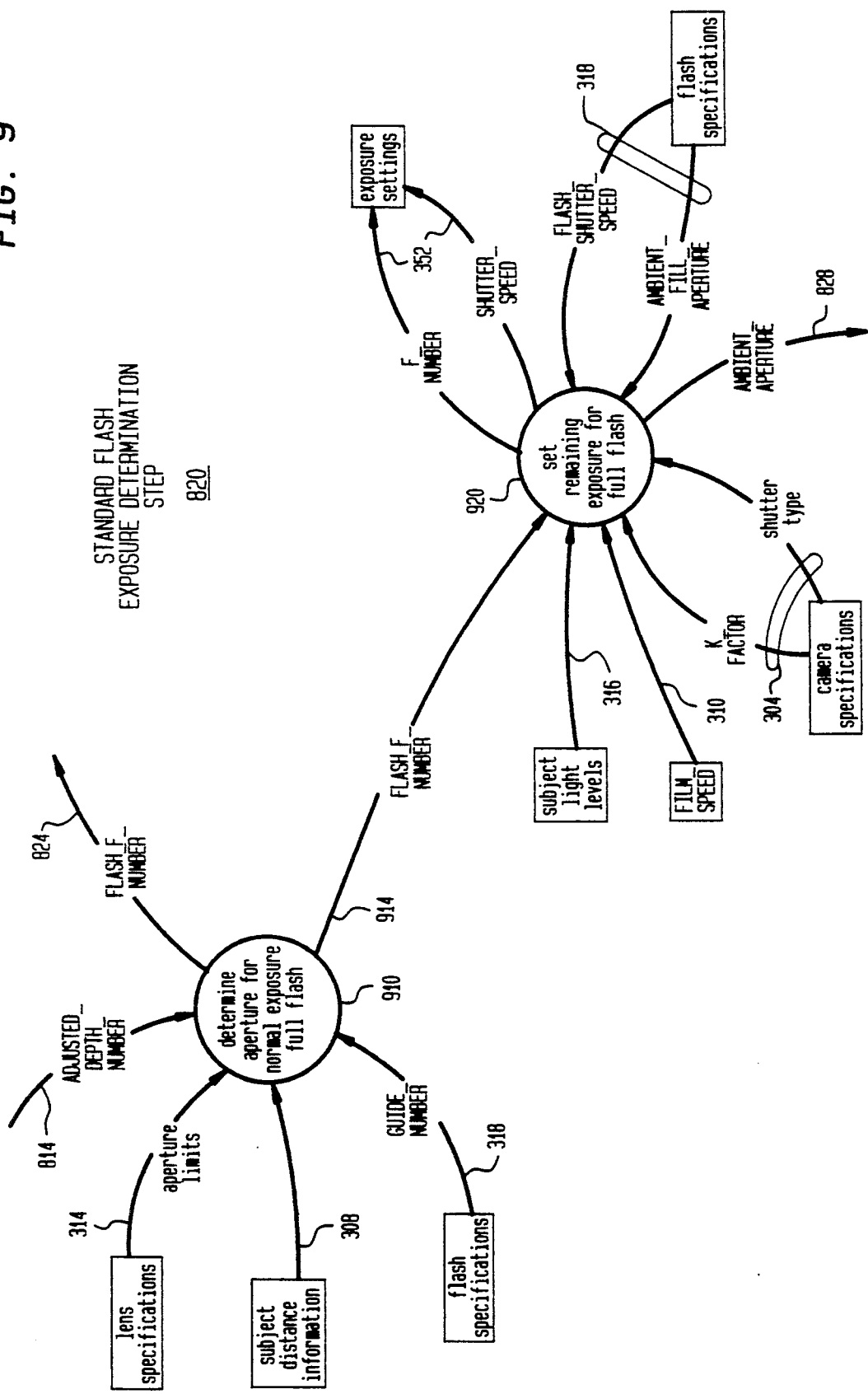
FIG. 9 depicts an operational diagram of standard flash exposure determination step 820 shown in FIG. 8.

FIG. 9 depicts an operational diagram of standard flash exposure determination step 820 shown in FIG. 8. As discussed above, this step determines a lens aperture setting needed for a baseline full flash exposure, and, if realistically possible, increased the background exposure by varying the lens aperture setting. This step is formed of two separate primitive steps: determining aperture for normal exposure with full flash step 910 and setting remaining exposure for full flash step 920. Step 910 determines the appropriate lens aperture setting to yield the baseline exposure for full flash illumination. Specifically, if the output power of the flash unit, i.e. the value of the GUIDE_NUMBER, is more than that which is required by the scene, i.e. as specified by the value of the ADJUSTED_DEPTH_NUMBER, than the lens aperture setting (here the FLASH_F_NUMBER) is determined by the step using the value of the ADJUSTED_DEPTH_NUMBER; otherwise, all the available flash power is used and the lens aperture is based upon the value of the GUIDE_NUMBER. The lens aperture value is clipped, if necessary, by the aperture limits. As represented by lines 814, 314, 308, 318 and 412, step 910 utilizes as input: ADJUSTED_DEPTH_NUMBER; lens specification—specifically aperture limits; subject distance information; flash specifications—specifically GUIDE_NUMBER; and the full_flash_condition. The output produced by this step is the FLASH_F_NUMBER, as represented by lines 824 and 914. Step 910 is formed of the following routine expressed in high level functional programming terms:

```
INPUT: ADJUSTED_DEPTH_NUMBER
INPUT: flash specifications
INPUT: subject distance information
INPUT: lens specifications
INPUT: full_flash_condition
OUTPUT: FLASH_F_NUMBER
IF full_flash_condition = YES
  THEN:
    IF GUIDE_NUMBER > ADJUSTED_DEPTH_NUMBER
    THEN:
      FLASH_F_NUMBER = ADJUSTED_DEPTH_NUMBER/
        PRIMARY_SUBJECT_DISTANCE
    ELSE:
      FLASH_F_NUMBER = GUIDE_NUMBER/
        PRIMARY_SUBJECT_DISTANCE
    ENDIF
```

```
        IF FLASH_F_NUMBER < MAXIMUM_APERTURE
          THEN: FLASH_F_NUMBER = MAXIMUM_APERTURE
          ELSE: IF FLASH_F_NUMBER > MINIMUM_APERTURE
             THEN: FLASH_F_NUMBER = MINIMUM_APERTURE
             ENDIF
           ENDIF
ENDIF
```

Once the baseline lens aperture setting (here FLASH_F_NUMBER) for a full flash exposure is determined through step 910, then step 920 is performed to appropriately vary the lens aperture setting to provide background fill. Specifically, if a programmable shutter is available, then a different lens aperture setting is used for the ambient aperture in order to provide ambient fill; otherwise, the ambient aperture is the same as the lens aperture setting selected for use with full flash illumination. As represented by lines 914, 316, 310, 304 and 318, step 920 utilizes the following inputs: FLASH_F_NUMBER; subject light levels, FILM_SPEED, camera specifications—specifically K_FACTOR and shutter type; and flash specifications—specifically AMBIENT_FILL_APERTURE and FLASH_SHUTTER_SPEED. As output, step 920 produces, as represented by lines 828 and 352: AMBIENT_APERTURE, and exposure settings—specifically F_NUMBER and SHUTTER_SPEED. Step 920 is formed of the following routine expressed in high level functional programming terms:

from the flash and ambient fill illumination. To do so, step 1010 first determines the value of parameter FLASH_LOG_E_DIFFERENCE, which we define as the log E exposure difference between the primary subject and background attributable solely to flash fall-off. Next, the value of parameter AMBIENT_LOG_E_DIFFERENCE is determined. We define the AMBIENT_LOG_E_DIFFERENCE parameter to be the difference in the lighting levels between that of the primary subject and the background attributable to an ambient fill. Thereafter, a lens aperture setting, in terms of f-number, i.e. NORMAL_EXP_F_NUMBER, is determined for an ambient fill exposure to yield a baseline non-flash exposure (typically a ISO normal) value. Given this lens aperture setting and the AMBIENT_APERTURE setting, the amount of fill flash, i.e. the value of parameter AMBIENT_FILL_LOG_E_DIFFERENCE, is determined. With these exposure differences, step 1010 then determines the overall lighting difference between the primary and background subjects. As represented by lines 310, 318, 304,

```
INPUT: camera specifications
INPUT: flash specifications
INPUT: FLASH_F_NUMBER
INPUT: FILM_SPEED
INPUT: subject light levels
OUTPUT: AMBIENT_APERTURE
OUTPUT: F_NUMBER
OUTPUT: SHUTTER_SPEED
IF shutter type = PROGRAMMABLE
   THEN:
     SHUTTER_SPEED = FLASH_SHUTTER_SPEED
     AMBIENT_APERTURE = √(FLASH_SHUTTER_SPEED ·
        FILM_SPEED · BACKGROUND_LIGHT_LEVEL)/
        K_FACTOR)
     IF AMBIENT_APERTURE < AMBIENT_FILL_APERTURE
        THEN: AMBIENT_APERTURE = AMBIENT_FILL_APERTURE
        ENDIF
     F_NUMBER = AMBIENT_FILL_APERTURE
   ELSE:
     SHUTTER_SPEED = FLASH_SHUTTER_SPEED
     AMBIENT_APERTURE = FLASH_F_NUMBER
     F_NUMBER = FLASH_F_NUMBER
ENDIF
```

Figure 10:
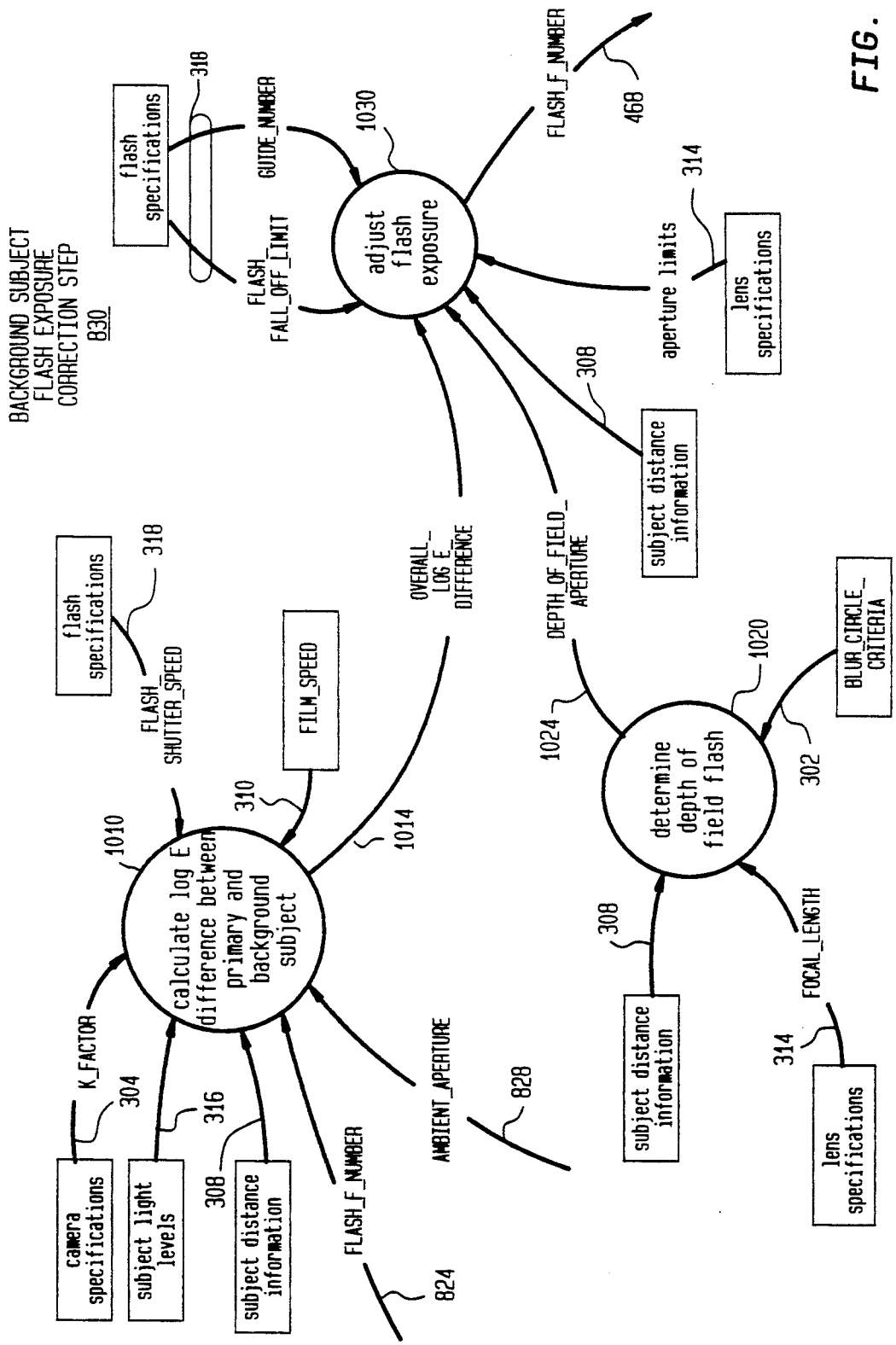
FIG. 10 depicts an operational diagram of background subject flash exposure correction step 830 also shown in FIG. 8.

FIG. 10 depicts an operational diagram of background subject flash exposure correction step 830 shown in FIG. 8. As discussed above, this step is used in full flash exposures after the baseline lens aperture setting has been adjusted to provide background fill, to re-assess the depth-of-field requirements of the scene and appropriately adjust the lens aperture setting in an effort to achieve the required depth-of-field. This step, as shwon in FIG. 10, is formed of three primitive steps: calculating log E differences between primary and background subjects step 1010, determining depth-of-field for flash step 1020 and adjusting flash exposure step 1030.

Step 1010 calculates the difference in exposure, in terms of log E, between the primary subject and the background exposures of the scene as they would result 316, 308, 824 and 828, the inputs applied to step 1010 are: FILM_SPEED; flash specifications—specifically FLASH_SHUTTER_SPEED; camera specifications—K_FACTOR; subject light levels; subject distance information; FLASH_F_NUMBER; and AMBIENT_APERTURE. The output parameter produced by step 1010, as represented by line 1014, is OVERALL_LOG_E_DIFFERENCE, which we define as follows.

20. OVERALL_LOG$_{13}$ E_DIFFERENCE

The value of this parameter is the total overall lighting difference, measured in terms of log E, between the primary subject and the background.

Step 1010 is formed of the following routine expressed in high level functional programming terms:

```
INPUT: subject light levels
INPUT: subject distance information
INPUT: FLASH_F_NUMBER
INPUT: AMBIENT_APERTURE
INPUT: flash specifications
INPUT: FILM_SPEED
INPUT: camera specifications
OUTPUT: OVERALL_LOG_E_DIFFERENCE
FLASH_LOG_E_DIFFERENCE =
    log[(PRIMARY_SUBJECT_DISTANCE/
        BACKGROUND_SUBJECT_DISTANCE)$^2$]
AMBIENT_LOG_E_DIFFERENCE =
    log(BACKGROUND_SUBJECT_LIGHT_LEVEL/
        PRIMARY_SUBJECT_LIGHT_LEVEL)
NORMAL_EXP_F_NUMBER = $\sqrt{}$((FLASH_SHUTTER_SPEED ·
    FILM_SPEED · PRIMARY_LIGHT_LEVEL)/(K_FACTOR))
AMBIENT_FILL_LOG_E_DIFFERENCE =
    log[(NORMAL_EXP_F_NUMBER/AMBIENT_APERTURE)$^2$]
OVERALL_LOG_E_DIFFERENCE = AMBIENT_LOG_E_DIFFERENCE +
    log(EXP(FLASH_LOG_E_DIFFERENCE) +
        EXP(AMBIENT_FILL_LOG_E_DIFFERENCE)).
```

Step 1020 calculates the depth-of-field that is required in full flash situations to meet the scene requirements where background fill is to occur. Specifically, as shown by lines 302, 314 and 308, this step utilizes as input: BLUR_CIRCLE_CRITERIA; lens specifications—specifically the FOCAL_LENGTH; and subject distance information. The output provided by step 1020, as represented by line 1024, is a DEPTH_OF_FIELD_APERTURE parameter, which we define as:

21. DEPTH_OF_FIELD_APERTURE

The value of this parameter is the lens aperture setting that is necessary to meet the depth-of-field requirements in the scene.

Step 1020 is formed of the following routine expressed in high level functional programming terms:

```
INPUT: subject distance information
INPUT: lens specifications
INPUT: BLUR_CIRCLE_CRITERIA
OUTPUT: DEPTH_OF_FIELD_APERTURE
DEPTH_OF_FIELD_APERTURE =
    [BACKGROUND_SUBJECT_DISTANCE · FOCAL_LENGTH$^2$ -
     PRIMARY_SUBJECT_DISTANCE · FOCAL_LENGTH$^2$]/
    [BLUR_CIRCLE_CRITERIA · 25.4 ·
     PRIMARY_SUBJECT_DISTANCE ·
     BACKGROUND_SUBJECT_DISTANCE · 304.8]
```

Given the required depth-of-field calculated by step 1020 for the current scene being photographed and the resulting overall primary subject to background exposure difference as determined by step 1010, step 1030 is then performed to appropriately adjust the lens aperture setting for use with a full flash in an attempt to meet this depth-of-field requirement. In essence, if the background will possess an exposure level that is greater than the flash fall-off limit, then the depth-of-field is increased, up to the limits of the available output power of the flash, to meet the scene requirements. Specifically, step 1030 first determines whether the background will still be significantly darker, in view of the flash fall-off, than the primary subject. If it is darker, then the calculated lens aperture value is not changed from its prior value determined in step 1010 for full flash illumination. Alternatively, if the exposure difference is less than the flash fall-off limit, then a test is made to determine whether sufficient flash power exists to meet the depth-of-field requirements in the scene. If sufficient power exists, then the flash aperture value (i.e. the lens aperture setting used for flash exposure) is accordingly changed to a value that satisfies the depth-of-field requirements of the scene. If insufficient flash power exists, the lens aperture value is calculated to be that which utilizes all the available power even though the resulting increase in depth-of-field provided by the calculated lens aperture value is insufficient to fully satisfy the scene requirements. Appropriate checks are then made of the resulting lens aperture value against the physical maximum and minimum limits of the lens aperture, with the calculated lens aperture being set to a corresponding limit value, if necessary. As represented by lines 318, 1014, 1024, 308 and 314, step 1030 utilizes the following as input: flash specifications—FLASH_FALL_OFF_LIMIT and GUIDE_NUMBER; OVERALL_LOG_E_DIFFERENCE; DEPTH_OF_FIELD_APERTURE; subject distance information; and lens specifications—specifically aperture limits. The output from step 1030 is the latest value of the FLASH_F_NUMBER, as represented by line 468. Step 1030 is formed of the following routine expressed in high level functional programming terms:

```
INPUT: OVERALL_LOG_E_DIFFERENCE
INPUT: flash specifications
INPUT: GUIDE_NUMBER
INPUT: DEPTH_OF_FIELD_APERTURE
INPUT: subject distance information
INPUT: lens specifications
OUTPUT: FLASH_F_NUMBER
```

```
IF OVERALL_LOG_E_DIFFERENCE < -FLASH_FALL_OFF_LIMIT
  THEN: FLASH_F_NUMBER = FLASH_F_NUMBER
  ELSE:
        IF (DEPTH_OF_FIELD_APERTURE
              · PRIMARY_SUBJECT_DISTANCE) < GUIDE_NUMBER
           THEN: FLASH_F_NUMBER = DEPTH_OF_FIELD_APERTURE
           ENDIF
ELSE: FLASH_F_NUMBER = GUIDE_NUMBER
                     / PRIMARY_SUBJECT_DISTANCE
  ENDIF
IF FLASH_F_NUMBER < MINIMUM_F_NUMBER
  THEN: FLASH_F_NUMBER = MINIMUM_F_NUMBER
  ELSE:
        IF FLASH_F_NUMBER > MAXIMUM_F_NUMBER
           THEN: FLASH_F_NUMBER = MAXIMUM_F_NUMBER
           ENDIF
  ENDIF
```

Now, at this point in our entire inventive process as shown in FIG. 4, process 410, and either process 450 or process 420 and either process 430 or 440 have been fully performed. As such, the appropriate lighting has been selected, i.e. ambient illumination, fill or full flash illumination, and proper baseline exposure settings and flash parameters have been determined for the current scene. Furthermore, where full flash illumination is being used, as fully described above, these baseline exposure settings include variations, where necessary, from the ISO standard exposure values in order to meet the depth-of-field requirements of the scene. Given these baseline exposure values, process 460 is now performed. This particular process, as noted above: (a) determines, based in part upon scene requirements, whether and how much extra system speed exists in the current photographic situation, (b) specifies a prioritized incremental manner through which the extra system speed can best be used to improve the quality of the resulting photographed image beyond that obtainable through the base-line exposure settings, and then (c) modifies the previously determined base-line exposure settings and output flash parameters using this manner in order to utilize as much as possible of the extra system speed in improving the quality of the photographed image beyond that obtainable by the ISO normal exposure settings.

Figure 11:
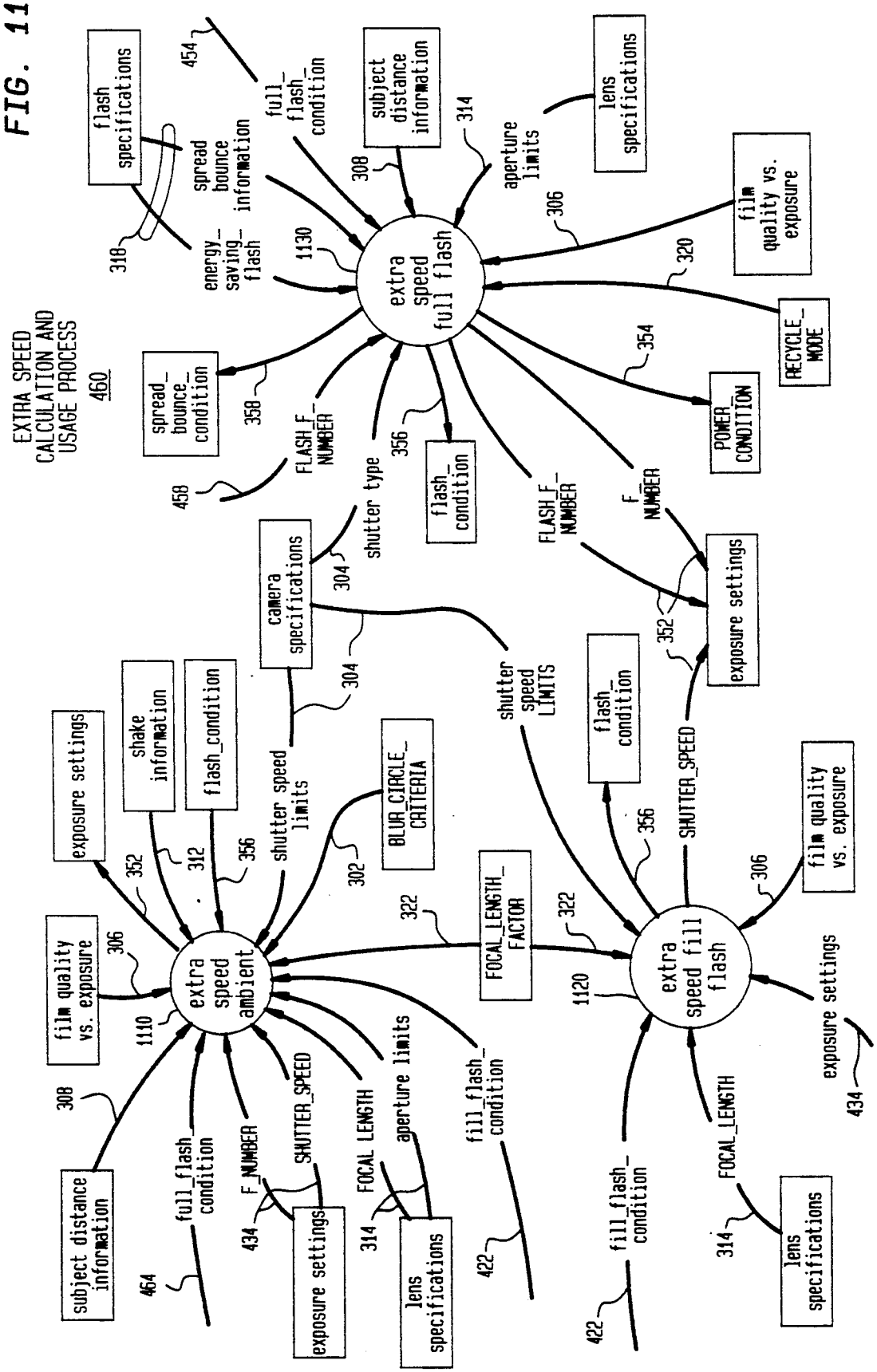
FIG. 11 depicts a high level operational diagram of extra system speed calculation and usage process 460 also show in FIG. 4.

A high level operational diagram of extra system speed calculation and usage process 460 is shown in FIG. 11. As shown, this process is formed of three high level steps, only one of which is performed in any given photographic situation based upon the selected scene lighting. In this regard, process 460 contains extra speed ambient step 1110 which is performed if ambient lighting has been selected, extra speed fill flash step 1120 which is performed if fill flash has been selected, and extra speed full flash step 1130 which is performed if full flash has been selected. Though the input values applied to each of these steps varies based upon the specific step, each of these steps produces updated output values for the appropriate exposure settings—i.e. SHUTTER_SPEED, and/or F_NUMBER and where appropriate FLASH_F_NUMBER.

Extra speed ambient step 1110 utilizes, as represented by lines 312, 306, 308, 464, 434, 422, 302, 314, 322 and 304, the following as input: shake information; film quality vs. exposure; subject distance information; full_flash_condition; exposure settings—specifically F_NUMBER and SHUTTER_SPEED; fill_flash_condition; BLUR—CIRCLE—CRITERIA; lens speficiations—specifically FOCAL_LENGTH and aperture limits; FOCAL_LENGTH_FACTOR; and camera specificatons—specifically shutter speed limits. as discussed below in detail in conjunction with FIG. 12, this step updates the flash_condition, as represented by line 356, as "NO", where appropriate, determines whether extra system speed exists in an ambient lighting situation and appropriately varies the exposure settings, as represented by line 352 and specifically (though not shown) SHUTTER_SPEED and F_NUMBER, to consume as much of that extra system speed as possible in an effort to improve resulting image quality.

Extra speed fill flash step 1120 utilizes, as represented by lines 304, 322, 422, 314, 434 and 306, the following as input: camera specifications—specifically shutter speed limits; FOCAL_LENGTH_FACTOR; fill_flash_condition; lens specifications—specifically FOCAL_LENGTH, exposure settings and film quality vs. exposure. As discussed below in detail in conjunction with FIG. 13, this step updates the flash condition, as represented by line 356, as "YES", determines whether extra system speed exists in a fill flash lighting situation and appropriately varies the exposure settings, as represented by line 352 and specifically SHUTTER_SPEED, to consume as much of that extra system speed as possible in an effort to improve resulting image quality.

Extra speed full flash step 1130 utilizes, as represented by lines 308, 454, 318, 458, 304, 320, 306 and 314, the following as input: subject distance information; full_flash_condition; flash specifications—specifically energy_saving_flash and spread bounce information; FLASH_F_NUMBER; camera specifications—specifically shutter type; RECYCLE_MODE; film quality vs. exposure; and lens specifications—specifically aperture limits. As discussed below in detail in conjunction with FIG. 12, this 25 step updates the flash_condition, as represented by line 356, as "YES", determines whether extra system speed exists in a full flash lighting situation and appropriately varies the exposure settings, as represented by line 352 and specifically FLASH_F_NUMBER and F_NUMBER, and flash parameters, as represented by lines 354 and 358 and specifically POWER_CONDITION and spread_bounce_condition, to consume as much of that extra system speed as possible in an speed still remains, it is then consumed, after accounting for that which was implicitly consumed in intentional over-exposure of the film, by reducing the lens aperture (here FLASH_F_NUMBER) setting to impart additional depth-of-field to the resulting image.

Figure 12:
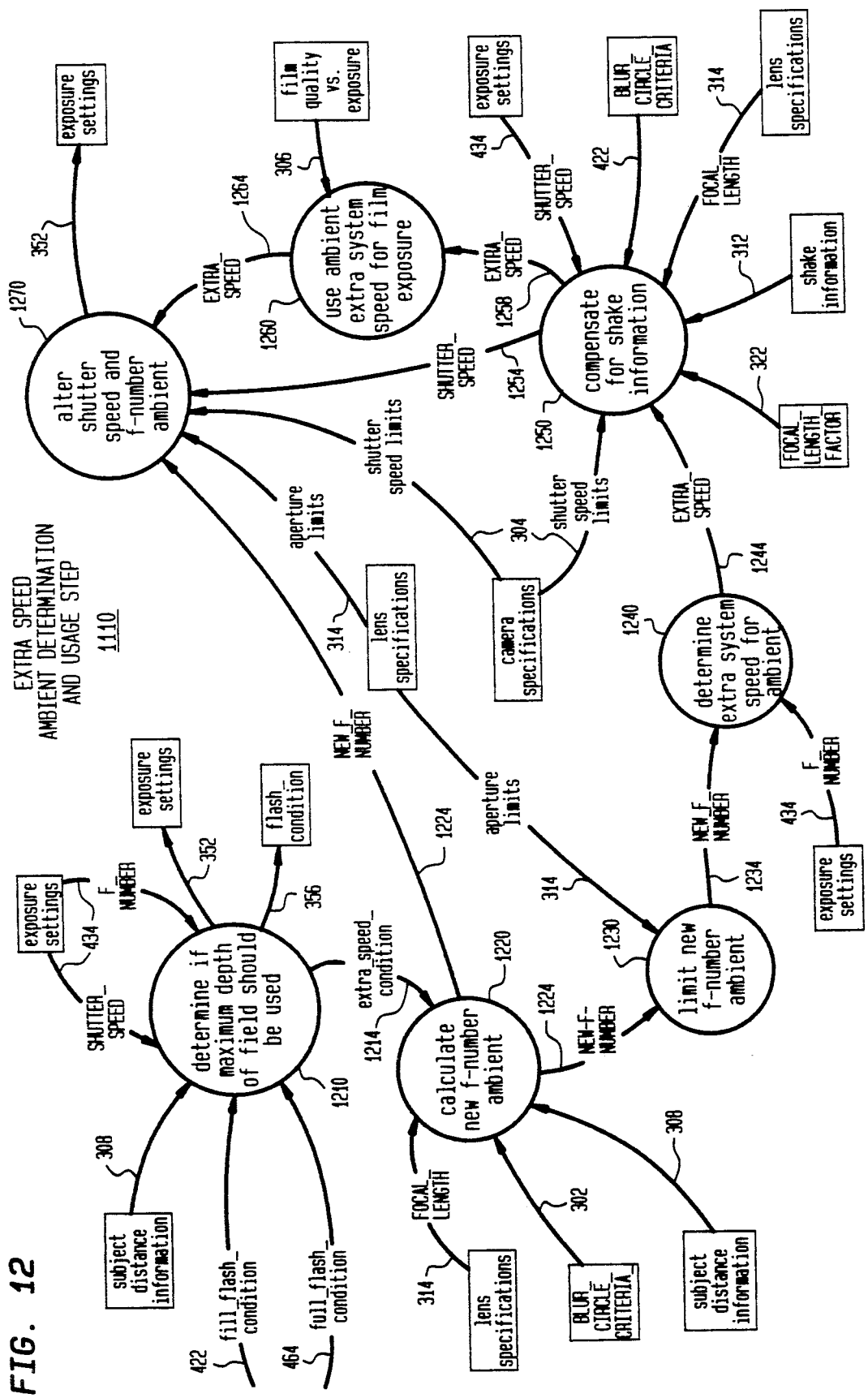
FIG. 12 depicts an operational diagram of extra speed ambient determination and usage step 1110 shown in FIG. 11.

An operational diagram of extra speed ambient determination and usage step 1110 is shown in FIG. 12. As shown, this step consists of seven primitive steps, all of which are performed to determine whether extra system speed exists in an ambient lighting situation and how that extra system speed, to the extent any exists, can best be used to vary the exposure settings and improve image quality. These seven steps include: determining if maximum depth-of-field should be used step 1210, calculating new f-number for ambient lighting step 1220, limiting the new ambient f-number step 1230, determining the amount of extra speed in ambient lighting step 1240, compensating for shake information step 1250, using the extra speed for film exposure step 1260, and altering the shutter speed and f-number for use in ambient lighting step 1270.

Upon entry into step 1110, step 1210 is first performed. This step determines if the background subject is at a so-called "infinite" distance from the camera and, if so and to provide largest possible depth-of-field, sets the value of the lens aperture to that which was previously selected as a baseline setting; otherwise, this step recognizes that an extra system speed condition may exist inasmuch as a larger lens aperture setting that provides less depth-of-field than the baseline lens aperture setting could be used instead. Specifically, up to now, for ambient lighting, a baseline shutter speed was selected, through process 440 (see FIG. 4 which was discussed in detail above), to be the slowest shutter speed that reduces camera shake. Given this shutter speed, a baseline lens aperture size was chosen, again through process 440, as that which provides a baseline (e.g. ISO normal) exposure. The baseline lens aperture setting was selected without any regard to the actual depth-of-field requirements of the current scene. Now, if the scene contains a rather thick subject, having a portion located at so-called "infinity", then a large depth-of-field will be required to sharply capture the entire subject. In this case, the value for the lens aperture will simply be set, through step 1210 shown in FIG. 12, to its baseline value inasmuch as this value, which is the smallest aperture setting that can be used to yield a baseline exposure of the current scene, will impart the largest available depth-of-field to the photographed image of this scene. No extra system speed will exist in this case. Alternatively, if the subject is thin, i.e. located closer to the camera then "infinity", then a large depth-of-field may not be necessary. Hence, a larger lens aperture setting, which provides less depth-of-field, than the baseline lens aperture value could be used instead. As such, extra system speed may exist in this situation and, if it exists, could be used in other ways to improve image quality than by merely setting the lens aperture at its baseline value which would provide excessive and unnecessary depth-of-field for the current scene. As such, an extra speed condition will exist. Alternatively, if either a fill or full flash is to be used in lieu of ambient lighting, then execution of step 1210 merely terminates through the first IF statement without, for example, having set the lens aperture to its baseline value that provides maximal depth-of-field. Specifically, step 1210 utilizes, as represented by lines 434, 308, 422 and 464, the following as input: exposure settings—specifically SHUTTER_SPEED and F_NUMBER, subject distance information; fill_flash_condition; and full_flash_condition. As represented by lines 352, 356 and 1214, step 1210 updates and provides the latest values for the exposure settings as output parameters along with the flash_condition and extra_speed_condition; this last category being defined as follows:

22. extra_speed_condition

This category contains one digital parameter that merely specifies (YES/NO) whether or not extra system speed exists.

Step 1210 is formed of the following routine expressed in high level functional programming terms:

```
INPUT: subject distance information
INPUT: fill_flash_condition
INPUT: full_flash_condition
INPUT: exposure settings
UPDATE: exposure settings
UPDATE: flash_condition
OUTPUT: extra_speed_condition
IF (fill_flash_condition = NO) AND
     (full_flash_condition = NO)
    THEN: flash_condition = NO
    IF BACKGROUND_SUBJECT_DISTANCE = infinity
        THEN: SHUTTER_SPEED = SHUTTER_SPEED
            F_NUMBER = F_NUMBER
            extra_speed_condition = NO
        ELSE: extra_speed_condition = YES
    ENDIF
ENDIF
```

If an extra speed condition exists, then, as indicated by line 1214, step 1220 is performed. This step calculates a lens aperture setting that meets the actual non-infinite depth-of-field required to sharply capture both the primary and background subjects in the current scene, thereby satisfying the scene requirements. Specifically, as represented by lines 1214, 314, 302 and 308, step 1220 utilizes the following as input: extra_speed_condition, lens specifications—specifically FOCAL_LENGTH, BLUR_CIRCLE_CRITERIA and subject distance information. As represented by lines 1224, step 1220 produces a new value, i.e. NEW_F_NUMBER, for the lens aperture setting that meets the required depth-of-field in the scene. This step is formed of the following routine expressed in high level functional programming terms:

```
INPUT: extra_speed_condition
INPUT: BLUR_CIRCLE_CRITERIA
INPUT: subject distance information
INPUT: lens specifications
OUTPUT: NEW_F_NUMBER
IF extra_speed_condition = YES
    THEN:
        NEW_F_NUMBER =
            [BACKGROUND_SUBJECT_DISTANCE · FOCAL_LENGTH²
            − PRIMARY_SUBJECT_DISTANCE · FOCAL_LENGTH²]
            / [BLUR_CIRCLE_CRITERIA · 25.4
            · PRIMARY_SUBJECT_DISTANCE
            · BACKGROUND_SUBJECT_DISTANCE · 304.8]
ENDIF
```

Once the new lens aperture setting is determined, then step 1230 is performed to check the new lens aperture setting against the physical limits of the lens aperture and, if necessary, clip the new lens aperture value to an appropriate limit value. Step 1230 merely utilizes, as represented by lines 1224 and 314, as input: the NEW_F_NUMBER and the lens specifications—specifically aperture limits. An updated NEW_F_NUMBER is provided as an output value by this step, as represented by line 1224. Step 1230 is formed of the following routine expressed in high level functional programming terms:

```
INPUT: lens specifications
UPDATE: NEW_F_NUMBER
IF NEW_F_NUMBER < MINIMUM_F_NUMBER
    THEN: NEW_F_NUMBER = MINIMUM_F_NUMBER
    ELSE: IF NEW_F_NUMBER > MAXIMUM_F_NUMBER
            THEN: NEW_F_NUMBER = MAXIMUM_F_NUMBER
          ENDIF
ENDIF
```

Next, step 1240 is performed to determine the amount of extra system speed that initially exists in the current ambient lighting situation. The extra system speed is calculated, in numerical log exposure terms, as the ratio between the baseline lens aperture value to the new lens aperture setting, i.e. NEW_F_NUMBER, that meets the scene depth-of-field requirement. If extra system speed does exist, then the lens aperture is set to the value of NEW_F_NUMBER which provides a depth-of-field which meets the scene requirements. This, in turn, permits the available extra system speed to be utilized in other ways rather than wasting it on providing unnecessary additional depth-of-field over that needed in the scene; the additional depth-of-field will not noticeably improve image quality, if at all. Specifically, the amount of extra speed is calculated from the speed difference, in logarithmic terms, between the values of the NEW_F_NUMBER and the baseline value for F_NUMBER. As represented by lines 1234 and 434, step 1240 merely utilizes the following inputs: NEW_F_NUMBER and F_NUMBER. As represented by line 1244, step 1240 provides the amount of available extra system speed, EXTRA_SPEED, as an output value. Step 1240 is formed of the following routine expressed in high level functional programming terms:

```
INPUT: NEW_F_NUMBER
INPUT: F_NUMBER
OUTPUT: EXTRA_SPEED
EXTRA_SPEED = 2 · LOG(F_NUMBER / NEW_F_NUMBER)
IF EXTRA_SPEED > 0
    THEN: F_NUMBER = NEW_F_NUMBER
ENDIF
```

Once the amount of extra system speed that is initially available has been provided by step 1240, step 1250 is performed to determine if a faster shutter speed than the corresponding baseline value can be chosen in order to provide increased compensation for camera shake and hence improved image quality. Increased shake compensation is the first and, as we see it, the most important manner through which available extra system speed can be consumed in an ambient lighting situation; using all, or at least a portion of the available, extra speed in this manner takes priority over using available extra system speed to decrease the lens aperture to provide increased depth-of-field. Even through a baseline shutter speed was previously selected, in the manner set forth above, to reduce camera shake, this speed is based on an empirical rule that may be violated by a photographer that has a particularly unsteady hand. Camera shake, to the extent it is noticeable on a photographed image, will ruin that entire image.

The amount through which the shutter speed is increased to provide additional shake compensation is determined by the amount of available extra system speed and the actual measured shake information. Specifically, a shutter speed, i.e. NEEDED_SHUTTER_SPEED, that is sufficient to compensate for actually occurring camera shake, is determined based upon the ratio fo the allowable fraction of the blur circle criteria attributable to camera shake, i.e. STANDARD_SHAKE_FRACTION, and the actual measured real-time camera shake, i.e. BLUR_FROM_SHAKE. The resulting baseline and new shutter speeds are then compared. If the new shutter speed is faster than the baseline shutter speed, then the shutter speed is set to the new shutter speed. In addition, the available amount of extra system speed is then appropriately reduced by the amount of extra system speed that is needed for utilizing a faster shutter speed. However, as a check, if the remaining amount of extra system speed is negative, then more extra system speed was utilized than is available. Hence, the new shutter speed is set to whatever shutter speed reduces the available extra system speed to zero. Alternatively, if the baseline shutter speed is faster than the new shutter speed—such as would result if the camera happened to be mounted on a tripod and essentially no camera shake was actually measured, then the shutter speed remains at the baseline value, and the amount of available extra system speed is not reduced. The resulting shutter speed is then compared against a physical limit value, i.e. MINIMUM_SHUTTER_SPEED, for the fastest shutter speed that can be used and, if necessary, clipped to that limit value with the available extra system speed then being re-calculated using that limit value. Depending upon the initial amount of available extra system speed and the amount consumed by varying the actual shutter speed, a positive non-zero amount of extra system speed may remain for subsequent use, as described below, in photographing the current scene. Specifically, step 1250 utilizes, as represented by lines 304, 1244, 322, 314, 422 and 434, the following as input: camera specifications—specifically shutter speed limits, EXTRA_SPEED, FOCAL_LENGTH_FACTOR, shake information, lens specifications—specifically FOCAL_LENGTH, BLUR_CIRCLE_CRITERIA and exposure settings—specifically SHUTTER_SPEED. Step 1250 produces, as represented by lines 1254 and 1258, updated values of SHUTTER_SPEED and EXTRA_SPEED. Step 1250 is formed of the following routine expressed in high level functional programming terms:

```
INPUT: shake information
INPUT: FOCAL_LENGTH_FACTOR
INPUT: lens specifications
INPUT: BLUR_CIRCLE_CRITERIA
INPUT: camera specifications
UPDATE: EXTRA_SPEED
UPDATE: SHUTTER_SPEED
FRACTION_SHAKE_BLUR = BLUR_FROM_SHAKE
        / BLUR_CIRCLE_CRITERIA
NEEDED_SHUTTER_SPEED = (STANDARD_SHAKE_FRACTION
        / FRACTION_SHAKE_BLUR) · (1/FOCAL_LENGTH)
        · (FOCAL_LENGTH_FACTOR)
IF NEEDED_SHUTTER_SPEED < SHUTTER_SPEED
    THEN: EXTRA_SPEED = EXTRA_SPEED
            − log(SHUTTER_SPEED / NEEDED_SHUTTER_SPEED)
        IF EXTRA_SPEED < 0
            THEN: SHUTTER_SPEED = NEEDED_SHUTTER_SPEED
                    / (10^{EXTRA−SPEED})
                EXTRA_SPEED = 0
            ELSE: SHUTTER_SPEED = NEEDED_SHUTTER_SPEED
        ENDIF
    ENDIF
IF SHUTTER_SPEED < MINIMUM_SHUTTER_SPEED
    THEN: EXTRA_SPEED = log(MINIMUM_SHUTTER_SPEED
            / SHUTTER_SPEED)
        SHUTTER_SPEED = MINIMUM_SHUTTER_SPEED
ENDIF
```

At this point, a lens aperture has been selected to meet the depth-of-field requirements in the scene. Also, a shutter speed has been chosen that reduces actual camera shake. If extra system speed still remains, step 1260 is performed to account for the extra system speed that was implicitly consumed in having varied the exposure of the specific film in use, based upon the film quality vs. exposure characteristic of the specific film, by intentional over- or under-exposure from the ISO-/ANSI exposure standards. As will be discussed below, the variation comes about from the prior selection of a combination of shutter speed and lens aperture settings that meets the current scene requirements. The amount of extra system speed that is consumed in this step depends upon the specific exposure characteristic of the film. Step 1260 utilizes, as represented by lines 306 and 1258, two inputs: film quality vs. exposure information (specifically tables of pre-defined values) and EXTRA_SPEED. The output produced by this step, as represented by line 1264, is an updated amount of EXTRA_SPEED that still exists. Our inventive process can function with any one of a number of different types of film. As noted above, film type information is read by the camera microcomputer through the "DX" contacts from the film canister. The type information would then be use within step 1260 and similar steps, e.g. steps 1320 and 1440 (as discussed in detail below) to select a particular table of film quality vs. exposure values whcih applies to the specific type of film currently in use from the different tables stored within ROM 255 (see FIG. 2). Nevertheless, to simplify the following discussion, the camera will hereinafter be assumed to function with only one type of film thereby requiring only one table of film quality vs. exposure values to be stored within ROM 255 and eliminating the need within steps 1260, 1320 and 1440 to select one of a number of different tables based upon film type. With this simplification in mind, step 1260, shown in FIG. 12, is formed of the following routine expressed in high level functional programming terms, with the following film quality vs. exposure table being merely illustrative:

```
INPUT: film quality vs. exposure
UPDATE: EXTRA_SPEED
```

```
DEFINE TABLE:
    EXTRA_SPEED IN        EXTRA_SPEED OUT
        − 4.00                  − 3.85
        − 0.30                  − 0.15
        − 0.15                  − 0.00
          0.00                    0.00
          0.30                    0.00
          0.60                    0.00
          0.90                    0.30
          1.20                    0.60
          5.00                    4.40
EXTRA_SPEED = TABLE (EXTRA_SPEED)
```

The tab ts are linearly interpolated to determine the output values for EXTRA_SPEED given input values intermediate to those shown immediately above.

In understanding the use and meaning of this table, note that once the shutter speed and lens aperture size settings are chosen to meet the scene requirements for the specific film characterized by the table, these settings for the specific film type will cause an intentional two-stop over-exposure of the film from the ISO normal exposure values; this amount of over-exposure is typical of color negative print films. Quality improves, for the specific film defined in the table above, within a range of +2 stops above the ISO normal exposure point. The specific film defined in the table exhibits improved quality with increases in exposure above the ISO normal exposure point. It is possible to design a film that exhibits an even more dramatic quality improvement with over-exposure than that embodied in the table immediately above. Likewise, it is possible to design a film that has a quality vs. exposure profile that is nearly flat over a useful exposure range. Therefore, it is desirable to include the characteristics of the specific film in use in the corresponding quality vs. exposure table that will be used by our inventive process. Accordingly, a different quality vs. exposure table should be stored in the camera microcomputer system for each different corresponding film type that could be used in conjunction with our inventive process in that camera.

Now, if the extra system speed that exists immediately prior to performing step 1260 lies within a range of +2 stops to −0.5 stop, then this extra system speed has already been incorporated into the lens aperture and shutter speed settings and will manifest itself through a pre-defined amount of intentional over-exposure that will be inherently produced by these settings. Thus, no extra system speed remains. Alternatively, if the available extra system speed is greater than, for example, +2 stops (or expressed in logarithmic exposure terms as 0.6), then the remaining extra system speed which exceeds the extra system speed that has already been effectively incorporated into the lens aperture and shutter speed settings which meets the scene requirements (e.g. as shown in the table 0.3 if the available extra system speed is 0.9 and so on) is then supplied to step 1270 to further alter the shutter speed and/or lens aperture settings in an effort to further improve image quality. For this specific type of print film, image quality can only be improved by a +2 stop over-exposure since any further increases in film exposure would adversely increase image density and complicate the process of subsequently printing an image from the film negative.

Now, at this point, an appropriate lens aperture has been calculated that matches the depth-of-field requirements of the scene and a shutter speed has been selected that reduces the actual measured camera shake, while providing a measure of intentional over- or under-exposure of the film that optimally improves image quality. If, as discussed immediately above, remaining extra system speed still exists, then, step 1270 is performed to utilize all the remaining extra system speed in an attempt, to the extent possible, to further improve image quality. In this regard, rather than consuming the available extra system speed in further increasing the over-exposure of the image beyond two stops which, it this level of exposure, would tend to degrade image quality, step 1270 uses the available extra system speed to further decrease the numerical value of the shutter speed parameter, SHUTTER_SPEED, (i.e. to select a faster shutter speed which decreases the time during which the shutter is open) and/or to further decrease the size of the lens aperture, i.e. increase the numerical value of the F_NUMBER parameter. Decreasing the shutter speed in this fashion provides further compensation against camera shake; decreasing the size of the lens aperture imparts additional depth-of-field beyond that required by the scene to its photographed image. As will be seen, the changes made by step 1270 to the shutter speed and lens aperture settings are limited by the physical limits of respectively the shutter and aperture of the camera and lens. Having extra system speed at this point in step 1110 is not likely to occur often. However, one instance in which it may occur is illustratively exemplified by using a very fast film to photograph a brightly lit object, such as a one-dimensional object on a bright sunny day.

Step 1270 utilizes, as represented by lines 1224, 314, 304, 1254 and 1264, the following as input: NEW_F_NUMBER, lens specifications—specifically aperture limits, camera specifications—specifically shutter speed limits, SHUTTER_SPEED and EXTRA_SPEED. As output and as represented by line 352, step 1270 produces the latest values for the exposure settings—specifically SHUTTER_SPEED and F_NUMBER. Step 1270 is formed of the following routine expressed in high level functional programming terms:

```
INPUT: EXTRA_SPEED
INPUT: NEW_F_NUMBER
INPUT: lens specifications
INPUT: camera specifications
INPUT: SHUTTER_SPEED
OUTPUT: exposure settings
IF EXTRA_SPEED > 0
    THEN: EXTRA_SPEED_APERTURE = .5 · EXTRA_SPEED
          EXTRA_SPEED_SHUTTER = .5 · EXTRA_SPEED
    ELSE: EXTRA_SPEED_APERTURE = EXTRA_SPEED
          EXTRA_SPEED_SHUTTER = 0
ENDIF
EXTRA_SPEED = 0
F_NUMBER = 10^(EXTRA_SPEED_APERTURE/2) · NEW_F_NUMBER
EXTRA_SPEED_APERTURE = 0
IF F_NUMBER > MAXIMUM_APERTURE
    THEN: EXTRA_SPEED_SHUTTER = EXTRA_SPEED_SHUTTER
                + 2 · log(F_NUMBER / MAXIMUM_F_NUMBER)
          F_NUMBER = MAXIMUM_APERTURE
    ELSE: IF F_NUMBER < MINIMUM_APERTURE
            THEN: EXTRA_SPEED_SHUTTER = EXTRA_SPEED_SHUTTER
                    + 2 · log(F_NUMBER / MINIMUM_F_NUMBER)
                  F_NUMBER = MINIMUM_APERTURE
          ENDIF
ENDIF
SHUTTER_SPEED = SHUTTER_SPEED / 10^(EXTRA_SPEED)
EXTRA_SPEED_SHUTTER = 0
IF SHUTTER_SPEED < MINIMUM_SHUTTER_SPEED
    THEN: EXTRA_SPEED_APERTURE =
                log(MINIMUM_SHUTTER_SPEED / SHUTTER_SPEED)
          SHUTTER_SPEED = MINIMUM_SHUTTER_SPEED
    ELSE: IF SHUTTER_SPEED > MAXIMUM_SHUTTER_SPEED
            THEN: EXTRA_SPEED_APERTURE =
                    log(MAXIMUM_SHUTTER_SPEED
                        / SHUTTER_SPEED)
                  SHUTTER_SPEED = MAXIMUM_SHUTTER_SPEED
          ENDIF
```

```
                                        -continued
ENDIF
F_NUMBER = 10^(EXTRA-SPEED-APERTURE/2) . F_NUMBER
IF F_NUMBER > MAXIMUM_APERTURE
    THEN: F_NUMBER = MAXIMUM_APERTURE
    ELSE: IF F_NUMBER < MINIMUM_APERTURE
                F_NUMBER = MINIMUM_APERTURE
            ENDIF
    ENDIF
```

Specifically, in the event that the available extra system speed is positive, then step 1270, which is implemented through the routine shown immediately above, first partitions the extra system speed equally between the extra system speed that will be used to increase the value of F_NUMBER, i.e. EXTRA_SPEED_APERTURE, and that which will be used to decrease the value of SHUTTER_SPEED, i.e. EXTRA_SPEED_SHUTTER. Alternatively, if the available extra system speed is negative, then all the extra system speed is allocated to that used for changing the lens aperture setting. Since the parameter EXTRA_SPEED will not be used again during execution of the remainder of this routine, its value is reset to zero. Thereafter, a new lens aperture value is determined based upon the values of EXTRA_SPEED_APERTURE and NEW_F_NUMBER, the latter being the lens aperture value determined through step 1240 (as discussed above) that meets the depth-of-field requirements of the scene. Inasmuch as all the currently available extra system speed for the lens aperture has now been consumed in determining a new F_NUMBER value, the value of parameter EXTRA_SPEED_APERTURE is set to zero. The resulting F_NUMBER value is then checked against the limits of the lens in use. In the event that this value exceeds the maximum available f-number, i.e. MAXIMUM_F_NUMBER, for this lens, i.e. a smaller aperture opening beyond that which the lens can physically provide has been chosen, then the extra system speed that is available for use by the shutter is recalculated based on the value of the MAXIMUM_F_NUMBER parameter. In this case, since the extra system speed can not be utilized in choosing a smaller lens aperture opening, the extra system speed is effectively allocated to changing the shutter speed. The value of F_NUMBER is then set equal to MAXIMUM_F_NUMBER. Alternatively, in the event that the resulting value for F_NUMBER is less than the minimum available f-number, i.e. MINIMUM_F_NUMBER, for the lens, i.e. a larger aperture opening beyond that which the lens can physically provide has been chosen, then the extra system speed that is available for use by the shutter is re-calculated based on the value of the MINIMUM_F_NUMBER parameter. Here, since the extra system speed can not be utilized in choosing a larger lens aperture opening, the extra system speed is effectively allocated to changing the shutter speed. The value of F_NUMBER is then set equal to MINIMUM_F_NUMBER. This minimum limit condition can arise if a telephoto lens with a large focal length, which requires a very fast shutter speed to effectively compensate for camera shake, is being used with a film that has a relatively slow ISO (ASA) film speed. In any event, once the F_NUMBER has been appropriately set, then the shutter speed is re-calculated based upon the currently available extra system speed, EXTRA_SPEED_SHUTTER, that has been allocated to decreasing the shutter speed. Thereafter, since the parameter EXTRA_SPEED_SHUTTER will not be used again during execution of the remainder of this routine, the values of both of these parameters are reset to zero. Similar tests are now performed to determine if the resulting shutter speed exceeds a corresponding minimum (fastest) or maximum (slowest) shutter speed limit. If such a limit condition occurs, then any extra system speed that will now arise, due to use of shutter speed limit in lieu of the actual re-calculated shutter speed, is allocated to further decreasing the lens aperture opening Thus, is can be seen, if, as the exposure values are changed to utilize available extra system speed, the lens aperture value first encounters one of its corresponding limit values prior to the shutter speed encountering a corresponding limit value, then all the remaining extra system speed is then allocated to changing the shutter speed, and vice versa. Based upon the amount of EXTRA_SPEED_APERTURE that is now available, a new value for the lens aperture is calculated that consumes all this extra system speed. The latest resulting lens aperture value is checked against the physical lens aperture limit values and clipped, if necessary, by the appropriate limit value. If after the shutter speed and lens aperture settings have both been set to appropriate limit values and any extra system speed still remains, the camera, being totally operated at a physical limit condition (smallest aperture opening and fastest shutter speed), is simply unable to utilize the remaining extra system speed.

At this point, step 1270 has suitably adjusted the exposure settings, F_NUMBER and SHUTTER_SPEED, to utilize all the remaining extra system speed, up to the physical limits of the lens aperture and/or shutter, in an ambient lighting situation. As such, the latest values for the exposure settings produced by step 1270 are then applied by the camera microcomputer system, through its output circuitry, to appropriately drive the shutter and lens aperture mechanisms of the camera and photograph the current scene using ambient lighting This concludes execution of the inventive process for use with ambient lighting.

Figure 13:
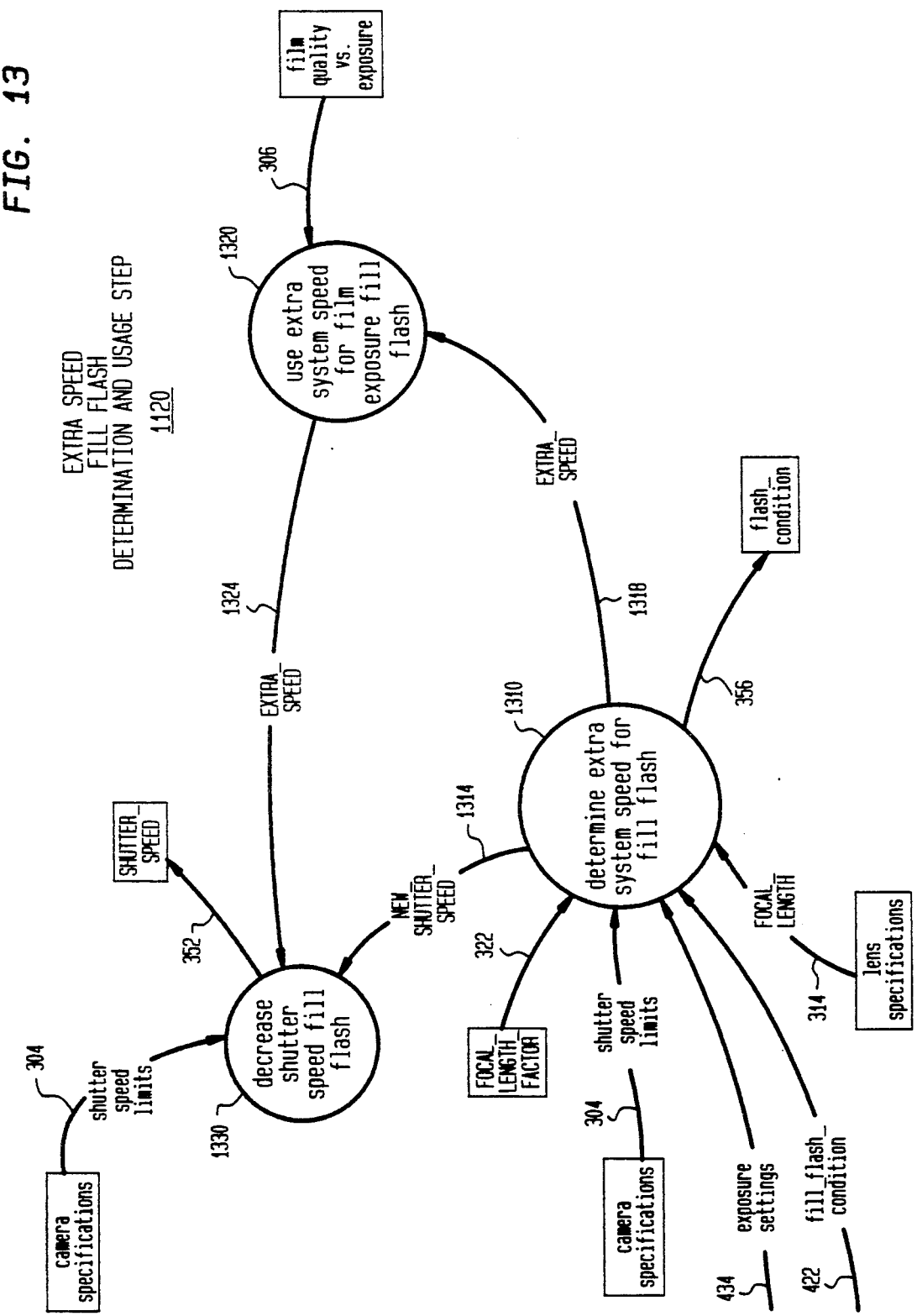
FIG. 13 depicts an operational diagram of extra speed fill flash determination and usage step 1120 also shown in FIG. 11.

Alternatively, as noted above, extra speed fill flash determination step 1120 is performed in conjunction with fill flash lighting. An operational diagram of extra speed fill flash determination and usage step 1120 is shown in FIG. 13. As noted above, this step updates the flash_condition as "YES", determines whether extra system speed exists in a fill flash lighting situation and appropriately varies the exposure settings (specifically SHUTTER_SPEED) to consume as much of that extra system speed as possible in an effort to improve resulting image quality. As shown, this step consists of three primitive steps, all of which are performed to determine whether extra system speed exists in an fill flash lighting situation and how that extra system speed, to the extent any exists, can best be used to vary the exposure settings and improve image quality. These steps include: determining the amount of extra speed in fill flash lighting step 1310, using the extra speed in fill flash for film exposure step 1320 and decreasing shutter speed for use with fill flash lighting step 1330.

Up to this point and prior to entering step 1310, exposure settings for fill flash have been determined through specifically steps 720 and 730 (see FIG. 7) to provide a lens aperture size and a shutter speed that are required to meet the current scene requirements, i.e. here providing proper exposure of both the primary subject and the background in the current scene. In a fill flash situation, as discussed above, the lens aperture setting determines the relative change in the exposure between the primary subject and the background. The primary subject is illuminated by both the flash, which is a very short duration burst of light, and the ambient lighting; the background is only illuminated by the ambient lighting. Therefore, since an appropriate amount of fill has already been determined, given the differing types of illumination, to appropriately increase the primary subject lighting and properly reduce scene contrast to a desired level and has been manifested in the selection of a proper lens aperture setting, the aperture setting will variation comes about from the prior selection of a combination of shutter speed and lens aperture settings that meets the current scene requirements. If any extra system speed still exists, then step 1330 is performed to select an appropriately faster shutter speed than the acceptable shutter speed in order to utilize all the remaining extra system speed.

Step 1310 utilizes, as represented by lines 322, 304, 434, 422, and 314, the following inputs: FOCAL__LENGTH__FACTOR, camera specifications—specifically shutter speed limits, exposure settings, fill__flash__condition, and lens specifications—specifically FOCAL__LENGTH. This step updates, as represented by line 356, the value of flash__condition to "YES" to signify that flash illumination is to be used and produces, as represented by lines 1314 and 1318, the following as output: the acceptable shutter speed that can be used with fill flash, i.e. NEW__SHUTTER__SPEED, and the amount of available extra system speed, i.e. EXTRA__SPEED, that is currently available with the fill flash lighting. Step 1310 is formed of the following routine expressed in high level functional programming terms:

```
INPUT: FOCAL_LENGTH_FACTOR
INPUT: camera specifications
INPUT: exposure settings
INPUT: fill_flash_condition
INPUT: lens specifications
UPDATE: flash_condition
OUTPUT: EXTRA_SPEED
OUTPUT: NEW_SHUTTER_SPEED
IF fill_flash_condition = YES
    THEN: flash_condition = YES
        MAXIMUM_USABLE_SHUTTER_SPEED =
            FOCAL_LENGTH_FACTOR · (1/FOCAL_LENGTH)
        IF MAXIMUM_USABLE_SHUTTER_SPEED >
            MAXIMUM_SHUTTER_SPEED
            THEN: NEW_SHUTTER_SPEED = MAXIMUM_SHUTTER_SPEED
            ELSE: NEW_SHUTTER_SPEED =
                    MAXIMUM_USABLE_SHUTTER_SPEED
        ENDIF
        EXTRA_SPEED =
            log(NEW_SHUTTER_SPEED / SHUTTER_SPEED)
ELSE: NEW_SHUTTER_SPEED = SHUTTER_SPEED
        EXTRA_SPEED = 0
ENDIF
``` not be changed thereafter even if extra system speed is present. Any such change will vary the resulting lighting levels between the primary subject and background in the photographed image and adversely affect image quality. However, variations in the shutter speed will not only advantageously preserve the relative difference between these lighting levels but will also permit the overall exposure of the image to be changed. Consequently, with fill flash, only the shutter speed is varied, in the manner that will now be discussed below, to utilize available extra system speed.

In particular and as shown in FIG. 13, upon entry into step 1120, step 1310 is first performed. Step 1310 determines if a slower shutter speed than that previously determined would be acceptable for use with fill flash to photograph the current scene. If a slower shutter speed would be acceptable, then extra system speed exists. Step 1310 then determines the amount of extra system speed that is initially available. Step 1320 is then performed to account for the amount of extra system speed that was implicitly consumed in intentionally under- or over-exposing the specific film in use, given its film quality vs. exposure characteristic, from the ISO/ANSI exposure standards. As noted above, the As noted above, step 1310 first determines the slowest (maximum) shutter speed, i.e. MAXIMUM__USABLE__SHUTTER__SPEED, given the focal length of the current lens in use and the FOCAL__LENGTH__FACTOR parameter, that is acceptable to photograph the current scene to reduce camera shake. Then, based upon the previously determined shutter speed that meets the scene requirements and the maximum value thereof that can presently be used in fill flash, step 1310 determines if extra system speed exists and the amount, if any, of extra system speed that is initially available. Specifically, once the maximum usable shutter speed is determined, it is compared to the maximum (fastest) shutter speed that can be provided by the camera. The new shutter speed, i.e. NEW__SHUTTER__SPEED, is set to the slower one of these two speeds. The amount of available extra system speed is then determined as the log of the ratio of the new shutter speed to the shutter speed that meet the scene requirements. For example, if based upon camera shake considerations, a maximum usable shutter speed is 1/125th of a second could be used and the scene required a shutter speed of 1/250th of a second, then 1/125th of a second would initially be chosen as the new shutter speed and one stop of tra system speed ($\log_{10} 2$) would result.

With the determination of the amount of extra system speed that is currently available with fill flash lighting and the new shutter speed that can be used therewith, step 1320 is performed to account, based upon the film quality vs. exposure characteristic, for the extra system speed that was implicitly consumed, through prior selection of exposure and flash parameters that meet the scene requirements, in having intentionally changed the exposure of the specific film currently in use from the ISO/ANSI exposure standards. The amount of extra system speed that is used here depends upon the specific exposure characteristic of the film. As represented by lines 306 and 1318, step 1320 utilizes two inputs: film quality vs. exposure information (specifically a table of pre-defined values) and EXTRA_SPEED. The output produced by this step, as represented by line 1324, is an updated amount of EXTRA SPEED that still exists. Step 1320 is formed of the same routine described above for step 1260.

Now, at this point, a new shutter speed has been defined for fill flash that meets the scene requirements while providing a measure of intentional over- or under-exposure of the film to improve image quality. If, as discussed immediately above, extra system speed still exists, then, step 1330 is performed to utilize the remaining extra system speed to decrease the latest value for the shutter speed, i.e. select a faster shutter speed which further decreases the amount of time during which the shutter is open. The resulting value of the shutter speed is checked against the appropriate physical limit values and, if necessary, clipped by a corresponding limit value. Step 1330 utilizes, as represented by lines 1314, 1324 and 304, the following as input: NEW_SHUTTER_SPEED, EXTRA_SPEED, and camera specifications—specifically shutter speed limits. As output and as represented by line 352, step 1330 produces the latest values for the exposure settings—specifically SHUTTER_SPEED. Step 1330 is formed of the following routine expressed in high level functional programming terms:

Lastly, if full flash lighting is to be used, then alternatively, as noted above, extra speed full flash determination step 1130 is performed. An operational diagram of extra speed full flash determination and usage updates the flash_condition as "YES", determines whether extra system speed exists in a full flash lighting situation and appropriately varies the flash parameters (specifically POWER_CONDITION and spread bounce information) to consume as much of that extra system speed as possible in an effort to improve resulting image quality. If extra system speed still remains after accounting, in accordance with the film quality vs. exposure table, for the extra system speed which was implicitly consumed in having chosen exposure settings and flash parameters that meet the current scene requirements and intentionally vary the exposure of the film in use from the ISO standard exposure, then, as a last resort, the remaining extra system speed is consumed by reducing the lens aperture (here FLASH_F_NUMBER) setting to impart additional depth-of-field to the resulting image—even though the additional depth-of-field may not likely yield a noticeable improvement in image quality.

In this regard, automated cameras known in the art, when used in making flash exposures, disadvantageously and routinely decrease the lens aperture size in response to an increase in film speed. No other exposure settings or flash parameters are generally changed. The additional depth-of-field provided by the lens is simply wasted inasmuch as the flash power and hence the depth-of-illumination provided by the flash unit have both remained constant. As such, changing the film speed in these cameras does not improve the resulting image quality. Similarly, if the GUIDE_NUMBER of a flash unit increases, these automated cameras also routinely decrease the lens aperture size, even if the depth-of-field requirements of a scene have not changed. Here, too, the additional depth-of-field, being beyond that required by the scene, is mostly wasted and will not significantly improve image quality. In contrast to providing additional and wasted depth-of-field as occurs in the art, our inventive process, as described in detail below, first utilizes the extra system speed avail-

```
INPUT: camera specifications
INPUT: EXTRA_SPEED
INPUT: NEW_SHUTTER_SPEED
OUTPUT: SHUTTER_SPEED
SHUTTER_SPEED = NEW_SHUTTER_SPEED / (10^(EXTRA_SPEED))
IF SHUTTER_SPEED > MAXIMUM_SHUTTER_SPEED
    THEN: SHUTTER_SPEED = MAXIMUM_SHUTTER_SPEED
    ENDIF
IF SHUTTER_SPEED < MINIMUM_SHUTTER_SPEED
    THEN: SHUTTER_SPEED = MINIMUM_SHUTTER_SPEED
    ENDIF
```

At this point, step 1330 has suitably adjusted the shutter speed to utilize all the remaining extra system speed, up to the physical limit of the shutter, in a fill flash lighting situation. The resulting exposure settings, specifically SHUTTER_SPEED, produced by step 1330, along with the lens aperture value determined through step 720 (discussed above in conjunction with FIG. 7) that meets the scene requirements, are applied by the camera microcomputer system, through its output circuitry, to appropriately drive the shutter and lens aperture mechanisms of the camera and photograph the current scene using fill flash. This concludes execution of the inventive process for use with fill flash lighting.

able through, illustratively, an increase in ISO (ASA) film speed and/or GUIDE NUMBER (the latter attributable to an increase in available output flash power) to change the flash illumination by throttling down the non-spread direct full flash output power in order to conserve flash power thereby permitting a storage capacitor within the flash to rapidly recharge in preparation for the next flash exposure and/or through utilizing either bounce or spread flash in order to minimize "red-eye" and provide more even scene illumination than that obtainable through non-spread direct flash. The lens aperture setting remains at the value that was previously selected to meet matched depth-of-field and depth-of-illumination requirements. Since the lens aperture is not initially stopped down with an increase in GUIDE_NUMBER and/or film speed, the amount of additional exposure that results by maintaining the aperture setting at its prior value provides the available extra system speed. Thereafter, to the extent any extra system speed remains after selecting bounce or spread flash and then after having accounted for that which is implicitly consumed in the intentional over- (or under-) exposure inherent in selecting the exposure settings and flash parameters that meet the current scene requirements, the lens aperture setting is changed to consume all the remaining extra system speed. Since there are now no other remaining uses to which extra system speed can be put that provide a more noticeable improvement(s) in image quality than changing the aperture, the lens aperture setting is changed as a last resort to impart additional depth-of-field to the resulting image, even though doing so will only provide a marginal improvement, if any, in image quality. Using the extra system speed in this prioritized manner (specifically first, throttling flash output power; second, using bounce or spread flash; third, accounting for exposure changes; and fourth and lastly, changing the lens aperture setting) advantageously provides a noticeable improvement in flash photography over that occurring in automated cameras known in the art.

As shown, step 1130 consists of five primitive steps, all of which are performed to determine whether extra system speed exists in an full flash lighting situation and how that extra system speed, to the extent any exists, can best be used to vary the exposure settings and improve image quality. These steps include: determining extra speed in full flash lighting step 1410, calculating flash output step 1420, calculating flash spread and bounce step 1430, using the extra speed in full flash for film exposure step 1440 and stopping down the lens aperture in full flash step 1450.

Up to this point and prior to entering step 1410, exposure settings for full flash have been determined through specifically steps 910 and 920 (see FIG. 9) and 1030 (see FIG. 10) that, to the extent possible, satisfy the baseline full flash exposure. In particular, the lens aperture setting has been chosen to be that which provides equal depth-of-field and depth-of-illumination for the primary subject distance. The initial shutter speed has been chosen as a default value for use with full flash, i.e. the value of the FLASH_SHUTTER_SPEED parameter.

Figure 14:
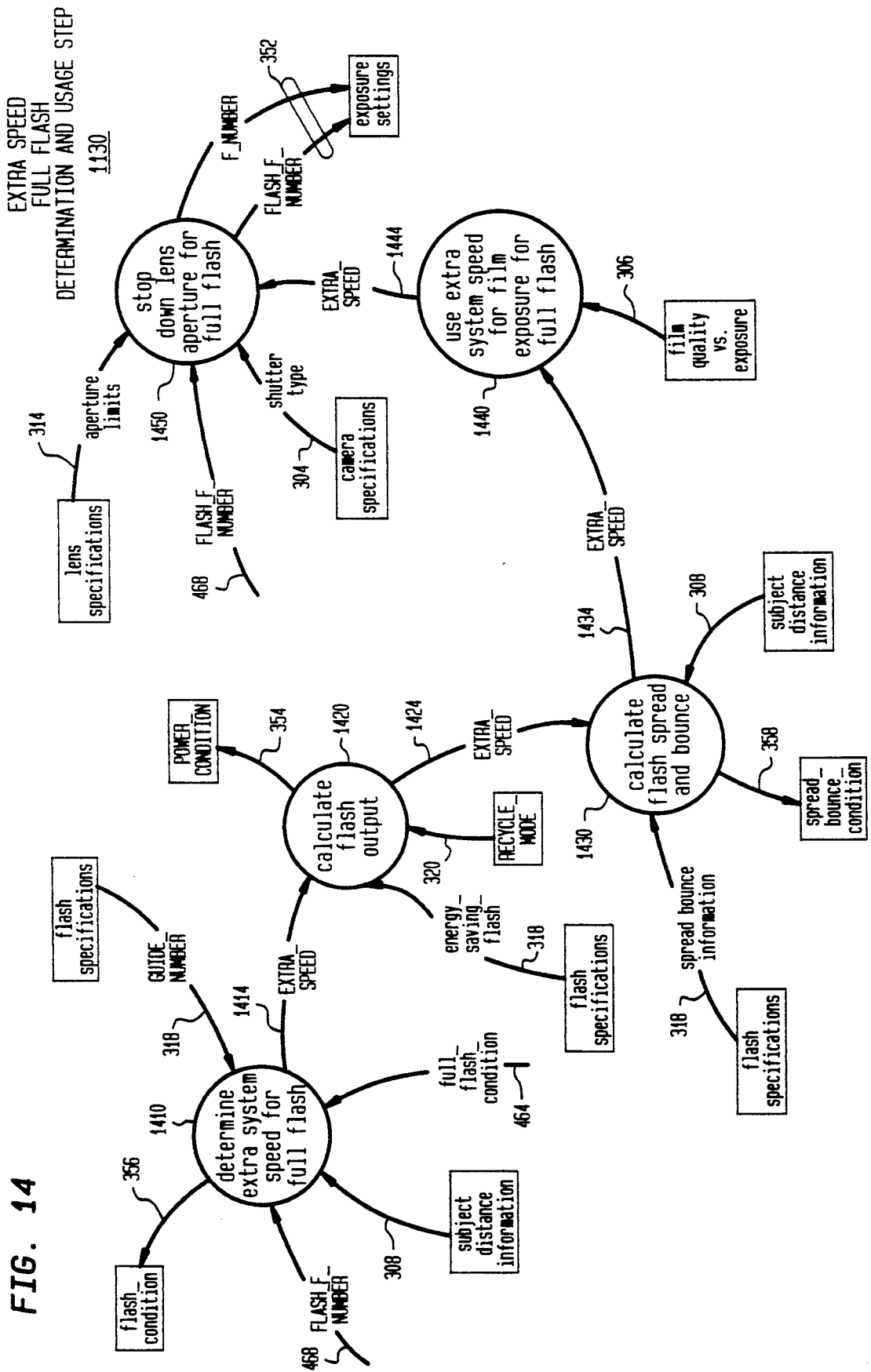
FIG. 14 depicts an operational diagram of extra speed full flash determination and usage step 1130 also shown in FIG. 11.

Upon entry into step 1130, step 1410, as shown in FIG. 14, is first performed. This step determines whether flash power exists which exceeds that required by the scene. If so, extra system speed exists. Step 1410 then determines the amount of available extra system speed that initially exists. If extra system speed exists, step 1420 determines the appropriate output (output intensity) lower of the flash unit that is needed to meet the scene requirements and then utilizes a portion of, if not all, the extra system speed to appropriately reduce (throttle down) the output power of the flash unit. This permits the storage capacitor within the flash to rapidly re-charge in preparation for the next flash exposure. If any extra system speed remains, then step 1430, in response to the existence of a ceiling or other surface suitable for bounce illumination, utilizes a portion, if not all, of this remaining extra system speed to provide bounce flash. If such a surface does not currently exist, then step 1430 utilizes a portion, if not all, of the remaining extra system speed for spread flash illumination, i.e. increasing the horizontal beam width of a direct full flash illumination. In the event extra system speed still exists, then step 1440 consumes a given amount of the remaining extra system speed by having varied the exposure of the film itself, based upon its exposure characteristic, from the ISO/ANSI exposure standards. As noted above, the variation comes about from the prior selection of a combination of shutter speed and lens aperture settings that meets the current scene requirements. If any extra system speed still exists, then step 1450 is performed to stop down, i.e. reduce, the lens aperture (here FLASH_F_NUMBER) setting to impart additional depth-of-field to the resulting image. Inasmuch as decreasing the lens aperture setting will produce little, if any and likely no, noticeable improvement in image quality, this change only occurs as a last resort after all the other techniques for consuming available extra system speed in a full flash situation have been exhausted.

As noted above, step 1410 determines whether flash power exists which exceeds that required by the scene, and based thereon, the amount of extra system speed that initially exists with full flash lighting The amount of full flash that is available is given by the value of the GUIDE_NUMBER parameter; while the flash power required by the scene is specified by the value of the DEPTH_NUMBER parameter which equals the product of the FLASH_F_NUMBER and the primary subject distance The value of the GUIDE_NUMBER also increases with increases in film speed In essence, if the flash unit provides more optical power than that required by the scene, then extra system speed exists. Step 1410 utilizes, as represented by lines 318, 468, 308 and 464, the following as input: flash specifications—specifically GUIDE_NUMBER, FLASH_F_NUMBER, subject distance information and full_flash_condition. As output, step 1410 updates, as represented by line 356, the value of flash_condition to "YES" thereby signifying that flash illumination is to be used and, as represented by line 1414, produces an initial value for extra system speed, i.e. EXTRA_SPEED. Step 1410 is formed of the following routine expressed in high level functional programming terms:

```
INPUT: flash specifications
INPUT: FLASH_F_NUMBER
INPUT: subject distance information
INPUT: full_flash_condition
OUTPUT: EXTRA_SPEED
OUTPUT: flash_condition
IF full_flash_condition = YES
    THEN: flash_condition = YES
        EXTRA_SPEED = log[(GUIDE_NUMBER
            / (FLASH_F_NUMBER
                · PRIMARY_SUBJECT_DISTANCE))$^2$]
ENDIF
```

Once the initial amount of extra system speed has been provided through step 1410, step 1420 is performed to determine the appropriate output (output intensity) power of the flash unit that is needed to meet the scene requirements and then utilizes a portion, if not all, of the extra system speed to appropriately reduce the output power of the flash unit. The flash output power is appropriately throttled back to that which meets the scene requirements only if the flash unit currently in use is energy saving and operates in a fast recycle mode. Otherwise, the maximum light output of the flash unit (i.e. POWER_CONDITION=1) is used, and no extra system speed is consumed by this step. Step 1420 utilizes, as represented by lines 141, 318 and 320, the following as input: EXTRA_SPEED, flash specifications—specifically energy_saving_flash, and RECYCLE_MODE. As output, step 1420 updates the value of EXTRA_SPEED, as represented by line 1424, and produces a value, as represented by line 354, for POWER_CONDITION. Step 1420 is formed of the following routine expressed in high level functional programming terms:

```
INPUT: RECYCLE_MODE
INPUT: energy_saving_flash
UPDATE: EXTRA_SPEED
OUTPUT: POWER_CONDITION
IF energy_saving_flash = YES
    THEN: IF RECYCLE_MODE = NORMAL
            THEN: POWER_CONDITION = 1.0
          ENDIF
    ELSE: IF (RECYCLE_MODE = FAST) AND (EXTRA_SPEED > 0)
            THEN: POWER_CONDITION = 10^(EXTRA_SPEED)
                  EXTRA_SPEED = 0
          ENDIF
    ELSE: POWER_CONDITION = 1.0
ENDIF
```

In the event extra system speed exists because the flash unit can not be appropriately throttled back, then a determination is made through step 1430 as to whether a portion, if not all, of this extra system speed can be used for bounce flash illumination. Here, if a suitable surface for bounce is detected by vertical range finding system 230 (see FIG. 2) situated in the camera and if sufficient positive extra system speed exists—i.e. equal or greater than the value of the BOUNCE_CUTOFF parameter which typically equals +2 or +3 stops, then bounce flash illumination is used. Inasmuch as bounce flash provides more even scene illumination than does spread flash, bounce flash, to the extent it can be used in a current photographic situation, is preferred to spread flash illumination. A suitable bounce flash unit could contain two separate flash tubes and corresponding reflectors. One tube and its reflector would be pointed towards the top of the unit, while the other tube and its reflector would be pointed forward. The former tube would only be energized if a suitable bounce surface exists and sufficient extra system speed was available; the other tube would be used for spread or non-spread direct full flash illumination. Alternatively, the flash unit could contain a single flash tube and a mirrored beam splitter (e.g. a partially silvered mirror) which, for a bounce flash, is selectively inserted in front of the tube to direct a portion of its optical output upward from the top of flash unit and the remainder outward from the front of the flash unit. However, if a suitable surface is not available or the amount of extra system speed that currently exists is insufficient for bounce flash illumination, then a pre-defined amount of the extra system speed, as defined by a table look-up operation into the spread table, is consumed through spread flash illumination, i.e. by changing the horizontal beam width of a direct full flash illumination. Changes in the beam width can be readily accomplished within a flash unit by using a suitable electro-magnetic actuator to position one of several suitable optical diffusers, that each provides a pre-defined spread angle, in front of the flash tube in that unit. The specific implementation of the flash unit is not critical as long as it possesses the capability to selectively direct a known amount of light in a given direction(s). The performance of that flash unit for spread and/or bounce flash, in terms of its directionality and flash output power, would be characterized by the corresponding values stored in an appropriate SPREAD TABLE and the BOUNCE_CUTOFF parameters. To simplify spread flash illumination, three different spread angles could be used: normal, wide$_1$ and wide$_2$. As such, the spread angle of the flash unit can be set to a normal value where spread flash is not to be used, and to increasingly wide angles (e.g. wide$_1$ and wide$_2$) which provide increasingly large spread area coverage though with reduced light levels at each point therein. Through proper selection of a spread angle, direct flash illumination should be spread out beyond the frame captured by the lens in order to provide scene illumination that, through reflections off nearby surfaces and objects onto the scene, attempts to mimic the lighting characteristics provided by bounce flash illumination. The value of the parameter SPREAD_AMOUNT provided by the SPREAD TABLE defines the relative light intensity loss provided by the increased beam angle and measured in terms of log exposure. Step 1430 utilizes, as represented by lines 1424, 318 and 308, the following as input: EXTRA_SPEED, flash specifications—specifically spread bounce information, and subject distance information. This step updates the value of EXTRA_SPEED, as represented by line 1434, and produces appropriate values, as represented by line 358, for spread_bounce_condition. Step 1430 is formed of the following routine expressed in high level functional programming terms, with the following spread table being illustrative.

```
INPUT: EXTRA_SPEED
INPUT: spread bounce information
UPDATE: EXTRA_SPEED
OUTPUT: spread_bounce_condition
DEFINE TABLE
```

| EXTRA_SPEED IN | SPREAD_AMOUNT | BEAM ANGLE | EXTRA_SPEED OUT |
|---|---|---|---|
| −5.00 | 0.00 | normal | −5.00 |
| −1.50 | 0.00 | normal | −1.50 |
| −1.20 | 0.00 | normal | −1.20 |
| −0.90 | 0.00 | normal | −0.90 |

-continued

| | | | |
|---|---|---|---|
| −0.60 | 0.00 | normal | −0.60 |
| −0.30 | 0.00 | normal | −0.30 |
| 0.00 | 0.00 | normal | 0.00 |
| 0.30 | 0.30 | wide$_1$ | 0.00 |
| 0.45 | 0.45 | wide$_2$ | 0.00 |
| 0.60 | 0.45 | wide$_2$ | 0.15 |
| 0.90 | 0.45 | wide$_2$ | 0.45 |
| 1.20 | 0.45 | wide$_2$ | 0.75 |
| 1.50 | 0.45 | wide$_2$ | 1.05 |
| 1.80 | 0.45 | wide$_2$ | 1.35 |
| 5.00 | 0.45 | wide$_2$ | 4.55 |

```
IF ceiling_exist = YES
   THEN: IF EXTRA_SPEED > BOUNCE_CUTOFF
      THEN: BOUNCE_AMOUNT = EXTRA_SPEED
            EXTRA_SPEED = EXTRA_SPEED −.9
            IF EXTRA_SPEED < 0
               THEN: EXTRA_SPEED = 0
            ENDIF
            BOUNCE_AMOUNT = BOUNCE_AMOUNT
                − EXTRA_SPEED
            SPREAD_AMOUNT = 0
      ELSE: linearly interpolate SPREAD_AMOUNT from
            SPREAD TABLE
   ENDIF
   ELSE: linearly interpolate SPREAD_AMOUNT from
         SPREAD TABLE
ENDIF
```

In lieu of using a flash unit that has a lens which varies the spread angle through one or more fixed amounts, i.e. provides quantized variations in the beam angle, the flash unit could include a lens which can be continuously moved to linearly vary the spread angle between two limits. This linear variation could change proportionally with corresponding variations in the value of the SPREAD_AMOUNT parameter.

With the amount of extra system speed that is currently available with full flash lighting and specifically the amount consumed through spread and bounce flash illumination having now been determined, step 1440 is performed to account for the extra system speed that was implicitly consumed by having chosen exposure settings and flash parameters that meet the current scene requirements but, in accordance with the film quality vs. exposure characteristics of the present film in use, that results in an exposure that intentionally varies from the ISO/ANSI exposure standards. Step 1440 utilizes, as represented by lines 306 and 1434, two inputs: film quality vs. exposure information (specifically a table of pre-defined values) and EXTRA_SPEED. The output produced by this step, as represented by line 1444, is an updated amount of EXTRA_SPEED that still exists. Step 1440 is formed of the same routine described above for step 1260.

Now, at this point, appropriate flash output power and, where appropriate, spread and bounce flash settings have been selected for full flash that meets the scene requirements while providing a measure of intentional over-or under-exposure of the film to improve image quality. If, as discussed immediately above, extra system speed still exists, then, step 1450 is performed to utilize, as a last resort, all the remaining extra system speed to stop down, i.e. reduce, the lens aperture (here FLASH_F_NUMBER) setting, provided the physical aperture limits of the lens are not exceeded, in order to impart additional depth-of-field to the resulting image. The additional depth-of-field, being in excess of that required to meet the depth-of-illumination, is not likely to provide an improvement in image quality; however, it is the only remaining use to which the remaining extra system speed can now be put. Step 1450 utilizes, as represented by lines 314, 468, 304 and 1444, the following as input: lens specifications—specifically aperture limits, FLASH_F_NUMBER, camera specifications—specifically shutter type, and EXTRA_SPEED. This step produces, as represented by line 352, new values for the exposure settings—specifically F_NUMBER and FLASH_F$_{13}$ NUMBER—as output. Step 1450 is formed of the following routine expressed in high level functional programming terms:

```
INPUT: EXTRA_SPEED
INPUT: camera specifications
INPUT: lens specifications
INPUT: FLASH_F_NUMBER
UPDATE: FLASH_F_NUMBER
OUTPUT: F_NUMBER
FLASH_F_NUMBER = 10^(EXTRA_SPEED/2) . FLASH_F_NUMBER
IF FLASH_F_NUMBER > MAXIMUM_F_NUMBER
   THEN: FLASH_F_NUMBER = MAXIMUM_F_NUMBER
ENDIF
IF FLASH_F_NUMBER < MINIMUM_F_NUMBER
   THEN: FLASH_F_NUMBER = MINIMUM_F_NUMBER
ENDIF
IF shutter type ≠ PROGRAMMABLE
   THEN: F_NUMBER = FLASH_F_NUMBER
ENDIF
```

At this point, step 1450 has suitably adjusted the lens aperture to utilize all the remaining extra system speed, up to the physical limits of the lens aperture, in a full flash lighting situation. The resulting exposure settings, specifically F_NUMBER and FLASH_F_NUMBER, produced by step 1450, along with the shutter speed value determined through step 820 (discussed above in conjunction with FIG. 8) that meets the scene requirements, are applied by the camera microcomputer system, through its output circuitry, to appropriately drive the shutter and lens aperture mechanisms of the camera and photograph the current scene using fill flash. This concludes execution of the inventive process for use with full flash lighting.

As noted above, once the exposure settings and, where appropriate, flash parameters have been chosen to consume as much of the available extra system speed as possible in accordance with our inventive process, then the camera microcomputer drives the camera lens aperture and shutter mechanisms and flash unit to provide a resulting exposure with, when necessary, supplemental fill or full flash illumination, all as defined by the exposure settings and, where appropriate, flash parameters for the current scene being photographed.

E. Use of Statistical vis-a-vis Actual measured Input Data, or Adaptive Data for Certain Input Parameters Generally speaking, the question of whether to incorporate a particular automatic control system into a camera involves evaluating a well-known tradeoff between manufacturing cost and product performance. Clearly, our inventive process, in its most sophisticated version as described above, requires relatively sophisticated scene sensors. In this regard, for example, light metering system 215 (see FIG. 2) and horizontal range finding system 220 provides distances and accompanying light levels for both the primary subject and background in a current scene. Accordingly, these systems must possess the capability to successfully discriminate between the primary subject and background portions of the scene. To do so, these systems rely on two-point sensors and related processing electronics. Sensing systems that possess this (or a higher) level of sophistication are likely to be relatively expensive. While the cost of such sensors may account for an insignificant portion of the total manufacturing cost of a camera designed for "professional" use, the same is often not the case for a low cost camera designed primarily for widespread amateur use. Cameras of the former type are driven by performance, with cost being very such of a secondary factor; while cameras of the latter type are very sensitive to manufacturing cost. Given this reality, relatively simple mechanisms and control systems are generally used in low cost cameras in lieu of sophisticated sensors and associated electronics.

However, in spite of the cost limitations inherent in manufacturing a low cost camera, our inventive process (or at least a portion(s) of it, as noted below) can still be incorporated in these cameras and used with relatively primitive sensors to yield overall image quality that is still significantly higher than that obtainable with low cost cameras available in the art.

Specifically, rather than relying on actual real-time measurements of various input parameters, such as illustratively subject distance, background distance and even scene brightness, the values of these parameters can alternatively be obtained through table look-up operations into stored statistical data. For example, in a low cost camera that uses a short fixed focal length lens, such as a 35 mm lens focused at, e.g., its hyperfocal distance, there is little, if any noticeable difference in image sharpness for objects located at a camera-to-subject distance of approximately 40 feet (approximately 12.2 m) to so-called infinity. In such a camera, the background could be safely assumed to exist at 40 feet for all images. Given the resulting marginal difference in sharpness between objects situated at 40 feet and at infinity, a simple rangefinder could be used to supply primary subject distance and the background distance set to e.g. 40 feet (approximately 12.2 meters), with little, if any, degradation in image quality resulting from use of our process with an assumed distance The statistical data could either include a single pre-defined value for a given item, such as 40 feet for background distance, or a number of values with a specific one of these values being selected through use of conditional probabilities. For example, using stored statistics previously gathered through analysis of thousands of different photographed images, certain probabilities can be defined for background distance given a primary subject distance. As such, a single-point output value produced by a simple range finding system for primary subject distance could be used by the camera microprocessor to access one, i.e. the most likely, of a number of different possible background distances. Hence, a readily available spot metering system could be substituted for the multi-point metering system specifically described above. Any change in primary subject distance would yield a differing corresponding change in the statistically based background distance. The resulting values for the actual primary subject distance and the statistically based background distance would then be supplied to our inventive process. Similarly, other scene specific data which has been statistically estimated based upon the expected use of the camera could be used in lieu of corresponding real-time measurements of this data. For example, a camera designed for outdoor use may contain a stored value of expected scene brightness. This value would be determined by the manufacturer of the camera using statistical analyses of a sufficiently large number of photographs taken with outdoor lighting and then stored within the camera for subsequent use in choosing optimum exposure settings through our inventive process.

Furthermore, rather than relying on internal camera-based accelerometers to measure shake information, this information could be programmed into the camera, specifically into a ROM, during its manufacture. In this case, the information could be based upon statistical studies conducted by a camera manufacturer rather than actual measured real-time data. Use of such statistical data would eliminate the need for these accelerometers and heir associated processing electronics and advantageously reduce the manufacturing cost of the camera.

Alternatively, an assumption(s) could be made regarding scene requirements. As an example and in contrast to that occurring in currently available low cost cameras, the shutter speed in a low cost camera could be selected as equalling the FOCAL_LENGTH_FACTOR multiplied by the reciprocal of the FOCAL_LENGTH of the lens currently in use in order to eliminate camera shake. This camera, as would be typical of a camera designed for widespread amateur use, could have a short fixed focal-length lens with a single locked lens aperture size. Cameras of this type are manufactured with the assumption that the depth-of-field required by the vast majority (statistically speaking), e.g. 90-95%, of the scenes which will be photographed will lie within the depth-of-field provided by the single lens aperture. For example, for a 37 mm lens with an f/11 lens aperture, the depth-of-field will extend from 4 feet (approximately 1.22 m) to infinity. Accordingly, for 90–95% of the scenes being photographed, then a simple measurement of primary subject light level will reveal, within a certain margin of error, whether and the appropriate amount of extra system speed that is currently available. If extra system speed is available, then, depending upon the film in use, the shutter speed could be set to intentionally over-expose the film, as appropriate, in order to consume the extra system speed so as to improve image quality. For example, if objects from 4 feet to infinity are in sharp focus using the f/11 lens aperture and the shutter speed has been determined, as set forth above, to eliminate camera shake but the measured subject light level in this scene indicates that for an ISO normal exposure a faster shutter speed than that initially selected could be used instead, then the extra system speed could be used, depending on film type, to keep the shutter speed at its original value in order to provide a stop of over-exposure to improve image quality. A circuit could be used within the camera to read the film type through the DX contacts and, for certain pre-defined film types, enable the over-exposure to occur. In contrast, low cost cameras known in the art would simply increase the shutter speed (decrease the amount of time during which the shutter is open) to obtain an ISO normal exposure. Thus, even in relatively simple low cost cameras, determination and use of extra system speed, as broadly taught by our inventive process, could be used to provide a noticeable improvement in image quality.

However, the accuracy inherent in using statistically assumed values and/or other assumptions, whether of input data or scene requirements, is generally less than that associated with using actually measured real-time values. As such, the accuracy inherent in our inventive process for calculating extra system speed and exposure and, where appropriate, flash parameters would, in certain instances, decrease somewhat through use of statistical data and/or scene based assumptions. Nevertheless, the resulting parameters, having values that might be somewhat degraded, would nevertheless significantly improve image quality, via the determination and use of extra system speed, beyond the image quality obtainable using only ISO normal exposures as employed in current low cost cameras.

Thus, as one can now appreciate, various broad teachings of our invention, from a portion to the entire process itself, can be incorporated in cameras that range from being very simple and inexpensive to very sophisticated and costly to in effect "bridge the gap" between these different extremes while providing significant noticeable improvements in image quality obtainable through all these cameras.

Clearly, as manufacturing efficiencies rise over time and the cost of using increasingly sophisticated sensors decreases, the use of statistical data could be replaced, where appropriate during product design and manufacture, by sensors to provide actual measured real-time data so as to permit our inventive process to operate at increasingly higher accuracies and provide images having even further increased overall quality.

Moreover, if sufficient processing power and storage capability could be incorporated into a camera, the camera could not only measure real-time input data but also perform statistical analysis of historical input data particular to its user. By doing so, the camera would effectively "learn" the appropriate values for various salient parameters. In particular, certain statistical data, such as for example camera shake information, could in effect become customized to a given user, rather than having been averaged across a typical user community, and would be accessible in much the same manner as statistical data stored in the camera during its manufacture. This would skew the performance of the camera towards the characteristics of a given user and/or the scenes which are expected to be photographed by that user. In situations where photographic or other conditions do not permit actual real-time measurements to take place for a given input parameter(s), the stored statistical data could be used instead as default values to increase the rate at which our inventive process could be performed, and/or to increase the resulting accuracy obtained thereby over the accuracy resulting from use of a pre-stored value(s) defined by the manufacturer for this parameter(s).

F. Severability of the Preferred Embodiment

As noted above, various portions of the preferred embodiment of our inventive process can be severed therefrom and incorporated into cameras to provide resulting corresponding improvements in image quality. Illustrative examples of these portions will now be discussed.

Certainly, as previously described, the DEPTH_NUMBER parameter and its use in flash photography to provide an appropriate lens aperture setting given subject distance can be readily incorporated into nearly any commercially available camera. Using this parameter to provide lens aperture settings, rather than the GUIDE_NUMBER parameter, will eliminate unnecessary depth-of-field and allow the photographer latitude to use spread or bounce flash illumination so as to provide more consistent scene illumination than that obtained through non-spread direct full flash—thereby improving image quality over that obtainable through use of the GUIDE_NUMBER based ISO/ANSI exposure standards. Selection and use of spread or bounce flash, in this instance, would be in direct contrast to the methodology employed in automated cameras known in the art which merely relies on stopping down the lens aperture in response to an increase in either the film speed and/or the value of the GUIDE_NUMBER of a flash unit. Inasmuch as merely stopping down the lens aperture would likely result in needlessly imparting additional depth-of-field to a photographed image of a scene beyond that required by the scene, this would, in effect, waste the available extra system speed provided by the film and/or flash unit and would marginally, if at all, improve image quality.

Specifically, the DEPTH_NUMBER could be incorporated into a simple circular numerical index (effectively a circular slide rule) which is affixed to a flash unit to enable a photographer to quickly determine the proper lens aperture given the subject distance. A similar index for GUIDE_NUMBER could also be situated adjacent to and used in conjunction with the DEPTH_NUMBER index. By appropriately adjusting both of these indices for the proper DEPTH_NUMBER and current GUIDE_NUMBER of the flash unit in use, these scales would provide the appropriate lens aperture setting, given a primary subject distance, and indicate whether spread or bounce flash could be used as well as the appropriate spread angle. As such, the determination of extra system speed provided by the differential between the DEPTH_NUMBER and the GUIDE_NUMBER parameters (the latter parameter encompassing increases in either or both flash power and film speed) and its prioritized use would be incorporated into these scales and would essentially be transparent to the photographer.

Another illustrative severable portion of our process involves automatically determining whether fill flash is to be used or not based upon a measurement using, e.g., a single auto-focusing spot on the primary subject, of primary subject distance coupled with a two-point measurement of primary and background light levels.

Furthermore, another illustrative severable portion of the inventive process is the determination of a lens aperture setting based on the far depth-of-field requirement in a scene and, to the extent extra system speed exists in photographing this scene, utilizing a portion (or where appropriate all) of this extra system seen in intentionally over-exposing th ®film rather than stopping own the lens aperture or increasing the shutter speed. By intentionally over-exposing the film in accordance with its quality vs. exposure characteristic, an improvement in image quality will likely result for most negative print films and particularly for those films that exhibit such a characteristic that is strongly biased towards over-exposure.

In addition, a further illustrative severable portion of our inventive process, that can readily be used in currently available, and particularly inexpensive, cameras, involves selecting an appropriate shutter speed, based upon the reciprocal of the focal length multiplied by the FOCAL_LENGTH_FACTOR, to minimize camera shake. Selecting a shutter speed in this manner would be particularly useful in cameras with a zoom lens, where the focal length and hence minimum shutter speed changes as the lens is zoomed. In this case, measurements of actual real-time shake information, i.e. values for the BLUR_FROM_SHAKE parameter, could be eliminated from our inventive process and replaced with suitable pre-defined constant(s) that are set during manufacture and an approximate expected amount of user induced camera shake which the camera is to experience. The camera could store one or several such constants. If multiple constants are stored, the user could select any one of these constants he or she desires in any instance by setting an appropriate user-accessible switch located on the camera.

A further illustrative severable portion of the inventive process and one, as discussed above, that is geared to use in low cost cameras is determining the available extra system speed based solely upon a primary subject light level and, rather than increasing the shutter speed due to a heightened primary subject light level, using the extra system speed to maintain a given shutter speed a a value that is sufficient to eliminate camera shake while intentionally over-exposing the film.

Thus, as one can now appreciate, based upon e.g. considerations of cost and desired performance, portions of our inventive process ranging from merely one simple aspect—such as using DEPTH_NUMBER to select the appropriate lens aperture or selecting shutter speed to minimize camera shake, to more complex portions—such as determining the appropriate lens aperture based upon scene depth-of-field requirements coupled with using extra system for intentional over-exposure or determining whether or not to use fill flash, to the entire process can be utilized in many different cameras. By incorporating selectively larger portions of the inventive process into appropriate cameras, a manufacturer can readily provide a wide variety of cameras offering widely differing levels of automated sophistication that nevertheless will all provide, though to varying degrees based upon the amount of the inventive process that is used, overall image quality that is significantly improved over that generally obtainable from cameras of comparable cost and/or complexity known in the art.

G. Various Illustrative Extensions and modifications to the Invention

Clearly, by now those skilled in the art recognize that our inventive process can be extended and/or modified in numerous ways based upon the specific application.

In particular, as noted above, our inventive process utilizes knowledge based rules to determine the appropriate exposure settings and flash parameters in a photographic situation. Some of these rules, such as the amount of extra system speed that remains after intentional over- or under-exposure, are implemented through table look-up operations; while other rules, such as those regarding the determination of the initial amount of extra system speed, are implemented by real-time calculation of various equations. For any specific application of our inventive exposure control process, these rules can be implemented either way depending upon the cost, processing throughput and sophistication of the associated camera microcomputer. In that regard, an implementation of our process could rely on using look-up operations into ROM based tables where the results of each step of the inventive process have been pre-defined for a variety of input conditions and are coupled with interpolation, where appropriate, rather than separately stepping through the entire process for each successive image being photographed. The size of each table is defined by the cost of additional memory and its attendant size and circuitry requirements. Alternatively, to reduce the size of the tables, certain relatively simple portions of the process, such as those illustratively discussed above, could be implemented through executing software based calculations while other portions that would otherwise rely on calculating relatively complex time-consuming equations could instead be implemented using table look-up operations. In this manner, the benefits achievable through both approaches would be readily realized in practice.

Furthermore, although our inventive process has been described in detail as utilizing a specific arrangement of distinct steps and discrete processes, many of these steps and/or processes can be combined as necessary or desirable in a given implementation. Moreover, although we have described one specific prioritized manner in which extra system speed is utilized in each separate lighting condition, i.e. ambient, fill or full flash, to initially provide what we believe are the most dramatic improvements in image quality or power reductions followed by increasingly less noticeable improvements, other different prioritized schemes of incrementally consuming available extra system speed can be used instead, if desired. For example, in a full flash situation as described above, we utilize available extra system speed first to appropriately throttle back the output power produced by the flash unit (assuming an energy saving flash unit is being used) to permit rapid re-charging of the flash and then to provide spread or bounce flash illumination. Alternatively, a camera manufacturer could elect to utilize extra system speed to first provide spread or bounce flash illumination over saving available flash power. Alternatively, in an ambient lighting situation as discussed above, we have decided to utilize extra system speed first to increase the shutter speed (decrease the time during which the shutter is open) to reduce camera shake, then to account for intentional changes in film exposure and finally to readjust the lens aperture to a smaller size to impart additional depth-of-field to a resulting photograph beyond that required by the scene currently being photographed. Clearly, a change in lens aperture could be made first prior to increasing the shutter speed, though the resulting benefit to image quality by a sharpened background would usually be significantly less than reducing image blur. In any event, many other changes readily apparent to those skilled in the art can be made to the prioritized schemes specifically set forth above to incrementally consume available extra system speed. Furthermore, several different such schemes could be available with selection of a specific scheme to use in any one photographic situation being made by the camera microcomputer, that implements our inventive exposure control system, based upon applicable rules. For example, the camera, based upon lighting conditions of a scene, could signal the photographer to connect a tripod to the camera. Once the camera microcomputer senses that the camera is connected to the tripod and is thus likely to remain stable over a prolonged exposure period, the microcomputer could then switch to a prioritized scheme that favors increased lens apertures over shortened shutter speeds in order to consume available extra system speed in a manner that improves image quality. Alternatively, if the photographer set a switch on the camera indicating that a tripod was not available, or the camera itself detected that a tripod was not connected to the camera after a fixed time-out interval occurred, then a scheme, such as that described in detail above, which favors shortened shutter speeds to minimize camera shake and image blur over smaller lens apertures would instead be selected and utilized. Generally speaking, the camera microcomputer, using appropriate input sensors and/or through other well known techniques can readily determine all the specific photographic resources that are currently available to the photographic system for use in taking each photograph. For example, the input sensors could illustratively include a microswitch to determine if a tripod is connected to the base of the camera. In addition, the microcomputer could send out appropriate queries on its communications link to identify all units connected thereto and thereafter receive corresponding response messages from each such unit with its relevant photographic parameters. Once these available resources have been ascertained, the microcomputer could then choose and subsequently utilize the specific prioritized scheme that is most likely to improve the resulting image quality given the specific resources that are currently available. Since photographers often do not shoot a complete roll of film under the same photographic conditions, this process of ascertaining system resources and selecting one of a number of different schemes could be repeated, as often as necessary, prior to activating the shutter for each successive photograph in order to account for any changes in available system resources, select the most suitable prioritized scheme and accordingly choose the exposure settings and flash parameters, as appropriate, to maximally improve—to the extent possible—the quality of the resulting image.

In addition, cameras that are designed for serious amateur and/or professional photographers can nevertheless benefit from inclusion of our inventive process. However, in these cameras, various constants, proportionality factors and/or tables, as appropriate, that are used in our inventive process could be replaced with user controls in order to impart a degree of variability to our process that enables the photographer to customize the response of the process and the camera to his or her desires while still benefitting from quality improvements obtainable through use of the inventive process.

Furthermore, our inventive process has been described as relying on only two points in the scene to define subject thickness; namely, primary subject (foreground) distance and background subject distance. Alternatively, our inventive process could utilize three or, where appropriate, more points to define scene depth. In this instance, pixellated scene sensors and accompanying image processing circuits could be used to measure distances and light levels of a number of points in the scene. These points could either be pre-determined or, preferably, selected based upon an automatic identification of various elements (e.g. foreground subjects) in the scene. The distance and light level associated with each measurement point (here being a different pixel) could then be appropriately weighted, based upon an appropriate identification of that point as a pre-defined portion of a given element (e.g. foreground or background) of the scene, in order to yield corresponding weighted measures. These measures would, in turn, be employed to provide scene light levels and subject distances for subsequent use by our inventive process.

In particular, once the foreground and background portions of the scene are grossly identified, typically through rangefinder measurements, distance and light level measurements could be made using a pixellated area sensor. Given the generally overwhelming importance of accurately capturing the foreground portion of the scene in providing high quality photographic images, more measurement points could be used to assess the foreground than those used to assess the background portion of the scene. For example, two measurement points could be used for the primary subject and one for the background. In this case, the primary subject distance would be broken into two distances: a distance to a main subject in the foreground and a distance to a background subject in the foreground. These two foreground distances when coupled with the distance to the actual background in the scene would yield a three point measurement of scene depth. The required depth-of-field would then be chosen based upon the largest distance associated with these three points. The light level for each of these three points would also be measured and then weighted to yield appropriate values for the subject light levels. Advantageously, such a three point measurement could handle distances in front of the main subject. In this regard, since depth-of-field is more restrictive at subject distances that are close to the camera (near depth-of-field) than farther away (far depth-of-field), the inventive process could automatically elect to utilize the formula, as set forth above, for near depth-of-field (either for close-up photography or not, as appropriate) in lieu of that for the far depth-of-field in order to meet the requirements of the current scene being photographed. As such, a lens aperture setting would be selected that provides a depth-of-field that more accurately matches the current scene requirement than that which might otherwise occur.

In general, increasing the number of measurement points in the scene, for measuring distance and light levels, would likely yield increasingly accurate assessments of the scene requirements, including the necessary depth-of-field needed to fully capture the scene, as well as the extra system speed that may currently exist to photograph the scene. As all these assessments become more accurate, increasingly higher levels of overall image quality would likely result from use of our inventive process. However, as the number of measurement points increase so does the cost and complexity of the accompanying image sensors and processing electronics that would be needed to sense and process data for these points. With currently available electro-optical and electronic technology, we have found that two measurement points provide a very satisfactory compromise in terms of cost, implementational complexity and ensuing improvements in image quality.

Furthermore, the exposure settings, measured scene parameters or flash parameters appropriate to a photographed image could be stored on the negative in the vicinity of the frame for that image. During digital or optical enlargement and printing, an automated printer could read the values of these settings and/or parameters and appropriately regulate the printing exposure in a manner that reduces printing errors. Specifically, if the image on the negative includes intentional over-exposure, then the amount of over-exposure, expressed for example in stops of system speed, could be encoded onto the negative. Hence, the printer, after having read the amount of over-exposure existing in the negative, would then accordingly alter its printing algorithm(s) to provide optimal image quality on the print. Furthermore, other printing-based exposure values could be selected, as appropriate, based upon encoded data recorded for each photographed image on the negative in order to assure, to the extent possible, that the printed image is transferred, on an enlarged basis, from the negative to paper with little, if any and preferably no, resulting degradation in image quality. In fact, these encoded parameters might even permit the printer, in certain situations (such as e.g. slight under-exposure) to even enhance image quality beyond that on the negative in order to compensate for various film or camera based limitations, artifacts or even certain photographic errors inherent in a given exposure. These image enhancements may illustratively include noise suppression, sharpness enhancement or tone scale modifications.

Moreover, although our inventive process and apparatus has been described in the context of use with a photographic camera, and specifically a 35 mm camera, our invention can be utilized in any nearly any imaging device and nearly any image sensor—whether, for example, photographic or electro-optical—that utilizes scene illumination coupled with lens aperture and shutter speed settings (or the equivalent) to form a replica of the image(s) of a scene. These devices can illustratively include photographic cameras of substantially any type or film format or film type, or other electronic cameras whether still frame, motion or both that employ illustratively either charge coupled devices (CCD) or vidicon based imagers. Regardless of the specific image sensor used in an imaging device, i.e. whether that sensor is illustratively photographic film or an electro-optic imager, that sensor may possess may possess a unique exposure vs. quality function. This function may depend on, for example, frequency response, noise, tone reproduction, color reproduction and/or dynamic range. With a knowledge of the proper parameters and their inter-relationships appropriate to a given imaging device, the rules, including the various formulas, set forth above can be readily modified, in ways that would be readily apparent to those skilled in the art, to optimize the resulting quality of the images by selecting the preferred exposure and illumination conditions in any imaging situation that are appropriate for that specific device. Specifically, the parameters and their associated values that dictate optimum quality for a photographic image are likely to be quite different from the appropriate parameters and their corresponding values for an electronic camera that uses an electro-optic imager. Nevertheless, the parameters appropriate to a specific imaging device can be optimized in the general manner set forth above to first determine the existence and amount of extra system speed available in a current imaging situation and second utilize that extra system speed in a pre-defined, e.g. prioritized incremental, manner which is specific to that imaging device and its image sensor and which provides improved image quality over an appropriate standard exposure applicable to that device. In addition, with suitable modifications that are readily apparent to those skilled in the art to the formulas set forth above, our inventive process could be readily adapted to function to properly set exposures taken with light of a wide variety of wavelengths, e.g. infra-red or ultra-violent, and not must the visible spectrum.

Although one complete embodiment of the present invention, as well as various severable portions thereof and various extensions and modifications to this embodiment, has been shown and described in detail herein, many other varied embodiments that incorporate the teachings of our invention may be very easily constructed by those skilled in the art.

INDUSTRIAL APPLICABILITY AND ADVANTAGES

The present invention is useful in photographic cameras, and particularly within automatic exposure control apparatus that is often incorporated in these cameras, to produce pictures that exhibit an increased overall quality level over that obtainable through such cameras known in the art. Through use of the invention, exposure settings are automatically chosen for each picture in conjunction with scene requirements, such as providing sufficient depth-of-field, adequate film exposure and avoiding image blur. Where appropriate, these settings deviate from corresponding normal exposure values obtained by adhering to the ISO/ANSI exposure standards in order to provide image quality that is superior to that which would otherwise result from adhering to these standards.

We claim:

1. Apparatus for capturing an image of a scene formed of a subject with near and distant subject elements, said apparatus having a flash unit and an image sensing device, said apparatus comprising:
   first means for determining an initial value of scene lighting contrast in response to measured near and distant subject light levels in said scene;
   means for ascertaining whether fill flash illumination of the scene will reduce the value of the scene lighting contrast from the initial value thereof; and
   means, responsive to said first determining and said ascertaining means, for utilizing fill flash illumination in capturing said image of the scene if the initial value of the scene lighting contrast indicates that said distant subject light level is greater by at least a pre-defined amount that said subject light level and if the scene lighting contrast will be reduced through use of fill flash illumination from the initial value, whereby use of fill flash illumination will improve overall lighting contrast in the scene, wherein said utilizing means comprises:

second means for determining whether the fill flash illumination will provide a sufficient amount of light to expose the distant subject element with a specific amount of lumination; and first means for inhibiting the fill flash illumination from occurring if said flash unit will not produce said sufficient amount of light.

2. The apparatus in claim 1 wherein said utilizing means further comprises:

third means for determining whether the fill flash illumination will impart sufficient light to said near subject element to cause a reversal in said scene lighting contrast; and second means for inhibiting the fill flash illumination from occurring if said reversal in the scene lighting level will otherwise be produced.

3. The apparatus in claim 2 wherein said second inhibiting means comprises:

means, in the event the reversal will occur, for reducing flash power of said flash unit, if said flash unit is energy saving, to eliminate said reversal from occurring or, if said image sensing device has a programmable shutter, for choosing a different shutter opening for said image sensing device for use during a fill flash exposure than for an ambient exposure so as to reduce incoming light level passing through said shutter for said subject element during said fill flash exposure; and means, responsive to said reducing or choosing means, for utilizing said fill flash illumination in capturing said image of the scene.

4. The apparatus in claim 3 wherein said image sensing device is a photographic or electronic camera.

5. The apparatus in claim 2 wherein said scene lighting contrast is formed of a fractional ratio or a logarithmic difference of the near to distant subject light levels.

6. The apparatus in claim 5 wherein said image sensing device is a photographic or electronic camera.

7. The apparatus in claim 2 wherein said first determining means comprises means for measuring scene lighting levels of the near and distant subjects in said scene so as to form the measured near and distant subject light levels.

8. The apparatus in claim 7 wherein said image sensing device is a photographic or electronic camera.

9. In apparatus for capturing an image of a scene formed of a subject with near and distant subject elements, said apparatus having a flash unit and an image sensing device, a method for determining whether to illuminate said scene with fill flash illumination in order to produce a captured image thereof, said method comprising the steps of:

first determining an initial value of scene lighting contrast in response to measured near and distant subject light levels in said scene;

ascertaining whether fill flash illumination of the scene will reduce the value of the scene lighting contrast from the initial value thereof; and utilizing, in response to said first determining and said ascertaining steps, fill flash illumination in capturing said image of the scene if the initial value of the scene lighting contrast indicates that said distant subject light level is greater by at least a pre-defined amount than said subject light level and if the scene lighting contrast will be reduced through use of fill flash illumination from the initial value, whereby use of fill flash illumination will improve overall lighting contrast in the scene, wherein said utilizing step comprises the steps of:

second determining whether the fill flash illumination will provide a sufficient amount of light to expose the distant subject element with a specific level of lumination; and first inhibiting the fill flash illumination from occurring if said flash unit will not produce said sufficient amount of light.

10. The method in claim 9 wherein said utilizing step further comprises the step of:

third determining whether the fill flash illumination will impart sufficient light to said near subject element to cause a reversal in said scene lighting contrast; and second inhibiting the fill flash illumination from occurring if said reversal in the scene lighting level will otherwise be produced.

11. The method of claim 10 wherein said second inhibiting step comprises the steps of:

in the event the reversal will occur, reducing flash power of said flash unit, if said flash unit is energy saving, to eliminate said reversal from occurring or, if said image sensing device has a programmable shutter, choosing a different shutter opening for said image sensing device for use during a fill flash exposure than for use during an ambient exposure so as to reduce incoming light level passing through said shutter for said subject elements during the fill flash exposure; and utilizing, in response to said reducing or choosing step, said fill flash illumination in capturing said image of the scene.

12. The method in claim 11 wherein said image sensing device is a photographic or electronic camera.

13. The method in claim 10 wherein said scene lighting contrast is formed of a fractional ratio or a logarithmic difference of the near to distant subject light levels.

14. The method in claim 13 wherein said image sensing device is a photographic or electronic camera.

15. The method in claim 10 wherein said first determining step comprises the step of measuring scene lighting levels of the near and distant subjects in said scene so as to form the measured near and distant subject light levels.

16. The method in claim 15 wherein said image sensing device is a photographic or electronic camera.

* * * * *

UNITED STATES PATENT AND TRADEMARK OFFICE
CERTIFICATE OF CORRECTION

PATENT NO. : 5,121,155
DATED : June 9, 1992
INVENTOR(S) : Richard B. Wheeler

It is certified that error appears in the above-identified patent and that said Letters Patent is hereby corrected as shown below:

On the Title Page - Inventors:   Delete "William R. O'Such, Rochester, and Roger W. Wilson, Pittsford;" and "all of"

Signed and Sealed this

Sixteenth Day of August, 1994

Attest:

BRUCE LEHMAN

Attesting Officer

Commissioner of Patents and Trademarks